United States Patent [19]
Monden et al.

[11] Patent Number: 5,858,613
[45] Date of Patent: Jan. 12, 1999

[54] OPTICAL RECORDING MEDIUM

[75] Inventors: Atsushi Monden; Takahiko Suzuki; Emiko Kambe; Masahiro Shinkai, all of Chiba; Sumiko Kitagawa, Saitama, all of Japan

[73] Assignee: TDK Corporation, Tokyo, Japan

[21] Appl. No.: 786,458

[22] Filed: Jan. 21, 1997

[30]   Foreign Application Priority Data

Jan. 23, 1996 [JP] Japan .................................. 8-028646
Jul. 15, 1996 [JP] Japan .................................. 8-204340

[51] Int. Cl.$^6$ ...................................................... G11B 7/24
[52] U.S. Cl. .............................. 430/270.16; 430/270.19; 430/945; 534/707; 534/706
[58] Field of Search ..................... 534/706, 707, 534/765, 778; 430/945, 270.15, 270.16, 270.19

[56]   References Cited

U.S. PATENT DOCUMENTS

| | | | |
|---|---|---|---|
| 3,377,337 | 4/1968 | Sugiyama et al. | 534/770 |
| 3,933,785 | 1/1976 | Bak et al. | 534/707 |
| 4,686,143 | 8/1987 | Yoshikawa et al. | 428/913 |
| 4,824,485 | 4/1989 | Tanaka et al. | 534/707 |
| 5,298,608 | 3/1994 | Murayama et al. | 430/270.16 |
| 5,389,419 | 2/1995 | Maeda et al. | 430/270.19 |
| 5,633,106 | 5/1997 | Aihara et al. | 430/270.16 |

FOREIGN PATENT DOCUMENTS

| | | |
|---|---|---|
| 762451 | 7/1967 | Canada . |
| 59-55795 | 3/1984 | Japan . |
| 60-254038 | 12/1985 | Japan . |
| 60-297944 | 2/1987 | Japan . |
| 62-144997 | 6/1987 | Japan . |
| 2-68966 | 3/1990 | Japan . |
| 3-137566 | 6/1991 | Japan . |
| 4-81162 | 4/1992 | Japan . |
| 5-126261 | 5/1993 | Japan . |
| 7-51673 | 6/1995 | Japan . |
| 7-51682 | 6/1995 | Japan . |
| 7-71867 | 8/1995 | Japan . |
| 7-71868 | 8/1995 | Japan . |
| 7-71869 | 8/1995 | Japan . |
| 6044137 | 10/1995 | Japan . |
| 6045667 | 10/1995 | Japan . |
| 6295085 | 6/1996 | Japan . |
| 8-287513 | 11/1996 | Japan . |

OTHER PUBLICATIONS

Highly Selective Spectrophotometric Determination of Trace Amounts of Vanadium (V) with2–(8–Quinolyazo) S–N, N–Diethylaminophenol By Reversed–Phase Partition Liquid Chromatography; Hoshino et al; Japanese Society for Analytical Chemistry; 1982; pp. 435–438; vol. 31.

Syntheses of Azo Dyes Containing 4.5 Diphenylimidazole and Their Evaluation as Analytical Reagents; Elsevier Scientific Publishing Company; Analytica Chimica Acta 81; 1976; pp. 131–141.

*Primary Examiner*—Martin Angebranndt
*Attorney, Agent, or Firm*—Watson Cole Grindle Watson, PLLC.

[57]   ABSTRACT

An optical recording medium which can be recorded and read at a short wavelength (about 635–680 nm) or which can be recorded and read at two wavelengths, the short wavelength and a conventional wavelength (about 780 nm) has a recording layer containing an azo metal complex dye obtained by reacting a metal compound with an azo compound of formula (I) or an azo compound of formula (II).

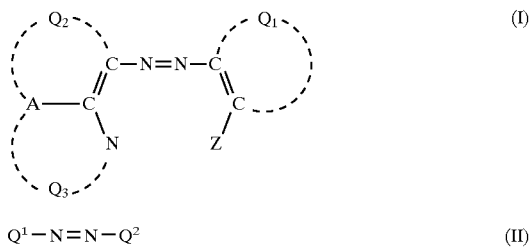

In formula (I), $Q_1$ is a group of atoms necessary to form an aromatic ring with two C, A is C or a hetero-atom, $Q_2$ is a group of atoms necessary to form an aromatic ring with two C and A, and $Q_3$ is a group of atoms necessary to form an aromatic ring with C, N and A, fused to the aromatic ring completed by $Q_2$. In formula (II), $Q^1$ is a 8-quinolyl radical and $Q^2$ is a 2-imidazolyl radical whose nitrogen at the 1-position has active hydrogen.

8 Claims, 3 Drawing Sheets

OPTICAL RECORDING MEDIUM

BACKGROUND OF THE INVENTION

1. Field of the Invention

This invention relates to an optical recording medium using an azo metal complex dye in a recording layer.

2. Prior Art

The present inventors have been engaged in the development of write-once type compact discs (CD-R) as a recordable optical recording medium corresponding to the compact disc (CD) standard. Higher density optical recording media are desired in the recent years, and some of such media heretofore proposed are CD-R of the next generation wherein the recording wavelength of CD-R is reduced from the current 780 nm to 680 nm to 635 nm and write-once type digital video discs (DVD-R). However, since development works have hitherto been made so as to match with 780 nm, there are known few dyes which can satisfy desired characteristics including light resistance, solubility and recording sensitivity on the shorter wavelength side of 680 nm to 635 nm. A further noteworthy requirement is interchangeability with the current standard. More particularly, unless the media which have been recorded by the existing recording device are at least readable with shorter wavelength light, there results a barrier against simple and rapid utilization of a pile of past accumulated information. For short wavelength recording layers to be developed from now on, it is considered important that they not only satisfy the standard at the current standard for wavelength 780 nm, known as the Orange Book standard, but also exhibit equivalent characteristics to the current standard even at 680 nm to 635 nm.

One measure contemplated to realize this demand in a most practical way is by mixing a dye for a short wavelength with a proper amount of a dye having satisfactory characteristics on the current standard, but free of substantial absorbance on the short wavelength side so as to satisfy characteristics at both the wavelengths. In this case, recording characteristics of a mixed system must be fully investigated.

For a dye to be used in recording layers, one characteristic which is especially important and difficult to accomplish is light resistance although the recording wavelength is important. Heretofore, dyes belonging to metal complex systems have been disclosed as highly light resistant dyes. As disclosed in JP-A 55795/1984, for example, there is known an example of combining a cyanine dye having low light resistance with a metal complex quencher for improving light resistance. This system, however, has the drawbacks that it has a drastically reduced solubility in a coating solvent used for spin coating and that the stabilizer itself can be decomposed and degraded. Other dyes having high light resistance include, for example, azo metal complex dyes (JP-B 51682/1995) and formazane nickel complex dyes (JP-A 254038/1985 and 144997/1987). Although these metal complex dyes surely have excellent light resistance, they generally have drawbacks of low recording sensitivity, relatively low solubility, and solubility in only limited solvents. When write/read operation at a short wavelength of 680 nm to 635 nm is taken into account, the formazane nickel complex dyes have a too long absorption wavelength, suggesting that this skeleton can no longer accommodate shorter wavelengths.

With respect to the phthalocyanine dyes known as highly light resistant dyes from the past, they are also difficult to avoid the above-mentioned drawbacks and thus deemed impossible to expect further development as a dye appropriated for short wavelength recording layers. As mentioned above, there is a strong demand for a dye skeleton which possesses desired write/read characteristics at a short wavelength of 680 nm to 635 nm, especially when used in a mixed system with a dye having absorbance on the long wavelength side, and which has high light resistance and solubility by itself.

DISCLOSURE OF THE INVENTION

A primary object of the present invention is to provide an optical recording medium having improved light resistance, excellent write/read characteristics at a wavelength of about 680 nm to 635 nm, and high sensitivity. Another object of the present invention is to provide such a high sensitivity optical recording medium which further has write/read characteristics satisfying the Orange Book standard in that satisfactory writing and reading is possible at a wavelength of 780 nm too.

These and other objects are achieved by the present invention which is defined below as (1) to (8).

(1) An optical recording medium comprising a recording layer containing an azo metal complex dye obtained by reacting a metal compound with an azo compound of the following general formula (I):

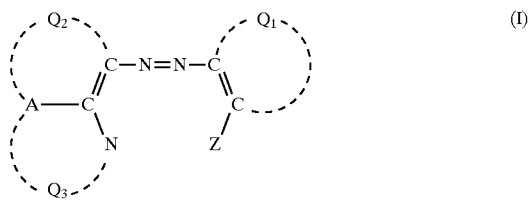

wherein $Q_1$ is a group of atoms necessary to form an aromatic ring with the two carbon atoms, Z is a radical having active hydrogen, A is a carbon atom or hetero-atom, $Q_2$ is a group of atoms necessary to form an aromatic ring with the two carbon atoms and A, and $Q_3$ is a group of atoms necessary to form an aromatic ring with the carbon atom, nitrogen atom and A, the aromatic ring completed by $Q_2$ being fused to the aromatic ring completed by $Q_3$.

(2) The optical recording medium of (1) wherein said azo metal complex dye has a center metal selected from the group consisting of Co, Mn, Ti, V, Ni, Cu, Zn, Mo, W, Ru, Fe, Pd, Pt, and Al, and said azo compound is of the following formula (Ia):

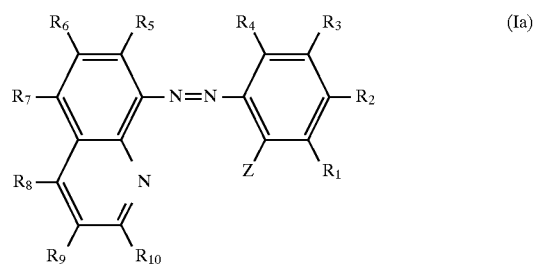

wherein $R_1$, $R_2$, $R_3$, and $R_4$ are independently selected from the group consisting of a hydrogen atom, halogen atom, amino radical, alkyl radical, alkoxy radical, aryloxy radical, acyl radical, aryl radical, carbamoyl radical, and alkoxycarbonyl radical, or $R_1$ and $R_2$, $R_2$ and $R_3$, and $R_3$ and $R_4$, taken together, may form a fused ring, Z is selected from the group consisting of —OH, —SH, —NH$_2$, —COOH, —CONH$_2$, —SO$_2$NH$_2$, and —SO$_3$H, and $R_5$, $R_6$, $R_7$, $R_8$, $R_9$, and $R_{10}$ are independently selected from the group consisting of a hydrogen atom, halogen atom, nitro radical, cyano radical, and alkyl radical.

(3) The optical recording medium of (1) wherein said recording layer further contains a light absorbing dye having different optical characteristics from said azo metal complex dye.

(4) The optical recording medium of (2) wherein said light absorbing dye having different optical characteristics is a phthalocyanine dye.

(5) An optical recording medium comprising a recording layer containing an azo metal complex dye obtained by reacting a metal compound with an azo compound of the following general formula (II):

$$Q^1-N=N-Q^2 \qquad (II)$$

wherein $Q^1$ is a 8-quinolyl radical and $Q^2$ is a 2-imidazolyl radical whose nitrogen at the 1-position has active hydrogen.

(6) The optical recording medium of (5) wherein said azo metal complex dye has a center metal selected from the group consisting of Co, Mn, Ni, Cu, Zn, Mo, Fe, and Pd.

(7) The optical recording medium of (5) wherein said recording layer further contains a light absorbing dye having different optical characteristics from said azo metal complex dye.

(8) The optical recording medium of (7) wherein said light absorbing dye having different optical characteristics is a phthalocyanine dye.

FUNCTION AND BENEFIT

The azo metal complex dyes used in the present invention are azo compounds of formula (I), preferably formula (Ia), having a metal coordinated therewith. The center metal is present at an adjacent position to the carbon atom adjacent to the carbon atom in the aromatic ring to which the azo radical is attached, and forms a coordination bond with the nitrogen atom which forms a fused aromatic ring with that carbon atom. Consequently, as compared with the azo metal complex dyes disclosed in JP-B 51682/1995 which coordinate to the center metal at the nitrogen atom adjacent to the carbon atom in the aromatic ring to which the azo radical is attached, the azo metal complex dyes according to the invention themselves assume a relatively distorted coordination structure, which is deemed to contribute to an improvement in solubility. At the same time, this distorted coordination structure enhances susceptibility to pyrolysis, which explains the reason why the inventive metal complex dyes have relatively high recording sensitivity although metal complex dyes are generally believed to have low recording sensitivity. Although we cannot provide theoretical explanation, it is also believed that this distorted structure leads to the unexpected results of improved jitter characteristics when the dye is used in a mixed dye system.

It is noted that H. Hoshino and T. Yotsuyanagi, Bunseki Kagaku, 31, E435 (1982) discloses 2-(8-quinolylazo)-5-N, N-diethylaminophenol which corresponds to formula (II) wherein $R_1$ and $R_3$ to $R_{10}$ are H, $R_2$ is —N(C$_2$H$_5$)$_2$, and Z is —OH. This compound, however, is merely used as a reagent for metal analysis by reversed phase partition liquid chromatography while its use in a recording layer of an optical recording medium is indicated nowhere.

In the other aspect, the azo metal complex dyes used in the present invention are azo compounds of formula (II) having a metal coordinated therewith. The center metal forms a coordination bond with the nitrogen atom of the quinoline ring. The azo radical is attached to the quinoline ring at its 8-position (see formula (IIa) to be described later) while the nitrogen atom is present at an adjacent position to the carbon atom at a position adjacent to the carbon atom to which the azo radical is attached. Consequently, as compared with the azo metal complex dyes disclosed in JP-B 51682/1995, 71867/1995, 71868/1995, and 71869/1995 which coordinate to the center metal at the nitrogen atom adjacent to the carbon atom in the aromatic ring to which the azo radical is attached, the azo metal complex dyes according to the invention themselves assume a relatively distorted coordination structure, which is deemed to contribute to an improvement in solubility. At the same time, this distorted coordination structure enhances susceptibility to pyrolysis, which explains the reason why the inventive metal complex dyes have relatively high recording sensitivity although metal complex dyes are generally believed to have low recording sensitivity. Although we cannot provide theoretical explanation, it is also believed that this distorted structure leads to the unexpected results of improved jitter characteristics when the dye is used in a mixed dye system.

It is noted that Shozo Shibata, Masamichi Furukawa and Ryozo Nakashima, Analytica Chimica Acta, 81 (1976), 131–141 discloses 2-(8-quinolylazo)-4,5-diphenylimidazole which belongs to the azo compounds of formula (II) and describes the use of this compound as a calorimetric reagent for metals. The use of a metal complex of 2-(8-quinolylazo)-4,5-diphenylimidazole in a recording layer of an optical recording medium is indicated nowhere in this reference.

ILLUSTRATIVE CONSTRUCTION

Figure 1:
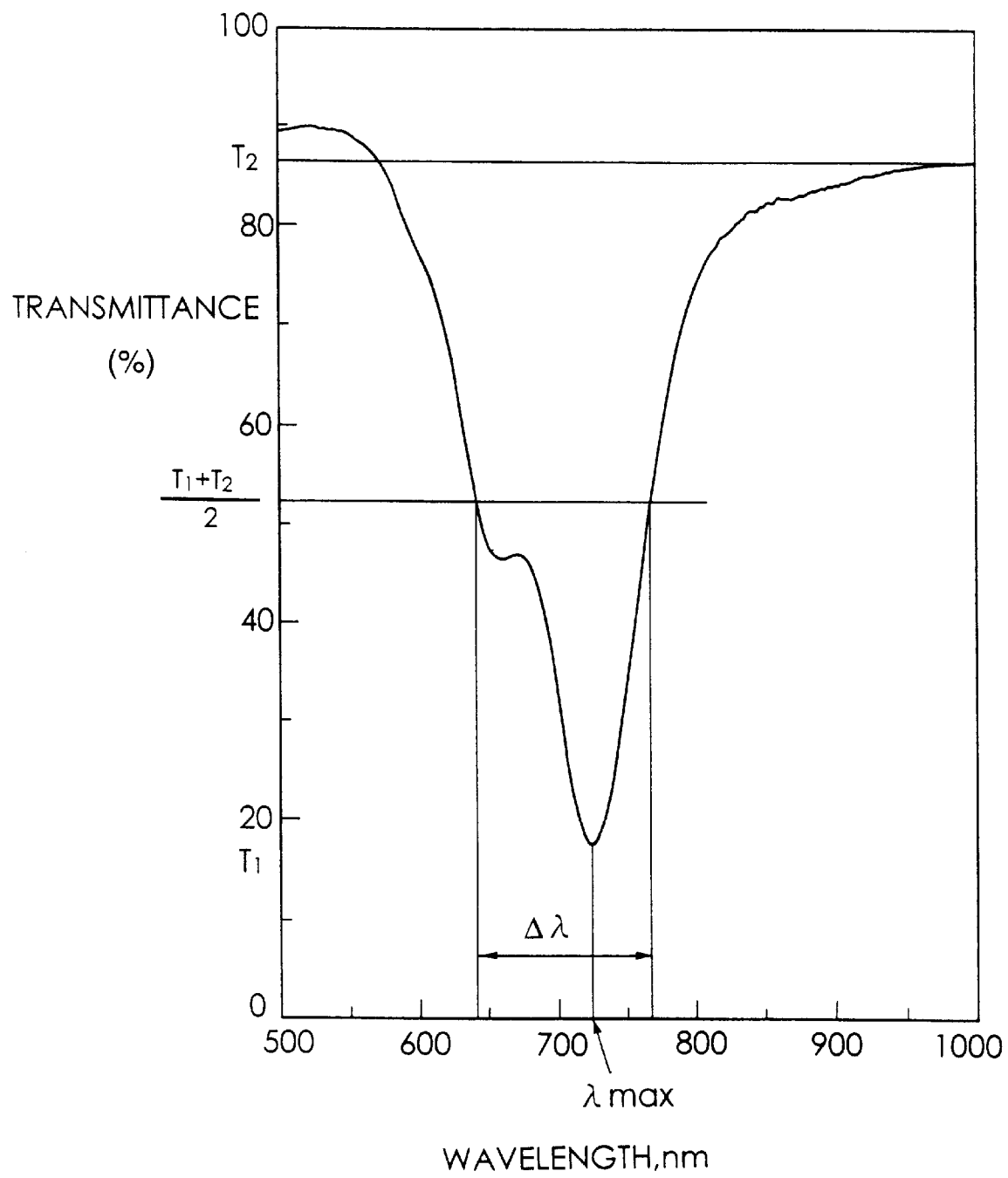
FIG. 1 is a graph illustrating how to determine a half-value width from an absorption spectrum of a thin film of phthalocyanine dye in the practice of the invention.

The present invention is described below in further detail.

The optical recording medium of the invention has a recording layer containing an azo metal complex dye. In the first aspect, the azo metal complex dye used herein is one obtained by reacting a metal compound with an azo compound of formula (I).

Referring to formula (I), $Q_1$ is a group of atoms necessary to form an aromatic ring with the two carbon atoms. The aromatic ring completed by $Q_1$ may be either carbocyclic or heterocyclic while it may be either monocyclic or polycyclic. The polycyclic ring may be either a fused polycyclic ring or a gathering of rings. Exemplary aromatic rings include benzene, naphthalene, pyridine, thiazole, benzothiazole, oxazole, benzoxazole, quinoline, imidazole, pyrazine, and pyrrole rings. Among these, the benzene and naphthalene rings are preferred, with the benzene ring being especially preferred.

Z is a radical having active hydrogen, examples of which are the same as will be described in conjunction with formula (Ia).

In addition to Z and the azo radical, the aromatic ring completed by $Q_1$ may further have a substituent. Exemplary substituents include an alkyl radical, alkoxy radical, nitro radical, cyano radical, halogen atom, aryl radical, aryloxy radical, acyl radical, alkoxycarbonyl radical, carbamoyl radical, and amino radical.

A is a carbon atom or hetero-atom such as O, N and S, with the carbon atom being preferred.

$Q_2$ is a group of atoms necessary to form an aromatic ring with the two carbon atoms and A. The aromatic ring completed by $Q_2$ may be the same as the aromatic ring completed by $Q_1$ and examples thereof are also the same. Inter alia, a benzene ring is preferred.

$Q_3$ is a group of atoms necessary to form an aromatic ring with the carbon atom, nitrogen atom and A. The nitrogenous aromatic ring completed by $Q_3$ may be either monocyclic or fused polycyclic. Examples of the nitrogenous aromatic ring include pyridine, thiazole, benzothiazole, oxazole, benzoxazole, quinoline, imidazole, pyrazine, and pyrrole rings, with the pyridine ring being preferred.

The aromatic ring completed by $Q_2$ is fused to the aromatic ring completed by $Q_3$. Examples of the fused ring include quinoline, benzothiazole, and benzoxazole rings, with the quinoline ring being preferred.

In addition to the azo radical, the fused aromatic ring completed by $Q_2$ and $Q_3$ may further have a substituent. Exemplary substituents are the same as exemplified for $Q_1$.

Preferred among the azo compounds of formula (I) are those of formula (Ia). Referring to formula (Ia), each of $R_1$ to $R_4$ is a hydrogen atom, halogen atom, amino radical, alkyl radical, alkoxy radical, aryloxy radical, acyl radical, aryl radical, carbamoyl radical or alkoxycarbonyl radical while these R radicals may be the same or different.

Examples of the halogen atom represented by $R_1$ to $R_4$ include fluorine, chlorine and bromine atoms.

The amino radicals represented by $R_1$ to $R_4$ are preferably substituted ones although unsubstituted ones are acceptable. Especially preferred substituted amino radicals are dialkylamino radicals. The alkyl moiety of the dialkylamino radical preferably has 1 to 12 carbon atoms, more preferably 1 to 4 carbon atoms and may be either normal or branched. The two alkyl radicals of the dialkylamino radical may be the same or different. Examples of the amino radicals represented by $R_1$ to $R_4$ include amino and methylamino radicals although preferred examples are dimethylamino, diethylamino, dipropylamino, dibutylamino, methylethylamino, methylisopropylamino, ethylisopropylamino, methylbutylamino, ethylbutylamino, and isopropylbutylamino radicals.

The alkyl radicals represented by $R_1$ to $R_4$ preferably have 1 to 12 carbon atoms in total and may be either normal or branched. A cycloalkyl radical or a radical having a cycloalkyl radical is acceptable in some cases. The alkyl radicals may have a substituent, preferred examples of which are halogen atoms (e.g., fluorine and chlorine atoms). The preferred alkyl radicals represented by $R_1$ to $R_4$ are normal and branched alkyl radicals of 1 to 4 carbon atoms in total which may have a substituent. Examples include methyl, ethyl, n-propyl, isopropyl, n-butyl, isobutyl, s-butyl, t-butyl, and trifluoromethyl radicals.

The alkoxy radicals represented by $R_1$ to $R_4$ are preferably those alkoxy radicals whose alkyl moiety has 1 to 4 carbon atoms in total and which may have a substituent such as halogen atoms (e.g., fluorine atoms). Examples of the alkoxy radical include methoxy, ethoxy, propoxy, butoxy, and pentafluoropropoxy radicals.

The aryloxy radicals represented by $R_1$ to $R_4$ may further have a substituent. For example, a phenoxy radical is preferred.

Examples of the acyl radical represented by $R_1$ to $R_4$ include acetyl, propionyl, and butylyl radicals, with the acetyl radical being preferred.

The aryl radicals represented by $R_1$ to $R_4$ may further have a substituent. For example, phenyl and o-, m- and p-tolyl radicals are included.

The carbamoyl radicals represented by $R_1$ to $R_4$ may further have a substituent. For example, carbamoyl, methylaminocarbonyl, and dimethylaminocarbonyl radicals are included.

Examples of the alkoxycarbonyl radical represented by $R_1$ to $R_4$ include methoxycarbonyl and ethoxycarbonyl radicals.

$R_1$ and $R_2$, $R_2$ and $R_3$, or $R_3$ and $R_4$, taken together, may form a fused ring. The fused ring is preferably carbocyclic, with a benzene ring being especially preferred. It is especially preferred that $R_3$ and $R_4$, taken together, form a benzene ring.

A combination of $R_1$ to $R_4$ prefers that each of $R_1$, $R_3$ and $R_4$ be a hydrogen atom, alkyl radical, alkoxy radical or chlorine atom and $R_2$ be a substituted amino, alkyl, alkoxy or aryloxy radical. More preferably, $R_2$ is a substituted amino radical. A most preferred combination is that $R_1$, $R_3$ and $R_4$ are hydrogen and $R_2$ is a substituted amino radical.

Z is —OH, —SH, —$NH_2$, —COOH, —$CONH_2$, —$SO_2NH_2$ or —$SO_3H$, with —OH being preferred.

Each of $R_5$ to $R_{10}$ is a hydrogen atom, halogen atom, nitro radical, cyano radical or alkyl radical while these R radicals may be the same or different.

The alkyl radicals represented by $R_5$ to $R_{10}$ may be the same as exemplified for the alkyl radicals represented by $R_1$ to $R_4$. Normal or branched alkyl radical having 1 to 4 carbon atoms in total are preferred while examples include methyl, ethyl and propyl radicals.

A combination of $R_5$ to $R_{10}$ prefers that each of $R_6$, $R_8$ to $R_{10}$ be a hydrogen atom, halogen atom or alkyl radical and each of $R_5$ and $R_7$ be a hydrogen atom, nitro, cyano or trifluoromethyl radical. A most preferred combination is that $R_5$ to $R_{10}$ are hydrogen atoms.

Preferred among the azo compounds of formula (Ia) are those wherein $R_1$, $R_3$ and $R_4$ each are a hydrogen atom, $R_2$ is a substituted amino radical, $R_5$ to $R_{10}$ each are a hydrogen atom, and Z is —OH.

The azo metal complex dyes having coordinated the azo compounds of formula (I), especially formula (Ia) possess a center metal which is preferably Co, Mn, Ti, V, Ni, Cu, Zn, Mo, W, Ru, Fe, Pd, Pt or Al. Among these, V, Mo, and W may take the form of an oxide ion, for example, $VO^{2+}$, $VO^{3+}$, $MoO^{2+}$, $MoO^{3+}$, and $WO^{3+}$. More preferred center metals are Co, Cu, Ni, and Mn. Co and Ni are further preferred, with Co being most preferred.

The azo compounds of formula (I), especially formula (Ia) are tridentate ligands. Therefore, if the center metal has a coordination number of 4 or more, another ligand may coordinate to the metal in addition to the azo compound. Such other ligands include a chlorine atom, water molecule, and hydroxo. These other ligands originate from raw materials, reaction solvents, etc.

It is noted that a radical of the azo compound of formula (I), especially formula (Ia) coordinates to the metal in the form of an acid anion (for example, —$O^-$ if Z is —OH).

A counter ion is present where the azo metal complex dyes have an electric charge. Examples of the counter ion include a chloride ion (Cl$^-$), bromide ion (Br$^-$), iodide ion (I$^-$), tetrafluoroborate ion (BF$_4^-$), hexafluorophosphate ion (PF$_6^-$), tetraphenylborate ion (B(C$_6$H$_5$)$_4^-$), perchlorate ion (ClO$_4^-$), tungstate ion (WO$_4^{2-}$), and acetylacetone anion (CH$_3$COCH=C(CH$_3$)O$^-$). Among these, the chloride ion (Cl$^-$), tetrafluoroborate ion (BF$_4^-$), hexafluorophosphate ion (PF$_6^-$), perchlorate ion (ClO$_4^-$), and acetylacetone anion (CH$_3$COCH=C(CH$_3$)O$^-$) are preferred, with the tetrafluoroborate ion (BF$_4^-$), hexafluorophosphate ion (PF$_6^-$), perchlorate ion (ClO$_4^-$), and acetylacetone anion (CH$_3$COCH=C(CH$_3$)O$^-$) being most preferred.

The azo metal complex dyes are exemplified by those of the following formula (Ib) having the azo compounds of formula (Ia) coordinated thereto.

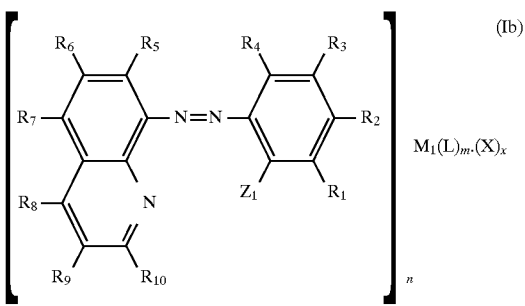

In formula (Ib), $R_1$ to $R_{10}$ are as defined in formula (Ia). $Z_1$ is —O$^-$, —S$^-$, —COO$^-$, —CONH$^-$, —SO$_2$NH$^-$ or —SO$_3^-$. $M_1$ is a center metal. L stands for another ligand. Letter n is equal to 1 or 2, and m is generally 0 or an integer of 1 to 3. X is a counter ion, and x is a number to maintain electric charge equilibrium.

Illustrative examples of the azo metal complex dye used herein are shown below as a combination of an azo compound used to form the azo metal complex dye, a center metal and a counter ion. It is noted that the azo compound is shown by a combination of R's in formula (Ib).

| Dye No. | $R_1$ | $R_2$ | $R_3$ | $R_4$ | $R_5$ | $R_6$ | $R_7$ | $R_8$ | $R_9$ | $R_{10}$ | Z | Center metal | Counter ion |
|---|---|---|---|---|---|---|---|---|---|---|---|---|---|
| I-1 | H | N(C$_2$H$_5$)$_2$ | H | H | H | H | H | H | H | H | OH | Co | BF$_4^-$ |
| I-2 | H | N(C$_2$H$_5$)$_2$ | H | H | H | H | H | H | H | H | OH | Co | PF$_6^-$ |
| I-3 | H | N(C$_2$H$_5$)$_2$ | H | H | H | H | H | H | H | H | OH | Co | ClO$_4^-$ |
| I-4 | H | N(C$_2$H$_5$)$_2$ | H | H | H | H | H | H | H | H | OH | Cu | BF$_4^-$ |
| I-5 | H | N(C$_2$H$_5$)$_2$ | H | H | H | H | H | H | H | H | OH | Ni | BF$_4^-$ |
| I-6 | H | N(C$_2$H$_5$)$_2$ | H | H | H | H | H | H | H | H | OH | Mn | BF$_4^-$ |
| I-7 | H | N(C$_2$H$_5$)$_2$ | H | H | H | H | H | H | H | H | COOH | Co | BF$_4^-$ |

-continued

| Dye No. | R$_1$ | R$_2$ | R$_3$ | R$_4$ | R$_5$ | R$_6$ | R$_7$ | R$_8$ | R$_9$ | R$_{10}$ | Z | Center metal | Counter ion |
|---|---|---|---|---|---|---|---|---|---|---|---|---|---|
| I-8  | H | N(C$_2$H$_5$)$_2$ | H | H | H   | H | H    | H | H | H | NH$_2$     | Co | BF$_4^-$  |
| I-9  | H | N(C$_2$H$_5$)$_2$ | H | H | H   | H | H    | H | H | H | SO$_2$NH$_2$ | Co | BF$_4^-$  |
| I-10 | H | N(C$_2$H$_5$)$_2$ | H | H | NO$_2$ | H | H    | H | H | H | CONH$_2$   | Ni | BF$_4^-$  |
| I-11 | H | N(C$_2$H$_5$)$_2$ | H | H | NO$_2$ | H | H    | H | H | H | OH         | Co | BF$_4^-$  |
| I-12 | H | N(C$_2$H$_5$)$_2$ | H | H | H   | H | NO$_2$ | H | H | H | OH         | Co | BF$_4^-$  |
| I-13 | H | N(C$_2$H$_5$)$_2$ | H | H | H   | H | NO$_2$ | H | H | H | NH$_2$     | Ni | ClO$_4^-$ |
| I-14 | H | N(C$_2$H$_5$)$_2$ | H | H | Cl  | H | H    | H | H | H | OH         | Co | ClO$_4^-$ |
| I-15 | H | N(C$_2$H$_5$)$_2$ | H | H | H   | H | Cl   | H | H | H | OH         | Co | ClO$_4^-$ |
| I-16 | H | N(C$_2$H$_5$)$_2$ | H | H | F   | H | H    | H | H | H | OH         | Co | BF$_4^-$  |
| I-17 | H | N(C$_2$H$_5$)$_2$ | H | H | H   | H | F    | H | H | H | OH         | Co | BF$_4^-$  |
| I-18 | H | N(C$_2$H$_5$)$_2$ | H | H | Br  | H | H    | H | H | H | OH         | Co | BF$_4^-$  |
| I-19 | H | N(C$_2$H$_5$)$_2$ | H | H | H   | H | Br   | H | H | H | OH         | Co | BF$_4^-$  |
| I-20 | H | N(C$_2$H$_5$)$_2$ | H | H | Cl  | H | Cl   | H | H | H | OH         | Mn | ClO$_4^-$ |

-continued

| Dye No. | $R_1$ | $R_2$ | $R_3$ | $R_4$ | $R_5$ | $R_6$ | $R_7$ | $R_8$ | $R_9$ | $R_{10}$ | Z | Center metal | Counter ion |
|---|---|---|---|---|---|---|---|---|---|---|---|---|---|
| I-21 | H | N(C₂H₅)₂ | H | H | CN | H | H | H | H | H | OH | Co | $BF_4^-$ |
| I-22 | H | N(C₂H₅)₂ | H | H | H | H | CN | H | H | H | OH | Co | $BF_4^-$ |
| I-23 | H | N(C₂H₅)₂ | H | H | H | H | H | H | H | CH₃ | OH | Co | $BF_4^-$ |
| I-24 | H | N(C₂H₅)₂ | H | H | NO₂ | H | H | H | H | CH₃ | OH | Ni | $BF_4^-$ |
| I-25 | H | N(C₂H₅)₂ | H | H | H | H | NO₂ | H | H | C₂H₅ | OH | Ni | $BF_4^-$ |
| I-26 | H | N(CH₃)₂ | H | H | H | H | H | H | H | H | OH | Co | $BF_4^-$ |
| I-27 | H | N(CH₃)₂ | H | H | H | H | H | H | H | H | OH | Co | $PF_6^-$ |
| I-28 | H | N(CH₃)₂ | H | H | H | H | H | H | H | H | OH | Co | $ClO_4^-$ |
| I-29 | H | N(CH₃)₂ | H | H | H | H | H | H | H | H | OH | Cu | $BF_4^-$ |
| I-30 | H | N(CH₃)₂ | H | H | H | H | H | H | H | H | OH | Ni | $BF_4^-$ |
| I-31 | H | N(CH₃)₂ | H | H | H | R | H | H | H | H | OH | Mn | $BF_4^-$ |
| I-32 | H | N(CH₃)₂ | H | H | H | H | H | H | H | H | COOH | Ni | $BF_4^-$ |
| I-33 | H | N(CH₃)₂ | H | H | H | H | H | H | H | H | COOH | Co | $BF_4^-$ |

-continued

| Dye No. | R₁ | R₂ | R₃ | R₄ | R₅ | R₆ | R₇ | R₈ | R₉ | R₁₀ | Z | Center metal | Counter ion |
|---|---|---|---|---|---|---|---|---|---|---|---|---|---|
| I-34 | H | N(CH₃)(CH₃) | H | H | H | H | H | H | H | H | NH₂ | Co | BF₄⁻ |
| I-35 | H | N(CH₃)(CH₃) | H | H | H | H | H | H | H | H | SO₂NH₂ | Co | BF₄⁻ |
| I-36 | H | N(CH₃)(CH₃) | H | H | H | H | H | H | H | H | CONH₂ | Co | BF₄⁻ |
| I-37 | H | N(CH₃)(CH₃) | H | H | NO₂ | H | H | H | H | H | OH | Co | BF₄⁻ |
| I-38 | H | N(CH₃)(CH₃) | H | H | NO₂ | H | H | H | H | H | NH₂ | Ni | BF₄⁻ |
| I-39 | H | N(CH₃)(CH₃) | H | H | H | H | NO₂ | H | H | H | OH | Co | BF₄⁻ |
| I-40 | H | N(CH₃)(CH₃) | H | H | H | H | NO₂ | H | H | H | NH₂ | Ni | BF₄⁻ |
| I-41 | H | N(CH₃)(CH₃) | H | H | Cl | H | H | H | H | H | OH | Co | ClO₄⁻ |
| I-42 | H | N(CH₃)(CH₃) | H | H | H | H | Cl | H | H | H | OH | Co | ClO₄⁻ |
| I-43 | H | N(CH₃)(CH₃) | H | H | F | H | H | H | H | H | OH | Co | BF₄⁻ |
| I-44 | H | N(CH₃)(CH₃) | H | H | H | H | F | H | H | H | OH | Co | BF₄⁻ |
| I-45 | H | N(CH₃)(CH₃) | H | H | Br | H | H | H | H | H | OH | Co | BF₄⁻ |
| I-46 | H | N(CH₃)(CH₃) | H | H | H | H | Br | H | H | H | OH | Co | BF₄⁻ |

-continued

| Dye No. | R₁ | R₂ | R₃ | R₄ | R₅ | R₆ | R₇ | R₈ | R₉ | R₁₀ | Z | Center metal | Counter ion |
|---|---|---|---|---|---|---|---|---|---|---|---|---|---|
| I-47 | H | N(CH₃)₂ | H | H | Cl | H | Cl | H | H | H | OH | Mn | ClO₄⁻ |
| I-48 | H | N(CH₃)₂ | H | H | CN | H | H | H | H | H | OH | Co | BF₄⁻ |
| I-49 | H | N(CH₃)₂ | H | H | H | H | CN | H | H | H | OH | Co | BF₄⁻ |
| I-50 | H | N(CH₃)₂ | H | H | H | H | H | H | H | CH₃ | OH | Co | BF₄⁻ |
| I-51 | H | N(CH₃)₂ | H | H | NO₂ | H | H | H | H | CH₃ | OH | Ni | BF₄⁻ |
| I-52 | H | N(CH₃)₂ | H | H | H | H | NO₂ | H | H | C₂H₅ | OH | Ni | BF₄⁻ |
| I-53 | H | N(C₃H₇)₂ | H | H | H | H | H | H | H | H | OH | Co | BF₄⁻ |
| I-54 | H | N(C₃H₇)₂ | H | H | H | H | H | H | H | H | OH | Ni | BF₄⁻ |
| I-55 | H | N(C₃H₇)₂ | H | H | H | H | H | H | H | H | NH₂ | Ni | ClO₄⁻ |
| I-56 | H | N(C₃H₇)₂ | H | H | H | H | H | H | H | H | COOH | Co | BF₄⁻ |
| I-57 | H | N(C₃H₇)₂ | H | H | H | H | H | H | H | H | CONH₂ | Co | BF₄⁻ |
| I-58 | H | N(C₃H₇)₂ | H | H | NO₂ | H | H | H | H | H | OH | Co | BF₄⁻ |
| I-59 | H | N(C₃H₇)₂ | H | H | H | H | NO₂ | H | H | H | OH | Co | BF₄⁻ |

-continued

| Dye No. | R₁ | R₂ | R₃ | R₄ | R₅ | R₆ | R₇ | R₈ | R₉ | R₁₀ | Z | Center metal | Counter ion |
|---|---|---|---|---|---|---|---|---|---|---|---|---|---|
| I-60 | H | N(C₃H₇)₂ | H | H | H | H | Cl | H | H | H | OH | Co | BF₄⁻ |
| I-61 | H | N(C₃H₇)₂ | H | H | Br | H | H | H | H | H | OH | Co | BF₄⁻ |
| I-62 | H | N(C₃H₇)₂ | H | H | NO₂ | H | H | H | H | CH₃ | OH | Ni | BF₄⁻ |
| I-63 | H | N(C₃H₇)₂ | H | H | H | H | NO₂ | H | H | C₂H₅ | OH | Ni | BF₄⁻ |
| I-64 | H | N(C₄H₉)₂ | H | H | H | H | H | H | H | H | OH | Co | BF₄⁻ |
| I-65 | H | N(C₄H₉)₂ | H | H | H | H | H | H | H | H | OH | Co | PF₆⁻ |
| I-66 | H | N(C₄H₉)₂ | H | H | H | H | H | H | H | H | OH | Ni | BF₄⁻ |
| I-67 | H | N(C₄H₉)₂ | H | H | H | H | H | H | H | H | OH | Mn | BF₄⁻ |
| I-68 | H | N(C₄H₉)₂ | H | H | H | H | H | H | H | H | NH₂ | Co | BF₄⁻ |
| I-69 | H | N(C₄H₉)₂ | H | H | H | H | H | H | H | H | COOH | Co | I⁻ |
| I-70 | H | N(C₄H₉)₂ | H | H | NO₂ | H | H | H | H | H | OH | Co | BF₄⁻ |
| I-71 | H | N(C₄H₉)₂ | H | H | NO₂ | H | H | H | H | H | OH | Ni | ClO₄⁻ |
| I-72 | H | N(C₄H₉)₂ | H | H | H | H | NO₂ | H | H | H | OH | Co | BF₄⁻ |

-continued

| Dye No. | R$_1$ | R$_2$ | R$_3$ | R$_4$ | R$_5$ | R$_6$ | R$_7$ | R$_8$ | R$_9$ | R$_{10}$ | Z | Center metal | Counter ion |
|---|---|---|---|---|---|---|---|---|---|---|---|---|---|
| I-73 | H | N(C$_4$H$_9$)$_2$ | H | H | H | H | NO$_2$ | H | H | H | OH | Ni | ClO$_4^-$ |
| I-74 | H | N(C$_4$H$_9$)$_2$ | H | H | Cl | H | H | H | H | H | OH | Co | ClO$_4^-$ |
| I-75 | H | N(C$_4$H$_9$)$_2$ | H | H | H | H | F | H | H | H | OH | Co | BF$_4^-$ |
| I-76 | H | N(C$_4$H$_9$)$_2$ | H | H | Br | H | H | H | H | H | OH | Co | BF$_4^-$ |
| I-77 | H | N(C$_4$H$_9$)$_2$ | H | H | H | H | CN | H | H | H | OH | Co | BF$_4^-$ |
| I-78 | H | N(C$_4$H$_9$)$_2$ | H | H | NO$_2$ | H | H | H | H | CH$_3$ | OH | Ni | BF$_4^-$ |
| I-79 | CH$_3$ | N(C$_2$H$_5$)$_2$ | H | H | H | H | H | H | H | H | OH | Co | BF$_4^-$ |
| I-80 | CH$_3$ | N(C$_2$H$_5$)$_2$ | H | H | NO$_2$ | H | H | H | H | H | OH | Ni | PF$_6^-$ |
| I-81 | CH$_3$ | N(C$_2$H$_5$)$_2$ | H | H | H | H | NO$_2$ | H | H | H | OH | Ni | PF$_6^-$ |
| I-82 | CH$_3$ | N(C$_2$H$_5$)$_2$ | H | H | Cl | H | H | H | H | H | OH | Co | ClO$_4^-$ |
| I-83 | CH$_3$ | N(C$_2$H$_5$)$_2$ | H | H | H | H | Br | H | H | H | OH | Co | BF$_4^-$ |
| I-84 | CH$_3$ | N(C$_2$H$_5$)$_2$ | H | H | NO$_2$ | H | H | H | H | CH$_3$ | OH | Ni | BF$_4^-$ |
| I-85 | CH$_3$ | N(C$_2$H$_5$)$_2$ | H | H | H | H | NO$_2$ | H | H | C$_2$H$_5$ | OH | Ni | BF$_4^-$ |

-continued

| Dye No. | R₁ | R₂ | R₃ | R₄ | R₅ | R₆ | R₇ | R₈ | R₉ | R₁₀ | Z | Center metal | Counter ion |
|---|---|---|---|---|---|---|---|---|---|---|---|---|---|
| I-86 | H | N(C₂H₅)₂ | CH₃ | H | H | H | H | H | H | H | OH | Co | BF₄⁻ |
| I-87 | H | N(C₂H₅)₂ | CH₃ | H | NO₂ | H | H | H | H | H | OH | Ni | PF₆⁻ |
| I-88 | H | N(C₂H₅)₂ | CH₃ | H | H | H | NO₂ | H | H | H | OH | Ni | PF₆⁻ |
| I-89 | H | N(C₂H₅)₂ | CH₃ | H | Cl | H | Cl | H | H | H | OH | Mn | ClO₄⁻ |
| I-90 | H | N(C₂H₅)₂ | C₂H₅ | H | H | H | H | H | H | H | OH | Co | BF₄⁻ |
| I-91 | H | N(C₂H₅)₂ | C₂H₅ | H | NO₂ | H | H | H | H | H | OH | Ni | PF₆⁻ |
| I-92 | H | N(C₂H₅)₂ | C₂H₅ | H | H | H | NO₂ | H | H | H | OH | Ni | PF₆⁻ |
| I-93 | H | N(C₂H₅)₂ | C₂H₅ | H | Br | H | H | H | H | H | OH | Co | ClO₄⁻ |
| I-94 | H | N(C₂H₅)₂ | t-C₄H₉ | H | H | H | H | H | H | H | OH | Co | BF₄⁻ |
| I-95 | H | N(C₂H₅)₂ | t-C₄H₉ | H | NO₂ | H | H | H | H | H | OH | Ni | BF₄⁻ |
| I-96 | H | N(C₂H₅)₂ | t-C₄H₉ | H | H | H | NO₂ | H | H | H | OH | Ni | PF₆⁻ |
| I-97 | H | N(C₂H₅)₂ | t-C₄H₉ | H | Br | H | H | H | H | H | OH | Co | ClO₄⁻ |
| I-98 | H | N(CH₃)₂ | —CH(CH₃)—C₂H₅ | H | H | H | H | H | H | H | OH | Co | BF₄⁻ |

-continued

| Dye No. | R₁ | R₂ | R₃ | R₄ | R₅ | R₆ | R₇ | R₈ | R₉ | R₁₀ | Z | Center metal | Counter ion |
|---|---|---|---|---|---|---|---|---|---|---|---|---|---|
| I-99 | H | N(CH₃)₂ | —CH(CH₃)—C₂H₅ | H | NO₂ | H | H | H | H | H | OH | Ni | PF₆⁻ |
| I-100 | H | N(CH₃)₂ | —CH(CH₃)—C₂H₅ | H | H | H | NO₂ | H | H | H | OH | Ni | PF₆⁻ |
| I-101 | H | N(CH₃)₂ | —CH(CH₃)—C₂H₅ | H | Cl | H | Cl | H | H | H | COOH | Mn | ClO₄⁻ |
| I-102 | H | N(C₂H₅)₂ | OCH₃ | H | H | H | H | H | H | H | OH | Co | PF₆⁻ |
| I-103 | H | N(C₂H₅)₂ | OCH₃ | H | NO₂ | H | H | H | H | H | COOH | Ni | BF₄⁻ |
| I-104 | H | N(C₂H₅)₂ | OCH₃ | H | H | H | NO₂ | H | H | H | COOH | Ni | BF₄⁻ |
| I-105 | H | N(C₂H₅)₂ | OC₂H₅ | H | H | H | H | H | H | H | OH | Co | BF₄⁻ |
| I-106 | H | N(C₂H₅)₂ | OC₂H₅ | H | H | H | NO₂ | H | H | C₂H₅ | COOH | Mn | BF₄⁻ |
| I-107 | H | N(C₂H₅)₂ | CH₃ | CH₃ | H | H | H | H | H | H | OH | Co | BF₄⁻ |
| I-108 | H | N(C₂H₅)₂ | CH₃ | CH₃ | NO₂ | H | H | H | H | H | NH₂ | Ni | PF₆⁻ |
| I-109 | H | N(C₂H₅)₂ | CH₃ | CH₃ | H | H | NO₂ | H | H | H | NH₂ | Ni | PF₆⁻ |
| I-110 | H | N(CH₃)₂ | C₂H₅ | CH₃ | H | H | H | H | H | H | OH | Co | BF₄⁻ |
| I-111 | H | N(CH₃)₂ | C₂H₅ | CH₃ | NO₂ | H | H | H | H | H | NH₂ | Ni | PF₆⁻ |

-continued

| Dye No. | R₁ | R₂ | R₃ | R₄ | R₅ | R₆ | R₇ | R₈ | R₉ | R₁₀ | Z | Center metal | Counter ion |
|---|---|---|---|---|---|---|---|---|---|---|---|---|---|
| I-112 | H | N(CH₃)(CH₃) | C₂H₅ | CH₃ | H | H | NO₂ | H | H | H | NH₂ | Ni | PF₆⁻ |
| I-113 | H | N(C₂H₅)(C₂H₅) | H | CH₃ | H | H | H | H | H | H | OH | Co | BF₄⁻ |
| I-114 | H | N(C₂H₅)(C₂H₅) | H | CH₃ | NO₂ | H | H | H | H | H | OH | Ni | PF₆⁻ |
| I-115 | H | N(C₂H₅)(C₂H₅) | H | CH₃ | H | H | Cl | H | H | H | OH | Ni | PF₆⁻ |
| I-116 | H | N(C₂H₅)(C₂H₅) | H | CH₃ | H | H | CN | H | H | H | OH | Co | ClO₄⁻ |
| I-117 | H | N(C₂H₅)(C₂H₅) | H | C₂H₅ | H | H | H | H | H | H | OH | Co | BF₄⁻ |
| I-118 | H | N(C₂H₅)(C₂H₅) | H | C₂H₅ | NO₂ | H | H | H | H | H | OH | Ni | PF₆⁻ |
| I-119 | H | N(C₂H₅)(C₂H₅) | H | C₂H₅ | H | H | NO₂ | H | H | H | OH | Ni | PF₆⁻ |
| I-120 | H | N(CH₃)(CH₃) | H | t-C₄H₉ | H | H | H | H | H | H | OH | Co | BF₄⁻ |
| I-121 | H | N(CH₃)(CH₃) | H | t-C₄H₉ | NO₂ | H | H | H | H | H | OH | Ni | PF₆⁻ |
| I-122 | H | N(CH₃)(CH₃) | H | t-C₄H₉ | Br | H | H | H | H | H | OH | Co | BF₄⁻ |
| I-123 | H | N(CH₃)(CH₃) | H | t-C₄H₉ | NO₂ | H | H | H | H | CH₃ | OH | Ni | PF₆⁻ |
| I-124 | H | N(CH₃)(CH₃) | H | —CH(CH₃)—C₂H₅ | H | H | H | H | H | H | OH | Co | BF₄⁻ |

-continued

| Dye No. | R₁ | R₂ | R₃ | R₄ | R₅ | R₆ | R₇ | R₈ | R₉ | R₁₀ | Z | Center metal | Counter ion |
|---|---|---|---|---|---|---|---|---|---|---|---|---|---|
| I-125 | H | N(C₂H₅)₂ | H | OCH₃ | H | H | H | H | H | H | OH | Co | PF₆⁻ |
| I-126 | H | N(C₂H₅)₂ | H | OCH₃ | H | H | NO₂ | H | H | H | OH | Ni | PF₆⁻ |
| I-127 | H | N(C₂H₅)₂ | H | OC₂H₅ | H | H | H | H | H | H | OH | Co | BF₄⁻ |
| I-128 | H | N(C₂H₅)₂ | H | OC₂H₅ | H | H | NO₂ | H | H | H | OH | Ni | PF₆⁻ |
| I-129 | H | N(CH₃)₂ | H | OC₄H₉ | H | H | H | H | H | H | OH | Co | BF₄⁻ |
| I-130 | H | N(CH₃)₂ | H | OC₄H₉ | NO₂ | H | H | H | H | H | OH | Ni | PF₆⁻ |
| I-131 | H | N(CH₃)₂ | H | OC₄H₉ | H | H | NO₂ | H | H | H | OH | Ni | PF₆⁻ |
| I-132 | H | N(C₂H₅)₂ | F | H | H | H | H | H | H | H | OH | Co | ClO₄⁻ |
| I-133 | H | N(C₂H₅)₂ | Br | H | H | H | H | H | H | H | OH | Co | BF₄⁻ |
| I-134 | H | N(C₂H₅)₂ | Br | H | NO₂ | H | H | H | H | H | OH | Ni | PF₆⁻ |
| I-135 | H | N(C₂H₅)₂ | Br | H | H | H | NO₂ | H | H | H | OH | Ni | PF₆⁻ |
| I-136 | H | N(C₂H₅)₂ | Cl | H | H | H | H | H | H | H | OH | Co | BF₄⁻ |
| I-137 | H | N(C₂H₅)₂ | Cl | H | H | H | NO₂ | H | H | H | OH | Ni | PF₆⁻ |

-continued

| Dye No. | R₁ | R₂ | R₃ | R₄ | R₅ | R₆ | R₇ | R₈ | R₉ | R₁₀ | Z | Center metal | Counter ion |
|---|---|---|---|---|---|---|---|---|---|---|---|---|---|
| I-138 | H | N(C₂H₅)₂ | H | F | H | H | H | H | H | H | OH | Ni | BF₄⁻ |
| I-139 | H | N(C₂H₅)₂ | H | F | H | H | NO₂ | H | H | H | OH | Ni | BF₄⁻ |
| I-140 | H | N(C₂H₅)₂ | H | Br | H | H | H | H | H | H | OH | Co | BF₄⁻ |
| I-141 | H | N(C₂H₅)₂ | H | Br | NO₂ | H | H | H | H | H | OH | Ni | BF₄⁻ |
| I-142 | H | N(C₂H₅)₂ | H | Br | H | H | NO₂ | H | H | H | OH | Ni | BF₄⁻ |
| I-143 | H | N(C₂H₅)₂ | H | Cl | H | H | H | H | H | H | OH | Co | BF₄⁻ |
| I-144 | H | N(C₂H₅)₂ | H | Cl | NO₂ | H | H | H | H | H | OH | Ni | BF₄⁻ |
| I-145 | H | N(C₂H₅)₂ | H | Cl | H | H | NO₂ | H | H | H | OH | Ni | BF₄⁻ |
| I-146 | H | N(C₂H₅)₂ | R₃ and R₄ form a fused benzene ring | | H | H | H | H | H | H | OH | Ni | Cl⁻ |
| I-147 | H | N(C₂H₅)₂ | R₃ and R₄ form a fused benzene ring | | NO₂ | H | H | H | H | H | COOH | Co | ClO₄⁻ |
| I-148 | H | N(C₂H₅)₂ | R₃ and R₄ form a fused benzene ring | | H | H | NO₂ | H | H | H | COOH | Co | ClO₄⁻ |
| I-149 | H | N(C₂H₅)₂ | R₃ and R₄ form a fused benzene ring | | Cl | H | Cl | H | H | H | COOH | Co | ClO₄⁻ |
| I-150 | H | N(C₂H₅)₂ | R₃ and R₄ form a fused benzene ring | | H | H | H | H | H | CH₃ | OH | Ni | ClO₄⁻ |

-continued

| Dye No. | R₁ | R₂ | R₃ | R₄ | R₅ | R₆ | R₇ | R₈ | R₉ | R₁₀ | Z | Center metal | Counter ion |
|---|---|---|---|---|---|---|---|---|---|---|---|---|---|
| I-151 | H | N(C₄H₉)₂ | R₃ and R₄ form a fused benzene ring | | H | H | H | H | H | H | OH | Ni | Cl⁻ |
| I-152 | H | N(C₄H₉)₂ | R₃ and R₄ form a fused benzene ring | | NO₂ | H | H | H | H | H | COOH | Co | ClO₄⁻ |
| I-153 | H | N(C₄H₉)₂ | R₃ and R₄ form a fused benzene ring | | H | H | NO₂ | H | H | H | COOH | Co | ClO₄⁻ |
| I-154 | H | N(CH₃)₂ | OCH₂CF₃CF₃ | H | H | H | H | H | H | H | OH | Co | PF₆⁻ |
| I-155 | H | N(CH₃)₂ | OCH₃CF₃CF₃ | H | H | H | NO₂ | H | H | H | OH | Ni | PF₆⁻ |
| I-156 | H | N(CH₃)₂ | H | OCH₂CF2CF₃ | H | H | H | H | H | H | OH | Co | PF₆⁻ |
| I-157 | H | N(CH₃)₂ | H | OCH₃CF₃CF₃ | H | H | NO₂ | H | H | H | OH | Ni | PF₆⁻ |
| I-158 | H | N(C₂H₅)₂ | H | —C(=O)—CH₃ | H | H | H | H | H | H | OH | Co | BF₄⁻ |
| I-159 | H | N(C₂H₅)₂ | H | —C(=O)—CH₃ | NO₂ | H | H | H | H | H | OH | Ni | ClO₄⁻ |
| I-160 | H | N(C₂H₅)₂ | H | —C(=O)—CH₃ | H | H | NO₂ | H | H | H | OH | Ni | ClO₄⁻ |
| I-161 | H | N(C₂H₅)₂ | —C(=O)—CH₃ | H | H | H | H | H | H | H | OH | Co | PF₆⁻ |
| I-162 | H | N(C₂H₅)₂ | —C(=O)—CH₃ | H | H | H | NO₂ | H | H | H | OH | Ni | ClO₄⁻ |
| I-163 | H | N(C₂H₅)₂ | —OPh | H | H | H | H | H | H | H | OH | Co | BF₄⁻ |

-continued

| Dye No. | R$_1$ | R$_2$ | R$_3$ | R$_4$ | R$_5$ | R$_6$ | R$_7$ | R$_8$ | R$_9$ | R$_{10}$ | Z | Center metal | Counter ion |
|---|---|---|---|---|---|---|---|---|---|---|---|---|---|
| I-164 | H | N(C$_2$H$_5$)$_2$ | H | H | H | H | H | H | H | H | SO$_3$H | Co | BF$_4^-$ |
| I-165 | H | N(C$_2$H$_5$)$_2$ | H | H | H | H | CF$_3$ | H | H | H | OH | Co | BF$_4^-$ |
| I-166 | H | CH$_3$ | H | H | H | H | H | H | H | H | OH | Co | BF$_4^-$ |
| I-167 | H | OCH$_3$ | H | H | H | H | H | H | H | H | OH | Co | BF$_4^-$ |
| I-168 | H | OPh | H | H | H | H | H | H | H | H | OH | Co | BF$_4^-$ |
| I-169 | H | N(C$_2$H$_5$)$_2$ | H | H | H | H | H | H | H | H | OH | Ti | BF$_4^-$ |
| I-170 | H | N(C$_2$H$_5$)$_2$ | H | H | H | H | H | H | H | H | OH | V | BF$_4^-$ |
| I-171 | H | N(C$_2$H$_5$)$_2$ | H | H | H | H | H | H | H | H | OH | Zn | BF$_4^-$ |
| I-172 | H | N(C$_2$H$_5$)$_2$ | H | H | H | H | H | H | H | H | OH | Mo | BF$_4^-$ |
| I-173 | H | N(C$_2$H$_5$)$_2$ | H | H | H | H | H | H | H | H | OH | W | BF$_4^-$ |
| I-174 | H | N(C$_2$H$_5$)$_2$ | H | H | H | H | H | H | H | H | OH | Ru | BF$_4^-$ |
| I-175 | H | N(C$_2$H$_5$)$_2$ | H | H | H | H | H | H | H | H | OH | Fe | BF$_4^-$ |
| I-176 | H | N(C$_2$H$_5$)$_2$ | H | H | H | H | H | H | H | H | OH | Pd | BF$_4^-$ |
| I-177 | H | N(C$_2$H$_5$)$_2$ | H | H | H | H | H | H | H | H | OH | Pt | BF$_4^-$ |
| I-178 | H | N(C$_2$H$_5$)$_2$ | H | H | H | H | H | H | H | H | OH | Al | BF$_4^-$ |
| I-179 | H | N(C$_2$H$_5$)$_2$ | H | —OPh | H | H | H | H | H | H | OH | Co | BF$_4^-$ |

-continued

| Dye No. | Azo compound ||||||||||| Center metal | Counter ion |
| --- | --- | --- | --- | --- | --- | --- | --- | --- | --- | --- | --- | --- | --- |
| | $R_1$ | $R_2$ | $R_3$ | $R_4$ | $R_5$ | $R_6$ | $R_7$ | $R_8$ | $R_9$ | $R_{10}$ | Z | | |
| I-180 | H | N(C₂H₅)₂ | —Ph | H | H | H | H | H | H | H | OH | Co | $BF_4^-$ |
| I-181 | H | N(C₂H₅)₂ | H | —Ph | H | H | H | H | H | H | OH | Co | $BF_4^-$ |
| I-182 | H | N(C₂H₅)₂ | —CONH₂ | H | H | H | H | H | H | H | OH | Co | $BF_4^-$ |
| I-183 | H | N(C₂H₅)₂ | H | —CONH₂ | H | H | H | H | H | H | OH | Co | $BF_4^-$ |
| I-184 | H | N(C₂H₅)₂ | —COOCH₃ | H | H | H | H | H | H | H | OH | Co | $BF_4^-$ |
| I-185 | H | N(C₂H₅)₂ | H | —COOCH₃ | H | H | H | H | H | H | OH | Co | $BF_4^-$ |
| I-186 | H | N(C₂H₅)₂ | H | H | H | H | H | H | H | H | OH | Co | $Cl^-$ |
| I-187 | H | N(CH₃)₂ | H | H | H | H | H | H | H | H | COOH | Co | $Cl^-$ |
| I-188 | H | N(C₂H₅)₂ | H | H | H | H | NO₂ | H | H | H | OH | Co | $Cl^-$ |
| I-189 | H | N(C₂H₅)₂ | H | H | H | H | H | H | H | H | NH₂ | Co | $Cl^-$ |
| I-190 | CH₃ | N(C₂H₅)₂ | H | H | Cl | H | H | H | H | H | OH | Co | $Cl^-$ |
| I-191 | H | N(CH₃)₂ | H | H | H | H | H | H | H | H | OH | Co | $CH_3COCH=C(CH_3)O^-$ |
| I-192 | H | N(CH₃)₂ | H | H | H | H | H | H | H | H | OH | VO | $CH_3COCH=C(CH_3)O^-$ |

-continued

| Dye No. | R₁ | R₂ | R₃ | R₄ | R₅ | R₆ | R₇ | R₈ | R₉ | R₁₀ | Z | Center metal | Counter ion |
|---|---|---|---|---|---|---|---|---|---|---|---|---|---|
| I-193 | H | N(C₂H₅)₂ | H | H | H | H | H | H | H | H | OH | Co | $CH_3COCH=C(CH_3)O^-$ |
| I-194 | H | N(C₂H₅)₂ | H | H | H | H | H | H | H | H | OH | Cr | $CH_3COCH=C(CH_3)O^-$ |
| I-195 | H | N(C₃H₇)₂ | H | H | H | H | H | H | H | H | OH | Co | $CH_3COCH=C(CH_3)O^-$ |
| I-196 | H | N(C₃H₇)₂ | H | H | H | H | H | H | H | H | OH | Fe | $CH_3COCH=C(CH_3)O^-$ |
| I-197 | H | N(C₄H₉)₂ | H | H | H | H | H | H | H | H | OH | Co | $CH_3COCH=C(CH_3)O^-$ |
| I-198 | H | N(C₄H₉)₂ | H | H | H | H | H | H | H | H | OH | VO | $CH_3COCH=C(CH_3)O^-$ |
| I-199 | H | N(C₂H₅)₂ | H | H | H | H | H | H | H | H | SO₂NH₂ | Co | $CH_3COCH=C(CH_3)O^-$ |
| I-200 | H | N(C₂H₅)₂ | H | H | H | H | H | H | H | H | NH₂ | Co | $CH_3COCH=C(CH_3)O^-$ |
| I-201 | H | N(C₂H₅)₂ | H | H | H | H | H | H | H | H | COOH | Co | $CH_3COCH=C(CH_3)O^-$ |
| I-202 | H | N(CH₃)(C₂H₅) | H | H | H | H | H | H | H | H | OH | Co | $BF_4^-$ |
| I-203 | H | N(CH₃)(C₂H₅) | H | H | H | H | H | H | H | H | OH | Co | $ClO_4^-$ |
| I-204 | H | N(CH₃)(C₃H₇) | H | H | H | H | H | H | H | H | OH | Co | $BF_4^-$ |
| I-205 | H | N(CH₃)(C₃H₇) | H | H | H | H | H | H | H | H | OH | Ni | $BF_4^-$ |

-continued

| Dye No. | R$_1$ | R$_2$ | R$_3$ | R$_4$ | R$_5$ | R$_6$ | R$_7$ | R$_8$ | R$_9$ | R$_{10}$ | Z | Center metal | Counter ion |
|---|---|---|---|---|---|---|---|---|---|---|---|---|---|
| I-206 | H | N(CH$_3$)(C$_3$H$_7$) | H | H | H | H | H | H | H | H | COOH | Co | ClO$_4^-$ |
| I-207 | H | N(CH$_3$)(C$_4$H$_9$) | H | H | H | H | H | H | H | H | OH | Co | Cl$^-$ |
| I-208 | H | N(C$_2$H$_5$)(C$_3$H$_7$) | H | H | H | H | H | H | H | H | OH | Co | PF$_6^-$ |
| I-209 | H | N(C$_2$H$_5$)(C$_3$H$_7$) | H | H | H | H | H | H | H | H | NH$_2$ | Co | BF$_4^-$ |
| I-210 | H | N(C$_2$H$_5$)(C$_4$H$_9$) | H | H | H | H | H | H | H | H | SO$_2$NH$_2$ | Co | PF$_6^-$ |
| I-211 | H | N(C$_2$H$_5$)(C$_4$H$_9$) | H | H | H | H | H | H | H | H | NH$_2$ | Ni | ClO$_4^-$ |
| I-212 | H | N(C$_2$H$_5$)(C$_4$H$_9$) | H | H | H | H | H | H | H | H | OH | Co | CH$_3$COCH=C(CH$_3$)O$^-$ |

The azo compounds used herein can be synthesized in accordance with the disclosure of H. Hoshino, T. Yotsuyanagi, Bunseki Kagaku, 31, E435 (1982), S. Shibata, M. Furukawa, R. Nakashima, Anal. Chim. Acta, 81, 131 (1976) and the references cited in these articles.

The compounds can be identified by a mass spectrum, $^1$H-nuclear magnetic resonance spectrum, infrared absorption spectrum, etc.

Further, the azo metal complex dyes can be obtained by reacting azo compounds as mentioned above with metal salts in non-aqueous solvents such as alcohols (e.g., methanol and ethanol) and ketones (e.g., acetone). The metal salts which are generally used herein include chlorides (for example, cobalt chloride, zinc chloride, chromium chloride, manganese chloride, iron chloride, and vanadium oxytrichloride), acetates (for example, nickel acetate and copper acetate), and acetylacetonato complex salts (for example, acetylacetonatocobalt (III) salt). Complex forming reaction is generally carried out at a temperature from room temperature to about 100° C. for 3 minutes to 1½ hours although in some cases, reaction instantaneously takes place around room temperature (15° to 30° C.). Formation of a complex can be acknowledged by color development of the solution. The complex may be obtained as a solid matter by crystallization, which can be identified by a visible/ultraviolet absorption spectrum, infrared absorption spectrum, mass spectrum, etc.

Where the thus obtained azo metal complex dye has a counter ion, that counter ion originates from a starting metal salt used in synthesis (for example, Cl$^-$ and CH$_3$COO$^-$). In some cases, salt exchange is preferably carried out to exchange the counter ion with another ion such as ClO$_4^-$, BF$_4^-$ and PF$_6^-$. The salt exchange may be carried out, for example, by using a perchlorate salt (e.g., sodium perchlorate, ammonium perchlorate, and magnesium perchlorate), tetrafluoroborate salt (e.g., sodium tetrafluoroborate and ammonium tetrafluoroborate), and hexafluorophosphate salt (e.g., potassium hexafluorophosphate and ammonium hexafluorophosphate), dissolving the salt in a solvent such as methanol and ethanol to form a solution of 0.5 to 4% by weight, adding the azo metal complex dye to the solution in such an amount that the ratio of the dye to the salt (dye/salt molar ratio) may range from 1/0.5 to 1/2, and agitating the solution. Thereafter, the product is crystallized.

The product can be identified by a visible/ultraviolet absorption spectrum, mass spectrum, fluorescent X-ray analysis, etc.

Synthesis examples are shown below.

Synthesis Example 1

Synthesis of dye No. I-186
Synthesis of azo compound: 2-(8-quinolylazo)-5-(N,N-diethylamino) phenol Conc. sulfuric acid, 3.5 ml, was diluted with 16 ml of water, and 2.88 grams (20 mmol) of pale yellow 8-aminoquinoline was dissolved therein to form an orange aqueous solution. While the solution was cooled below 5° C.

in an ice bath, with stirring, 1.40 grams (20 mmol) of sodium nitrite in 15 ml of water was slowly added to the solution for diazotation. As the aqueous solution of sodium nitrite was added, a red insoluble matter precipitated. The reaction solution turned greenish when 90% of the aqueous solution had been added and became a black brown, insoluble matter-free solution when the entire amount had been added. The solution was agitated for a further 30 minutes.

In 6 ml of ethanol was dissolved 3.30 grams (20 mmol) of 3-diethylaminophenol. While cooling at 3° to 5° C., this solution was slowly added to the above-obtained diazonium salt aqueous solution for coupling reaction. The reaction solution turned red brown. It became an entirely homogeneous solution as the insoluble diazonium salt slowly disappeared. After the entire amount had been added, the solution was agitated for a further 1 hour in an ice bath.

Sodium acetate was added to the solution, allowing a precipitate to settle. The precipitate was collected by suction filtration and an ethanol soluble component was extracted therefrom. The solution was concentrated and evaporated to dryness by a rotary evaporator. Further vacuum drying yielded crystals having green metallic luster (yield 62.5%).

Mass analysis ($M^+$): 320

Synthesis of Co complex

The above-obtained azo compound, 0.25 gram (0.8 mmol), was dissolved in 5 ml of methanol, to which 0.12 gram (0.5 mmol) of cobalt chloride hexahydrate was added. The solution was stirred for 5 minutes. The solution developed red purple color in an instant. Water, 30 ml, was added to the methanol solution, allowing the complex to precipitate, which was collected by suction filtration. The crude product was washed with a small amount of water and heat dried in vacuum at 60° C. for one hour. There was obtained 0.13 gram (yield 52%) of a Co complex having deep green metallic luster. The complex was subject to fluorescent X-ray analysis to find that the molar ratio Cl/Co of chlorine atom to cobalt atom in a molecule was 1.09, confirming the presence of one $Cl^-$ ion per complex molecule.

Synthesis Example 2

Synthesis of dye No. I-1

In 5 ml of methanol was dissolved 0.12 gram of dye No. I-186 (counter ion $Cl^-$) obtained in Synthesis Example 1. Ammonium tetrafluoroborate, 0.1 gram (1.0 mmol), was added to the solution, which was stirred for 5 minutes. Water, 30 ml, was added to the methanol solution, allowing the complex to precipitate, which was collected by suction filtration. The crude product was washed with a small amount of water and heat dried in vacuum at 60° C. overnight. After column purification using alumina (developer: ethanol), the end fraction was evaporated to dryness by an evaporator and heat dried in vacuum at 60° C. overnight. There was obtained 0.06 gram of the end product having deep green metallic luster. The product was subject to fluorescent X-ray analysis to find that the molar ratio F/Co of fluorine atom to cobalt atom in a molecule was 4.10, confirming the presence of one $BF_4^-$ ion per complex molecule.

Synthesis Example 3

Synthesis of dye No. I-2

The end product in the form of a $PF_6^-$ salt was obtained by using dye No. I-186 (counter ion $Cl^-$) obtained in Synthesis Example 1 as a starting material and repeating the procedure of Synthesis Example 2 for $BF_4^-$ salt except that potassium hexafluorophosphate was used as a salt exchange reagent.

Synthesis Example 4

Synthesis of dye No. I-3

The end product in the form of a $ClO_4^-$ salt was obtained by using dye No. I-186 (counter ion $Cl^-$) obtained in Synthesis Example 1 as a starting material and repeating the procedure of Synthesis Example 2 for $BF_4^-$ salt except that sodium perchlorate monohydrate was used as a salt exchange reagent.

Synthesis Example 5

Synthesis of dye No. I-5

Synthesis of Ni complex

The azo compound obtained in Synthesis Example 1, 0.61 gram (1.9 mmol), was dissolved in 20 ml of ethanol, to which 0.30 grams (1.2 mmol) of nickel acetate tetrahydrate was added. The solution was refluxed at 80° C. for 1 hour. The solution developed red purple color. Water, 50 ml, was added to the ethanol solution, allowing the complex to precipitate, which was collected by suction filtration. The crude product was washed with a small amount of water and heat dried in vacuum at 60° C. for one hour. There was obtained 0.35 gram (yield 57%) of a Ni complex having black metallic luster.

Synthesis of $BF_4^-$ salt

In 5 ml of methanol was dissolved 0.34 gram of the above-obtained Ni complex (counter ion $CH_3COO^-$). Ammonium tetrafluoroborate, 0.1 gram (1.0 mmol), was added to the solution, which was stirred for 5 minutes. Water, 30 ml, was added to the methanol solution, allowing the complex to precipitate, which was collected by suction filtration. The crude product was washed with a small amount of water and heat dried in vacuum at 60° C. overnight. After column purification using alumina (developer: ethanol), the end fraction was evaporated to dryness by an evaporator and heat dried in vacuum at 60° C. overnight. There was obtained 0.18 gram of the end product having black metallic luster. The product was subject to fluorescent X-ray analysis to find that the molar ratio F/Ni of fluorine atom to nickel atom in a molecule was 4.02, confirming the presence of one $BF_4^-$ ion per complex molecule.

Synthesis Example 6

Synthesis of dye No. I-32

Synthesis of azo compound: 2-(8-quinolylazo)-5-(N,N-diethylamino)benzoic acid

Conc. sulfuric acid, 3.5 ml, was diluted with 16 ml of water, and 2.88 grams (20 mmol) of pale yellow 8-aminoquinoline was dissolved therein to form an orange aqueous solution. While the solution was cooled below 5° C. in an ice bath, with stirring, 1.40 grams (20 mmol) of sodium nitrite in 15 ml of water was slowly added to the solution for diazotation. As the aqueous solution of sodium nitrite was added, a red insoluble matter precipitated. The reaction solution turned green when 90% of the aqueous solution had been added and became a black brown, insoluble matter-free solution when the entire amount had been added. The solution was agitated for a further 30 minutes.

In a mixture of 5 ml of water, 10 ml of dioxane, and 10 ml of ethanol was dissolved 3.30 grams (20 mmol) of 3-(N,N-dimethylamino)benzoic acid. The solution was made alkaline by adding 4.30 grams (77 mmol) of potassium hydroxide. While cooling at 3° to 8° C., this solution was slowly added to the above-obtained diazonium salt aqueous solution for coupling reaction. The reaction solution turned red brown. After the entire amount had been added, the solution was agitated for a further 1 hour in an ice bath whereupon a black paste-like insoluble matter precipitated.

After sodium acetate was added to the solution for neutralization, the solid matter was collected by suction filtration and an ethanol soluble component was extracted therefrom. The solution was concentrated and evaporated to dryness by a rotary evaporator. Further vacuum drying yielded black brown crystals (yield 63.0%).

Mass analysis ($M^+$): 321
Synthesis of Ni complex

The above-obtained azo compound, 0.60 gram (1.9 mmol), was dissolved in 20 ml of ethanol, to which 0.30 gram (1.2 mmol) of nickel acetate tetrahydrate was added. The solution was stirred for 5 minutes. The solution developed red purple color in an instant. Water, 50 ml, was added to the ethanol solution, allowing the complex to precipitate, which was collected by suction filtration. The crude product was washed with a small amount of water and heat dried in vacuum at 60° C. for one hour. There was obtained 0.41 gram (yield 68%) of a Ni complex having black metallic luster.

Synthesis of $BF_4^-$ salt

The end product was obtained as in Synthesis Example 5 for the synthesis of $BF_4^-$ salt.

Synthesis Example 7

Synthesis of dye No. I-187

The end product was obtained as in Synthesis Example 1 except that the azo compound of Synthesis Example 6 was used.

Synthesis Example 8

Synthesis of dye No. I-33

The end product was obtained as in Synthesis Example 2 except that dye No. I-187 obtained in Synthesis Example 7 was used.

Synthesis Example 9

Synthesis of dye No. I-188
Synthesis of azo compound: 2-(5-nitro-8-quinolylazo)-5-(N,N-diethylamino)phenol Conc. sulfuric acid, 11.6 ml, was diluted with 20 ml of water, and 3.8 grams (20 mmol) of yellow 5-nitro-8-aminoquinoline was dissolved therein. For enhancing solubility, 10 ml of 2-methoxyethanol was added thereto to completely dissolve 5-nitro-8-aminoquinoline. While the solution was cooled below 5° C. in an ice bath, with stirring, 1.40 grams (20 mmol) of sodium nitrite in 15 ml of water was slowly added to the solution for diazotation. After the dropwise addition of sodium nitrite, the solution was agitated for a further 30 minutes.

In a mixture of 10 ml of water and 20 ml of ethanol was dissolved 3.30 grams (20 mmol) of 3-diethylaminophenol. The solution was made alkaline by adding 4.0 grams (100 mmol) of sodium hydroxide. While cooling at 3° to 8° C., this solution was slowly added to the above-obtained diazonium salt aqueous solution for coupling reaction. After the entire amount had been added, the solution was agitated for a further 1 hour. Sodium acetate was added to the solution for neutralization. The precipitated solid was collected by suction filtration and an ethanol soluble component was extracted therefrom. The solution was concentrated and evaporated to dryness by a rotary evaporator. Further vacuum drying at 60° C. yielded black crystals.

Mass analysis ($M^+$): 365

Using the above-obtained azo compound, the end product was obtained as in Synthesis Example 1.

Synthesis Example 10

Synthesis of dye No. I-12

The end product was obtained as in Synthesis Example 2 except that dye No. I-188 obtained in Synthesis Example 9 was used.

Synthesis Example 11

Synthesis of dye No. I-189
Synthesis of azo compound: 2-(8-quinolylazo)-5-(N,N-diethylamino)aniline Conc. sulfuric acid, 3.5 ml, was diluted with 16 ml of water, and 2.88 grams (20 mmol) of 8-aminoquinoline was dissolved therein. While the solution was cooled below 5° C. in an ice bath, with stirring, 1.40 grams (20 mmol) of sodium nitrite in 15 ml of water was slowly added to the solution for diazotation. After the entire amount was added, the solution was agitated for a further 30 minutes.

In 10 ml of methanol was dissolved 3.28 grams (20 mmol) of 3-dimethylaminoaniline. While cooling at 3° to 5° C., this solution was slowly added to the above-obtained diazonium salt aqueous solution for coupling reaction. After the entire amount was added, the solution was agitated for a further 1 hour in an ice bath.

Sodium hydroxide was added to the solution for neutralization, water was added for dilution, and sodium chloride was added for salting out. The precipitate thus settled was collected by suction filtration and an ethanol soluble component was extracted therefrom. The solution was concentrated and evaporated to dryness by a rotary evaporator. Further vacuum drying yielded crystals having green metallic luster (yield 58.3%).

Mass analysis ($M^+$): 319
Synthesis of Co complex

The above-obtained azo compound, 0.25 gram (0.8 mmol), was dissolved in 5 ml of ethanol, to which 0.12 gram (0.5 mmol) of cobalt chloride hexahydrate was added. The solution was stirred for 30 minutes while heating at 60° C. The solution developed red purple color. Water, 30 ml, was added to the ethanol solution, allowing the complex to precipitate, which was collected by suction filtration. The crude product was washed with a small amount of water and heat dried in vacuum at 60° C. for one hour. There was obtained 0.18 gram of a Co complex having deep green metallic luster.

Synthesis Example 12

Synthesis of dye No. I-8

The end product was obtained as in Synthesis Example 2 except that dye No. I-189 obtained in Synthesis Example 11 was used.

Synthesis Example 13

Synthesis of dye No. I-190
Synthesis of azo compound: 2-(7-chloro-8-quinolylazo)-5-(N,N-diethylamino)-6-methylphenol To a mixture of 11.5 ml of conc. sulfuric acid, 20 ml of water, and 15 ml of dioxane was added 3.58 grams (20 mmol) of 7-chloro-8-aminoquinoline. While heating at 60° C., the solids were completely dissolved. While the solution was cooled below 5° C. in an ice bath, with stirring, 1.40 grams (20 mmol) of sodium nitrite in 15 ml of water was slowly added to the solution for diazotation. After the entire amount was added, the solution was agitated for a further 30 minutes.

In 10 ml of ethanol was dissolved 3.58 grams (20 mmol) of 2-methyl-3-diethylaminophenol. While cooling at 3° to 5° C., this solution was slowly added to the above-obtained diazonium salt aqueous solution for coupling reaction. After the entire amount was added, the solution was agitated for a further 1 hour in an ice bath.

Sodium hydroxide was added to the solution for neutralization. The precipitated solid was collected by suction filtration and an ethanol soluble component was extracted therefrom. The solution was concentrated and evaporated to dryness by a rotary evaporator. Further vacuum drying yielded crystals having black metallic luster (yield 71%).

Mass analysis (M$^+$): 367

Using the above-obtained azo compound, the Co complex (counter ion Cl$^-$) was obtained as in Synthesis Example 1.

Synthesis Example 14

Synthesis of dye No. I-82

Using dye No. I-190 as a starting material and sodium perchlorate monohydrate as a salt exchange reagent, the end product in the form of a ClO$_4^-$ salt was obtained as in Synthesis Example 4.

Other exemplified compounds were similarly synthesized and identified.

The azo metal complex dyes according to the invention have a melting point (mp) of 150° to 320° C. and λmax in ethanol in the range of 480 to 620 nm.

When these azo metal complex dyes are used in a recording layer of an optical recording medium, they may be used alone or in admixture of two or more. If two or more compounds in which the azo compound has a different coordination number or the type of other ligand is different are produced during the synthesis process, they may be used without isolation.

Further, these dyes have a complex index of refraction at 635 nm or 650 nm whose real part n is 2.00 to 2.40 and imaginary part k is 0.01 to 0.40.

It is noted that n and k of a dye are determined by preparing a test sample in which a dye film is formed on a given transparent substrate to a thickness equivalent to the recording layer of an optical recording medium, for example, of about 40 to 100 nm under the same conditions as used for the recording layer, measuring the test sample for reflectance and transmittance at 635 nm or 650 nm, and calculating n and k from these measurements according to Ishiguro Kozo, "Optics," Kyoritsu Publishing K.K., pages 168–178, for example. The reflectance is a reflectance of the test sample through the substrate or a reflectance of the sample from the dye film side while it is measured in a specular reflection mode (of the order of 5°).

These compounds are fully soluble in organic solvents and have an increased solubility in a coating solvent which does not attack polycarbonate (PC) resins commonly used in optical recording media as a substrate material.

In the second aspect of the present invention, the azo metal complex dyes used herein are those obtained by reacting a metal compound with an azo compound of the following general formula (II):

$$Q^1-N=N-Q^2 \quad (II)$$

Referring to formula (II), Q$^1$ is a 8-quinolyl radical which may have a substituent in addition to the azo radical. Exemplary substituents include halogen atoms and nitro, cyano, amino, amide, sulfonamide, carbamoyl, sulfamoyl, alkoxy, alkoxycarbonyl, acyloxy, and alkyl radicals.

Examples of the halogen atom used herein include a fluorine atom, chlorine atom, and bromine atom.

The amino radical is preferably a substituted one. Especially preferred substituted amino radicals are dialkylamio radicals. The alkyl moiety of the dialkylamino radical preferably has 1 to 12 carbon atoms, more preferably 1 to 4 carbon atoms and may be either normal or branched. Examples of the amino radical include amino and methylamino radicals although preferred examples are dimethylamino, diethylamino, dipropylamino, and dibutylamino radicals. The amino radical should preferably have 0 to 8 carbon atoms in total.

The amide radical may have an alkyl or aryl radical, and exemplary amide radicals include acetamide, propionylamide, butylylamide, and benzamide radicals. The amide radical should preferably have 2 to 7 carbon atoms in total.

The sulfonamide radical may have an alkyl or aryl radical, and exemplary sulfonamide radicals include methylsulfonylamino, ethylsulfonylamino, and phenylsulfonylamino radicals. The sulfonamide radical should preferably have 1 to 6 carbon atoms in total.

The carbamoyl radical may further have a substituent, and exemplary carbamoyl radicals include carbamoyl, methylaminocarbonyl, and dimethylaminocarbonyl radicals. The carbamoyl radical should preferably have 1 to 5 carbon atoms in total.

The sulfamoyl radical may further have a substituent, and exemplary sulfamoyl radicals include sulfamoyl, methylaminosulfonyl, and dimethylaminosulfonyl radicals. The sulfamoyl radical should preferably have 0 to 4 carbon atoms in total.

The alkoxy radical is preferably one whose alkyl moiety has 1 to 4 carbon atom in total and which may have a substituent such as halogen atoms (e.g., fluorine atoms). Examples of the alkoxy radical include methoxy, ethoxy, propoxy, butoxy, and pentafluoropropoxy radicals.

The alkoxycarbonyl radical includes, for example, methoxycarbonyl and ethoxycarbonyl radicals. The alkoxycarbonyl radical should preferably have 2 to 5 carbon atoms in total.

The acyloxy radical includes, for example, acetyloxy and propionyloxy radicals. The acyloxy radical should preferably have 2 to 5 carbon atoms in total.

The alkyl radical preferably has 1 to 12 carbon atoms in total and may be either normal or branched. A cycloalkyl radical or a radical having a cycloalkyl radical is acceptable in some cases. The alkyl radical may further have a substituent, preferred examples of which are halogen atoms (e.g., fluorine and chlorine atoms). The preferred alkyl radicals are normal and branched alkyl radicals of 1 to 4 carbon atoms in total which may have a substituent. Examples include methyl, ethyl, n-propyl, isopropyl, n-butyl, isobutyl, s-butyl, t-butyl, and trifluoromethyl radicals.

The 8-quinolyl radical represented by Q$^1$ is preferably unsubstituted. Where the 8-quinolyl radical is substituted, preferred substituents are halogen atoms, nitro radicals, and alkyl radicals among the above-mentioned substituents.

Where two or more of the above-mentioned substituents are present, they may be the same or different. The number of substituents is preferably 0 to 2.

In formula (II), $Q^2$ is a 2-imidazolyl radical. Nitrogen at the 1-position of the 2-imidazolyl radical (see formula (IIa) to be described later) has active hydrogen. The 2-imidazolyl radical may have a substituent at the 4- and/or 5-position (see formula (IIa) to be described later) in addition to the azo radical. Exemplary substituents include an alkyl radical, alkoxy radical, nitro radical, cyano radical, halogen atom, aryl radical, aryloxy radical, acyl radical, alkoxycarbonyl radical, carbamoyl radical and amino radical.

Illustrative examples of the alkyl radical, alkoxy radical, halogen atom, alkoxycarbonyl radical, carbamoyl, and amino radical which can be used herein are the same as mentioned for $Q^1$. The difference is that the alkyl radical may be an aralkyl radical such as benzyl and phenethyl radicals while the aralkyl radical should preferably have 7 to 10 carbon atoms in total.

The aryl radical may further have a substituent, and exemplary aryl radicals include phenyl and o-, m-, and p-tolyl radicals. The aryl radical should preferably have 6 to 10 carbon atoms in total.

The aryloxy radical may further have a substituent, and preferred aryloxy radicals include a phenoxy radical, etc. The aryloxy radical should preferably have 6 to 10 carbon atoms in total.

Examples of the acyl radical include acetyl, propionyl and butylyl radicals, with the acetyl radical being preferred. The acyl radical should preferably have 2 to 5 carbon atoms in total.

In the 2-imidazolyl radical represented by $Q^2$, adjacent substituents may be taken together to form a ring. Such a ring is exemplified by a benzene ring.

The 2-imidazolyl radical represented by $Q^2$ may have a substituent at the 4- and/or 5-position, preferably at both the positions. Preferred substituents are aryl radicals such as phenyl radical, o-, m- and p-chlorophenyl radicals, o-, m- and p-bromophenyl radicals, o-, m- and p-tolyl radicals, and o-, m- and p-butylphenyl radicals, with the phenyl radical being most preferred. When the 2-imidazolyl radical has substituents at both the 4- and 5-positions, these substituents may be the same or different.

The azo metal complex dyes having coordinated the azo compounds of formula (II) possess a center metal which is preferably Co, Mn, Ni, Cu, Zn, Mo, Fe or Pd. Among these, Mo may take the form of an oxide ion, for example, $MoO^{2+}$ and $MoO^{3+}$. More preferred center metals are Co, Cu, Ni, and Mn. Co and Ni are further preferred, with Ni being most preferred.

The azo compounds of formula (II) are tridentate ligands. The azo compound generally forms with a metal a 1:1 complex or 1:2 complex (metal:ligand). Therefore, if the center metal has a coordination number of 4 or more, another ligand may coordinate to the metal in addition to the azo compound. Such other ligands include a chlorine atom, water molecule, and hydroxo. These other ligands originate from raw materials, reaction solvents, etc.

It is noted that a radical of the azo compound of formula (II) coordinates to the metal in the form of an acid anion wherein active hydrogen of the imidazolyl radical represented by $Q^2$ is dissociated.

A counter ion is present where the azo metal complex dyes have an electric charge. Examples of the counter ion include a chloride ion ($Cl^-$), bromide ion ($Br^-$), iodide ion ($I^-$), tetrafluoroborate ion ($BF_4^-$), hexafluorophosphate ion ($PF_6^-$), tetraphenylborate ion ($B(C_6H_5)_4^-$), perchlorate ion ($ClO_4^-$), tungstate ion ($WO_4^{2-}$), and acetylacetone anion ($CH_3COCH=C(CH_3)O^-$). Among these, the chloride ion ($Cl^{31}$), tetrafluoroborate ion ($BF_4^-$), hexafluorophosphate ion ($PF_6^-$), and perchlorate ion ($ClO_4^-$) are preferred, with the tetrafluoroborate ion ($BF_4^-$), hexafluorophosphate ion ($PF_6^-$), and perchlorate ion ($ClO_4^-$) being most preferred.

One exemplary structure of the azo metal complex dye mentioned above is shown below. This is a compound in which 2-(8-quinolylazo)-4,5-diphenylimidazole used as the azo compound of formula (II) coordinates to Ni and the counter ion is $ClO_4^-$, that is, dye No. II-3 which will be exemplified later.

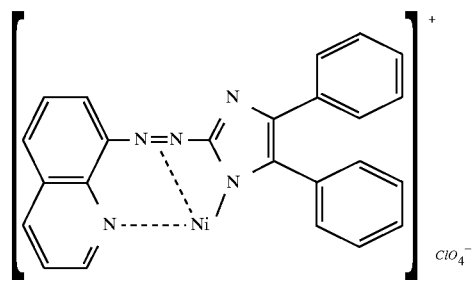

Illustrative examples of the azo metal complex dye used herein are shown below as a combination of an azo compound used to form the azo metal complex dye, a center metal and a counter ion. It is noted that the azo compound is shown by a combination of R's in the following formula (IIa).

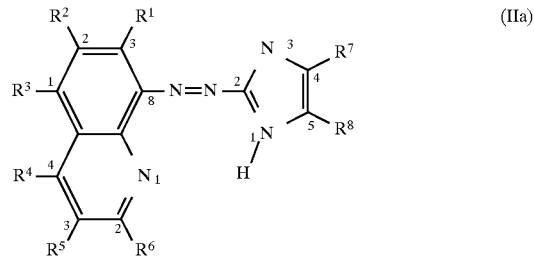

| Dye No. | \multicolumn{8}{c}{Azo compound} | Center metal | Counter ion |
|---|---|---|---|---|---|---|---|---|---|---|
|  | $R_1$ | $R_2$ | $R_3$ | $R_4$ | $R_5$ | $R_6$ | $R_7$ | $R_8$ |  |  |
| II-1 | H | H | H | H | H | H | —Ph | —Ph | Ni | $Cl^-$ |
| II-2 | H | H | H | H | H | H | —Ph | —Ph | Ni | $BF_4^-$ |
| II-3 | H | H | H | H | H | H | —Ph | —Ph | Ni | $ClO_4^-$ |
| II-4 | H | H | H | H | H | H | —Ph | —Ph | Ni | $PF_6^-$ |

-continued

| Dye No. | R₁ | R₂ | R₃ | R₄ | R₅ | R₆ | R₇ | R₈ | Center metal | Counter ion |
|---|---|---|---|---|---|---|---|---|---|---|
| II-5 | H | H | H | H | H | H | —Ph | —Ph | Co | Cl⁻ |
| II-6 | H | H | H | H | H | H | —Ph | —Ph | Co | BF₄⁻ |
| II-7 | H | H | H | H | H | H | —Ph | —Ph | Co | ClO₄⁻ |
| II-8 | H | H | H | H | H | H | —Ph | —Ph | Co | PF₆⁻ |
| II-9 | H | NO₂ | H | H | H | H | —Ph | —Ph | Ni | BF₄⁻ |
| II-10 | H | NO₂ | H | H | H | H | —Ph | —Ph | Ni | ClO₄⁻ |
| II-11 | H | NO₂ | H | H | H | H | —Ph | —Ph | Co | BF₄⁻ |
| II-12 | H | NO₂ | H | H | H | H | —Ph | —Ph | Co | ClO₄⁻ |
| II-13 | Cl | H | H | H | H | H | —Ph | —Ph | Ni | ClO₄⁻ |
| II-14 | Cl | H | H | H | H | H | —Ph | —Ph | Co | ClO₄⁻ |
| II-15 | H | H | Cl | H | H | H | —Ph | —Ph | Ni | ClO₄⁻ |
| II-16 | H | H | Cl | H | H | H | —Ph | —Ph | Co | ClO₄⁻ |
| II-17 | F | H | H | H | H | H | —Ph | —Ph | Ni | BF₄⁻ |
| II-18 | H | H | F | H | H | H | —Ph | —Ph | Ni | BF₄⁻ |
| II-19 | Cl | H | Cl | H | H | H | —Ph | —Ph | Ni | ClO₄⁻ |
| II-20 | Br | H | H | H | H | H | —Ph | —Ph | Ni | BF₄⁻ |
| II-21 | H | H | Br | H | H | H | —Ph | —Ph | Ni | BF₄⁻ |
| II-22 | CN | H | H | H | H | H | —Ph | —Ph | Ni | BF₄⁻ |
| II-23 | H | H | CN | H | H | H | —Ph | —Ph | Ni | BF₄⁻ |
| II-24 | H | H | H | H | H | CH₃ | —Ph | —Ph | Ni | BF₄⁻ |
| II-25 | NO₂ | H | H | H | H | CH₃ | —Ph | —Ph | Ni | BF₄⁻ |
| II-26 | H | H | NO₂ | H | H | C₂H₅ | —Ph | —Ph | Ni | BF₄⁻ |
| II-27 | H | H | H | H | H | —N(CH₃)₂ | —Ph | —Ph | Ni | BF₄⁻ |
| II-28 | H | H | H | H | H | —NHCOCH₃ | —Ph | —Ph | Ni | BF₄⁻ |
| II-29 | H | H | H | H | H | —NHSO₂CH₃ | —Ph | —Ph | Ni | BF₄⁻ |
| II-30 | H | H | H | H | H | —CONH₂ | —Ph | —Ph | Ni | BF₄⁻ |
| II-31 | H | H | H | H | H | —SO₂NH₂ | —Ph | —Ph | Ni | BF₄⁻ |
| II-32 | H | H | H | H | H | —OCH₃ | —Ph | —Ph | Ni | BF₄⁻ |
| II-33 | H | H | H | H | H | —COOCH₃ | —Ph | —Ph | Ni | BF₄⁻ |
| II-34 | H | H | H | H | H | —OCOCH₃ | —Ph | —Ph | Ni | BF₄⁻ |
| II-35 | H | H | H | H | H | H | —Ph | —Ph | Fe | BF₄⁻ |
| II-36 | H | H | H | H | H | H | —Ph | —Ph | Pd | BF₄⁻ |
| II-37 | H | H | H | H | H | H | —Ph | —Ph | Cu | BF₄⁻ |
| II-38 | H | H | H | H | H | H | —Ph | —Ph | Zn | BF₄⁻ |
| II-39 | H | H | H | H | H | H | —Ph | —Ph | Mo | BF₄⁻ |
| II-40 | H | H | H | H | H | H | 2-CH₃-C₆H₄ | 2-CH₃-C₆H₄ | Ni | BF₄⁻ |

-continued

| Dye No. | R₁ | R₂ | R₃ | R₄ | R₅ | R₆ | R₇ | R₈ | Center metal | Counter ion |
|---|---|---|---|---|---|---|---|---|---|---|
| II-41 | H | H | H | H | H | H | 2-methylphenyl | 2-methylphenyl | Ni | $ClO_4^-$ |
| II-42 | H | H | H | H | H | H | 2-methylphenyl | 2-methylphenyl | Cu | $BF_4^-$ |
| II-43 | H | H | H | H | H | H | 2-methylphenyl | 2-methylphenyl | Co | $BF_4^-$ |
| II-44 | H | H | H | H | H | H | 4-methylphenyl | 4-methylphenyl | Ni | $BF_4^-$ |
| II-45 | H | H | H | H | H | H | 4-methylphenyl | 4-methylphenyl | Ni | $ClO_4^-$ |
| II-46 | H | H | H | H | H | H | 4-methylphenyl | 4-methylphenyl | Cu | $BF_4^-$ |
| II-47 | H | H | H | H | H | H | 4-methylphenyl | 4-methylphenyl | Co | $BF_4^-$ |
| II-48 | H | H | H | H | H | H | 4-methylphenyl | 4-methylphenyl | Co | $ClO_4^-$ |
| II-49 | H | H | H | H | H | H | 3-methylphenyl | 3-methylphenyl | Ni | $BF_4^-$ |
| II-50 | H | H | H | H | H | H | 3-methylphenyl | 3-methylphenyl | Ni | $ClO_4^-$ |
| II-51 | H | H | H | H | H | H | 3-methylphenyl | 3-methylphenyl | Cu | $ClO_4^-$ |
| II-52 | H | H | H | H | H | H | 3-methylphenyl | 3-methylphenyl | Co | $BF_4^-$ |

-continued

| Dye No. | Azo compound | | | | | | | | Center metal | Counter ion |
|---|---|---|---|---|---|---|---|---|---|---|
| | $R_1$ | $R_2$ | $R_3$ | $R_4$ | $R_5$ | $R_6$ | $R_7$ | $R_8$ | | |
| II-53 | H | H | H | H | H | H | 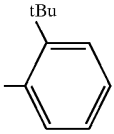 2-tBu-phenyl | 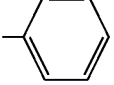 2-tBu-phenyl | Ni | $BF_4^-$ |
| II-54 | H | H | H | H | H | H | 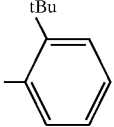 2-tBu-phenyl | 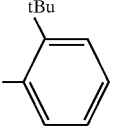 2-tBu-phenyl | Ni | $ClO_4^-$ |
| II-55 | H | H | H | H | H | H | 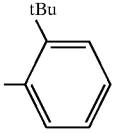 2-tBu-phenyl | 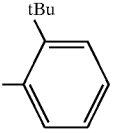 2-tBu-phenyl | Co | $PF_6^-$ |
| II-56 | H | H | H | H | H | H | 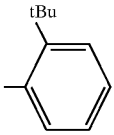 2-tBu-phenyl | 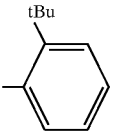 2-tBu-phenyl | Co | $ClO_4^-$ |
| II-57 | H | H | H | H | H | H | 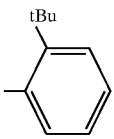 2-tBu-phenyl | 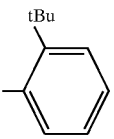 2-tBu-phenyl | Cu | $PF_6^-$ |
| II-58 | H | H | H | H | H | H | 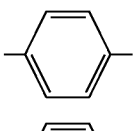 4-tBu-phenyl | 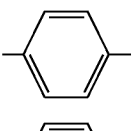 4-tBu-phenyl | Ni | $BF_4^-$ |
| II-59 | H | H | H | H | H | H | 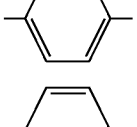 4-tBu-phenyl | 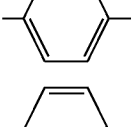 4-tBu-phenyl | Ni | $PF_6^-$ |
| II-60 | H | H | H | H | H | H | 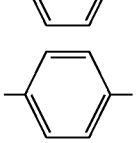 4-tBu-phenyl | 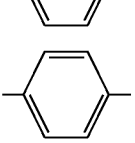 4-tBu-phenyl | Co | $ClO_4^-$ |
| II-61 | H | H | H | H | H | H | 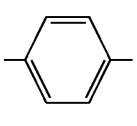 4-tBu-phenyl | 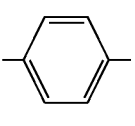 4-tBu-phenyl | Cu | $BF_4^-$ |
| II-62 | H | H | H | H | H | H | 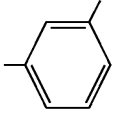 4-tBu-phenyl | 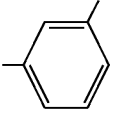 4-tBu-phenyl | Cu | $PF_6^-$ |
| II-63 | H | H | H | H | H | H | 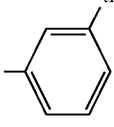 3-tBu-phenyl | 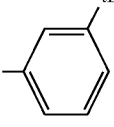 3-tBu-phenyl | Ni | $ClO_4^-$ |
| II-64 | H | H | H | H | H | H |  3-tBu-phenyl |  3-tBu-phenyl | Ni | $BF_4^-$ |

-continued

| Dye No. | R₁ | R₂ | R₃ | R₄ | R₅ | R₆ | R₇ | R₈ | Center metal | Counter ion |
|---|---|---|---|---|---|---|---|---|---|---|
| II-65 | H | H | H | H | H | H | 3-tBu-C₆H₄ | 3-tBu-C₆H₄ | Co | ClO₄⁻ |
| II-66 | H | H | H | H | H | H | 3-tBu-C₆H₄ | 3-tBu-C₆H₄ | Cu | BF₄⁻ |
| II-67 | H | H | H | H | H | H | 2-Cl-C₆H₄ | 2-Cl-C₆H₄ | Ni | BF₄⁻ |
| II-68 | H | H | H | H | H | H | 2-Cl-C₆H₄ | 2-Cl-C₆H₄ | Ni | ClO₄⁻ |
| II-69 | H | H | H | H | H | H | 2-Cl-C₆H₄ | 2-Cl-C₆H₄ | Co | BF₄⁻ |
| II-70 | H | H | H | H | H | H | 2-Cl-C₆H₄ | 2-Cl-C₆H₄ | Cu | BF₄⁻ |
| II-71 | H | H | H | H | H | H | 3-Cl-C₆H₄ | 3-Cl-C₆H₄ | Ni | BF₄⁻ |
| II-72 | H | H | H | H | H | H | 3-Cl-C₆H₄ | 3-Cl-C₆H₄ | Ni | ClO₄⁻ |
| II-73 | H | H | H | H | H | H | 3-Cl-C₆H₄ | 3-Cl-C₆H₄ | Co | BF₄⁻ |
| II-74 | H | H | H | H | H | H | 3-Cl-C₆H₄ | 3-Cl-C₆H₄ | Cu | ClO₄⁻ |

-continued
| Dye No. | R₁ | R₂ | R₃ | R₄ | R₅ | R₆ | R₇ | R₈ | Center metal | Counter ion |
|---|---|---|---|---|---|---|---|---|---|---|
| II-75 | H | H | H | H | H | H | 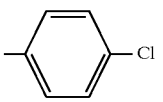 | 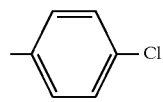 | Ni | BF₄⁻ |
| II-76 | H | H | H | H | H | H | 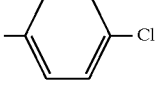 | 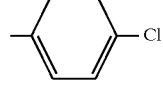 | Ni | ClO₄⁻ |
| II-77 | H | H | H | H | H | H | 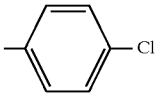 | 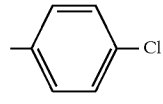 | Cu | BF₄⁻ |
| II-78 | H | H | H | H | H | H | 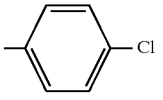 | 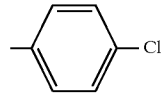 | Co | BF₄⁻ |
| II-79 | H | H | H | H | H | H | 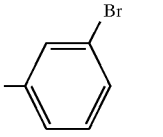 | 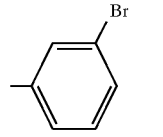 | Ni | BF₄⁻ |
| II-80 | H | H | H | H | H | H | 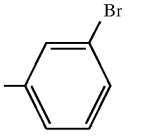 | 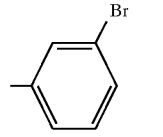 | Ni | ClO₄⁻ |
| II-81 | H | H | H | H | H | H | 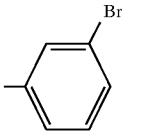 | 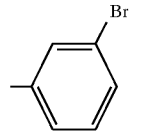 | Cu | BF₄⁻ |
| II-82 | H | H | H | H | H | H | 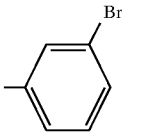 | 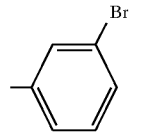 | Co | BF₄⁻ |
| II-83 | H | H | H | H | H | H | 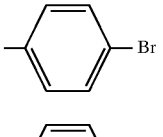 | 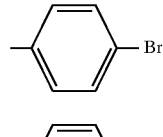 | Ni | BF₄⁻ |
| II-84 | H | H | H | H | H | H | 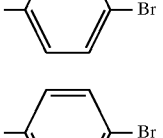 | 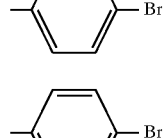 | Ni | ClO₄⁻ |
| II-85 | H | H | H | H | H | H |  |  | Cu | BF₄⁻ |
| II-86 | H | H | H | H | H | H | 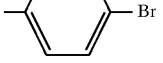 | 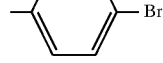 | Co | BF₄⁻ |

-continued
| Dye No. | Azo compound ||||||| | Center metal | Counter ion |
|---|---|---|---|---|---|---|---|---|---|---|
| | $R_1$ | $R_2$ | $R_3$ | $R_4$ | $R_5$ | $R_6$ | $R_7$ | $R_8$ | | |
| II-87 | H | H | H | H | H | H | 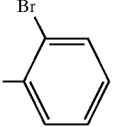 | 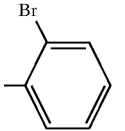 | Ni | $BF_4^-$ |
| II-88 | H | H | H | H | H | H | 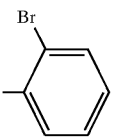 | 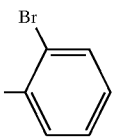 | Ni | $ClO_4^-$ |
| II-89 | H | H | H | H | H | H | 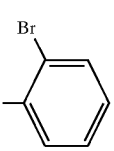 | 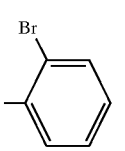 | Co | $BF_4^-$ |
| II-90 | H | H | H | H | H | H | 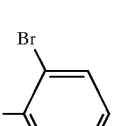 | 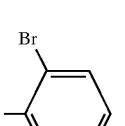 | Cu | $BF_4^-$ |
| II-91 | H | H | H | H | H | H | 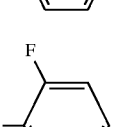 | 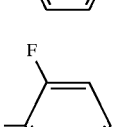 | Ni | $BF_4^-$ |
| II-92 | H | H | H | H | H | H | 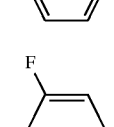 | 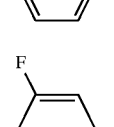 | Ni | $ClO_4^-$ |
| II-93 | H | H | H | H | H | H | 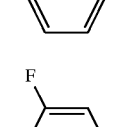 | 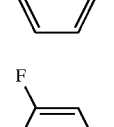 | Co | $BF_4^-$ |
| II-94 | H | H | H | H | H | H | 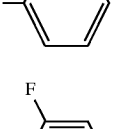 | 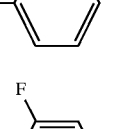 | Cu | $BF_4^-$ |
| II-95 | H | H | H | H | H | H | 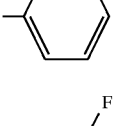 | 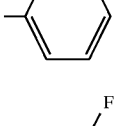 | Ni | $BF_4^-$ |
| II-96 | H | H | H | H | H | H | 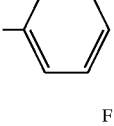 | 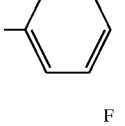 | Ni | $ClO_4^-$ |

-continued
| Dye No. | Azo compound | | | | | | | | Center metal | Counter ion |
|---|---|---|---|---|---|---|---|---|---|---|
| | $R_1$ | $R_2$ | $R_3$ | $R_4$ | $R_5$ | $R_6$ | $R_7$ | $R_8$ | | |
| II-97 | H | H | H | H | H | H | 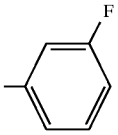 | 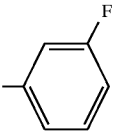 | Co | $BF_4^-$ |
| II-98 | H | H | H | H | H | H | 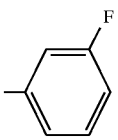 | 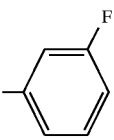 | Cu | $BF_4^-$ |
| II-99 | H | H | H | H | H | H | 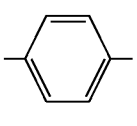 | 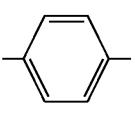 | Ni | $BF_4^-$ |
| II-100 | H | H | H | H | H | H | 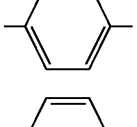 | 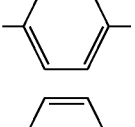 | Ni | $ClO_4^-$ |
| II-101 | H | H | H | H | H | H | 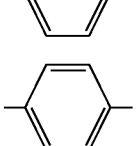 | 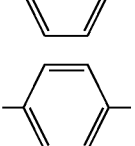 | Co | $BF_4^-$ |
| II-102 | H | H | H | H | H | H | 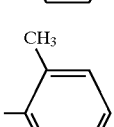 | 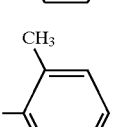 | Cu | $BF_4^-$ |
| II-103 | H | $NO_2$ | H | H | H | H | 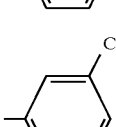 | 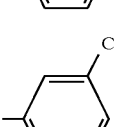 | Ni | $BF_4^-$ |
| II-104 | H | $NO_2$ | H | H | H | H | 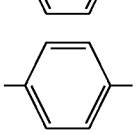 | 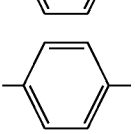 | Ni | $BF_4^-$ |
| II-105 | H | $NO_2$ | H | H | H | H | 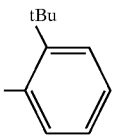 | 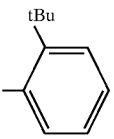 | Ni | $BF_4^-$ |
| II-106 | H | $NO_2$ | H | H | H | H | 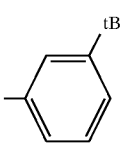 | 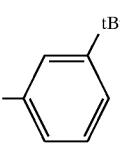 | Ni | $BF_4^-$ |
| II-107 | H | $NO_2$ | H | H | H | H | 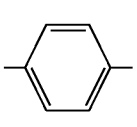 | 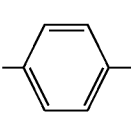 | Ni | $BF_4^-$ |
| II-108 | H | $NO_2$ | H | H | H | H |  |  | Ni | $BF_4^-$ |

| Dye No. | R₁ | R₂ | R₃ | R₄ | R₅ | R₆ | R₇ | R₈ | Center metal | Counter ion |
|---|---|---|---|---|---|---|---|---|---|---|
| II-109 | Cl | H | H | H | H | H | 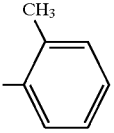 | 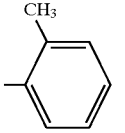 | Ni | $BF_4^-$ |
| II-110 | Cl | H | H | H | H | H | 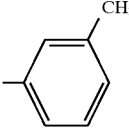 | 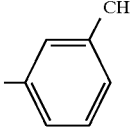 | Ni | $BF_4^-$ |
| II-111 | Cl | H | H | H | H | H | 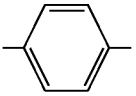 |  | Ni | $BF_4^-$ |
| II-112 | Cl | H | H | H | H | H | 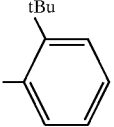 | 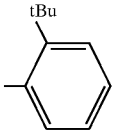 | Ni | $BF_4^-$ |
| II-113 | Cl | H | H | H | H | H | 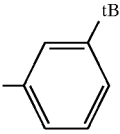 | 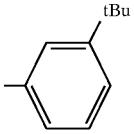 | Ni | $BF_4^-$ |
| II-114 | Cl | H | H | H | H | H | 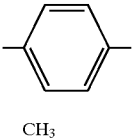 | 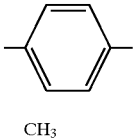 | Ni | $BF_4^-$ |
| II-115 | H | H | Br | H | H | H | 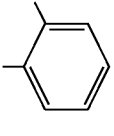 | 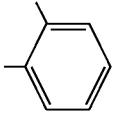 | Ni | $BF_4^-$ |
| II-116 | H | H | Br | H | H | H | 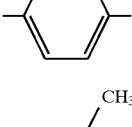 | 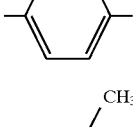 | Ni | $BF_4^-$ |
| II-117 | H | H | Br | H | H | H | 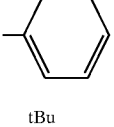 | 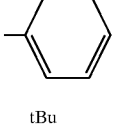 | Ni | $BF_4^-$ |
| II-118 | H | H | Br | H | H | H | 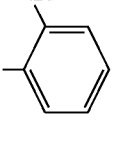 | 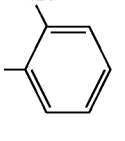 | Ni | $BF_4^-$ |
| II-119 | H | H | Br | H | H | H | 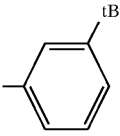 | 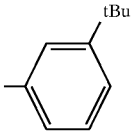 | Ni | $BF_4^-$ |

-continued

| Dye No. | Azo compound | | | | | | | | Center metal | Counter ion |
|---|---|---|---|---|---|---|---|---|---|---|
| | $R_1$ | $R_2$ | $R_3$ | $R_4$ | $R_5$ | $R_6$ | $R_7$ | $R_8$ | | |
| II-120 | H | H | Br | H | H | H | 4-tBu-phenyl | 4-tBu-phenyl | Ni | $BF_4^-$ |
| II-121 | H | H | H | H | H | $CH_3$ | 3-$CH_3$-phenyl | 3-$CH_3$-phenyl | Ni | $BF_4^-$ |
| II-122 | H | H | H | H | H | $C_2H_5$ | 4-tBu-phenyl | 4-tBu-phenyl | Ni | $BF_4^-$ |
| II-123 | H | H | H | H | H | $C_2H_5$ | 2-Cl-phenyl | 2-Cl-phenyl | Ni | $BF_4^-$ |
| II-124 | H | H | H | H | H | $C_2H_5$ | 3-Br-phenyl | 3-Br-phenyl | Ni | $BF_4^-$ |
| II-125 | H | H | H | H | H | $CH_3$ | 4-F-phenyl | 4-F-phenyl | Ni | $BF_4^-$ |
| II-126 | Cl | H | H | H | H | H | 3-Cl-phenyl | 3-Cl-phenyl | Ni | $BF_4^-$ |
| II-127 | Cl | H | H | H | H | H | 3-Br-phenyl | 3-Br-phenyl | Ni | $BF_4^-$ |
| II-128 | H | H | Br | H | H | H | 3-Br-phenyl | 3-Br-phenyl | Ni | $BF_4^-$ |
| II-129 | H | H | Br | H | H | H | 4-F-phenyl | 4-F-phenyl | Ni | $BF_4^-$ |
| II-130 | H | H | H | H | H | H | —Ph | —Ph | Mn | — |
| II-131 | H | H | H | H | H | H | 2-$CH_3$-phenyl | 2-$CH_3$-phenyl | Mn | — |

-continued

| Dye No. | R₁ | R₂ | R₃ | R₄ | R₅ | R₆ | R₇ | R₈ | Center metal | Counter ion |
|---|---|---|---|---|---|---|---|---|---|---|
| II-132 | H | H | H | H | H | H | 4-CH₃-C₆H₄- | 4-CH₃-C₆H₄- | Mn | — |
| II-133 | H | H | H | H | H | H | 3-CH₃-C₆H₄- | 3-CH₃-C₆H₄- | Mn | — |
| II-134 | H | H | H | H | H | H | 2-tBu-C₆H₄- | 2-tBu-C₆H₄- | Mn | — |
| II-135 | H | H | H | H | H | H | 4-tBu-C₆H₄- | 4-tBu-C₆H₄- | Mn | — |
| II-136 | H | H | H | H | H | H | 3-tBu-C₆H₄- | 3-tBu-C₆H₄- | Mn | — |
| II-137 | H | H | H | H | H | H | 2-Cl-C₆H₄- | 2-Cl-C₆H₄- | Mn | — |
| II-138 | H | H | H | H | H | H | 3-Cl-C₆H₄- | 3-Cl-C₆H₄- | Mn | — |
| II-139 | H | H | H | H | H | H | 4-Cl-C₆H₄- | 4-Cl-C₆H₄- | Mn | — |
| II-140 | H | H | H | H | H | H | 3-Br-C₆H₄- | 3-Br-C₆H₄- | Mn | — |
| II-141 | H | H | H | H | H | H | 4-Br-C₆H₄- | 4-Br-C₆H₄- | Mn | — |
| II-142 | H | H | H | H | H | H | 2-Br-C₆H₄- | 2-Br-C₆H₄- | Mn | — |

-continued

| Dye No. | R₁ | R₂ | R₃ | R₄ | R₅ | R₆ | R₇ | R₈ | Center metal | Counter ion |
|---|---|---|---|---|---|---|---|---|---|---|
| II-143 | H | H | H | H | H | H | 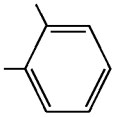 | 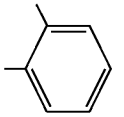 | Mn | — |
| II-144 | H | H | H | H | H | H | 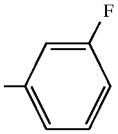 | 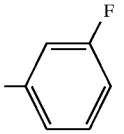 | Mn | — |
| II-145 | H | H | H | H | H | H | 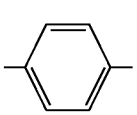 | 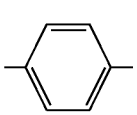 | Mn | — |

The azo compounds used herein can be synthesized in accordance with the disclosure of Shozo Shibata, Masamichi Furukawa, Ryozo Nakashima, Analytica Chimica Acta, 81 (1976), 131–141 and the references cited therein.

The compounds can be identified by a mass spectrum, $^1$H-nuclear magnetic resonance spectrum, infrared absorption spectrum, etc.

Further, the azo metal complex dyes can be obtained by reacting azo compounds as mentioned above with metal salts in non-aqueous solvents such as alcohols (e.g., methanol and ethanol) and ketones (e.g., acetone). The metal salts which are generally used herein include chlorides (for example, cobalt chloride, zinc chloride, chromium chloride, manganese chloride, iron chloride, and vanadium oxytrichloride), acetates (for example, nickel acetate and copper acetate), and acetylacetonato complex salts (for example, acetylacetonatocobalt (III) salt). Complex forming reaction is generally carried out at a temperature from room temperature to about 100° C. for 3 minutes to 1½ hours although in some cases, reaction instantaneously takes place around room temperature (15° to 30° C.). Formation of a complex can be acknowledged by color development of the solution. The complex may be obtained as a solid matter by crystallization, which can be identified by a visible/ultraviolet absorption spectrum, infrared absorption spectrum, mass spectrum, etc.

Where the thus obtained azo metal complex dye has a counter ion, that counter ion originates from a starting metal salt used in synthesis (for example, Cl⁻ and CH₃COO⁻). In some cases, salt exchange is preferably carried out to exchange the counter ion with another ion such as ClO₄⁻, BF₄⁻ and PF₆⁻. The salt exchange may be carried out, for example, by using a perchlorate salt (e.g., sodium perchlorate, ammonium perchlorate, and magnesium perchlorate), tetrafluoroborate salt (e.g., sodium tetrafluoroborate and ammonium tetrafluoroborate), and hexafluorophosphate salt (e.g., potassium hexafluorophosphate and ammonium hexafluorophosphate), dissolving the salt in a solvent such as methanol and ethanol to form a solution of 0.5 to 4% by weight, adding the azo metal complex dye to the solution in such an amount that the ratio of the dye to the salt (dye/salt molar ratio) may range from 1/0.5 to 1/2, and agitating the solution. Thereafter, the product is crystallized.

The product can be identified by a visible/ultraviolet absorption spectrum, mass spectrum, fluorescent X-ray analysis, etc.

Synthesis examples are shown below.

Synthesis Example 15

Synthesis of dye No. II-1

Synthesis of azo compound: 2-(8-quinolylazo)-4,5-diphenylimidazole

Conc. sulfuric acid, 2.7 ml, was diluted with 20 ml of water, and 2.88 grams (20 mmol) of pale yellow 8-aminoquinoline was dissolved therein to form an orange aqueous solution. While the solution was cooled below 5° C. in an ice bath, with stirring, 1.40 grams (20 mmol) of sodium nitrite in 15 ml of water was slowly added to the solution for diazotation. As the aqueous solution of sodium nitrite was added, a red insoluble matter precipitated. The reaction solution turned greenish when about 90% of the aqueous solution had been added and became a black brown, insoluble matter-free solution when the entire amount had been added. The solution was agitated for a further 30 minutes.

In a mixture of 50 ml of 20% sodium hydroxide aqueous solution, 50 ml of 20% sodium carbonate aqueous solution, and 70 ml of ethanol was dissolved 4.4 grams (20 mmol) of 4,5-diphenylimidazole. While cooling at 3° to 5° C., this solution was slowly added to the above-obtained diazonium salt aqueous solution for coupling reaction. The reaction solution turned red brown. After the entire amount was added, the solution was agitated for a further 1 hour in an ice bath.

After 1 hour, the precipitated solid was collected by suction filtration and washed several times with water. After extraction with ethanol, the soluble component was concentrated and evaporated to dryness by a rotary evaporator. Further vacuum heat drying yielded brown crystals.

Mass analysis (M: 375;

melting point (mp): 252° C.

Synthesis of Ni complex (dye No. II-1)

The above-obtained azo compound, 0.3 gram (0.8 mmol), was dissolved in 5 ml of ethanol, to which 0.1 gram (0.8 mmol) of nickel chloride was added. The solution was stirred for 5 minutes. The solution developed blue purple color in an instant. Water, 30 ml, was added to the ethanol solution, allowing the complex to precipitate, which was collected by suction filtration. The crude product was washed with a small amount of water and heat dried in vacuum at 60° C. for one hour. There was obtained 0.18 gram (yield 52%) of a nickel complex having deep green metallic luster. The complex was subject to fluorescent X-ray analysis to find that the molar ratio Cl/Ni of chlorine atom to nickel atom in a molecule was 1.05, confirming the presence of one Cl$^-$ ion per complex molecule.

Synthesis Example 16

Synthesis of dye No. II-2

In 5 ml of ethanol was dissolved 0.18 gram of dye No. II-1 (counter ion Cl$^-$) obtained in Synthesis Example 15. Ammonium tetrafluoroborate, 0.1 gram (1.0 mmol), was added to the solution, which was stirred for 5 minutes. Water, 30 ml, was added to the ethanol solution, allowing the complex to precipitate, which was collected by suction filtration. The crude product was washed with a small amount of water and heat dried in vacuum at 60° C. overnight. After column purification using alumina (developer: dichloromethane:ethanol=2:1), the end fraction was evaporated to dryness by an evaporator and heat dried in vacuum at 60° C. overnight. There was obtained 0.07 gram of the end product. The product was subject to fluorescent X-ray analysis to find that the molar ratio F/Ni of fluorine atom to nickel atom in a molecule was 4.08, confirming the presence of one $BF_4^-$ ion per complex molecule.

Synthesis Example 17

Synthesis of dye No. II-5

Synthesis was carried out as was the Ni complex of Synthesis Example 15 except that cobalt chloride was used as the metal salt. The complex was subject to fluorescent X-ray analysis to find that the molar ratio Cl/Co of chlorine atom to cobalt atom in a molecule was 1.02, confirming the presence of one Cl$^-$ ion per complex molecule.

Synthesis Example 18

Synthesis of dye No. II-7

Using dye No. II-5 (counter ion Cl$^-$) obtained in Synthesis Example 3 and sodium perchlorate monohydrate, a $ClO_4^-$ salt was obtained as in Synthesis Example 2. The presence of one $ClO_4^-$ ion per complex molecule was confirmed.

Other dyes can also be synthesized as described above.

These azo metal complex dyes have λmax in the range of 520 to 630 nm as measured in ethanol and a melting point (mp) of 210° to 320° C.

When these azo metal complex dyes are used in a recording layer of an optical recording medium, they may be used alone or in admixture of two or more. If two or more compounds in which the azo compound has a different coordination number or the type of other ligand is different are produced during the synthesis process, they may be used without isolation.

Further in the practice of the invention, the azo metal complex dye of formula (I) and the azo metal complex dye of formula (II) may be used in combination.

Further, these dyes have a complex index of refraction at 635 nm or 650 nm whose real part n is 2.00 to 2.50 and imaginary part k is 0.01 to 0.50.

It is noted that n and k of a dye are determined by preparing a test sample in which a dye film is formed on a given transparent substrate to a thickness equivalent to the recording layer of an optical recording medium, for example, of about 40 to 100 nm under the same conditions as used for the recording layer, measuring the test sample for reflectance and transmittance at 635 nm or 650 nm, and calculating n and k from these measurements according to Ishiguro Kozo, "Optics," Kyoritsu Publishing K.K., pages 168–178, for example. The reflectance is a reflectance of the test sample through the substrate or a reflectance of the sample from the dye film side while it is measured in a specular reflection mode (of the order of 5°).

These azo metal complex dyes are fully soluble in organic solvents and have an increased solubility in a coating solvent which does not attack polycarbonate (PC) resins commonly used in optical recording media as a substrate material.

A recording layer using an azo metal complex dye as mentioned above is especially preferred for use in write-once type optical recording discs (typically, CD-R and DVD-R). The recording layer is preferably formed using a coating solution containing a dye. Especially preferred is a spin coating technique of applying and spreading a coating solution onto a rotating substrate. Alternatively, gravure coating, spray coating and dipping may be used. Note that the coating solvent will be described later.

After spin coating as mentioned above has been completed, the coating is dried, if required. The thus formed recording layer has usually a thickness of about 400 to about 3,000 Å although it may be appropriately determined depending on the desired reflectance, etc.

It is understood that the dye content of the coating solution is preferably 0.05 to 10% by weight. Since the azo metal complex dye is well soluble, a coating solution of such concentration can be readily prepared. More illustratively, the azo metal complex dyes according to the invention show high solubility mainly in polar solvents, for example, a solubility of 0.5 to 10% by weight in alcohols and cellosolve or alkoxyalcohol solvents, ketoalcohols such as diacetone alcohol, ketones such as cyclohexanone, and fluorinated alcohols such as 2,2,3,3-tetrafluoropropanol. In particular, the dyes are soluble in ethyl cellosolve and 2,2,3,3-tetrafluoropropanol which are appropriate coating solvents in coating on polycarbonate disc substrates in a concentration of more than 4% by weight, enabling brief formation of a spin coated film of quality.

The coating solution may optionally contain binders, dispersants, and stabilizers.

In addition to the azo metal complex dye, the recording layer of the optical recording medium according to the invention may contain a light absorbing dye of another type. Examples of the other dye include phthalocyanine dyes, cyanine dyes, metal complex dyes of a type other then the aforementioned, styryl dyes, porphyrin dyes, azo dyes of a type other then the aforementioned, and formazane metal complexes.

In such embodiments, such a dye may be contained in the coating solution, from which a recording layer is formed.

The optical recording medium of the present invention can be recorded and read at two wavelengths, a short wavelength of about 680 to 635 nm and a conventional wavelength of about 780 nm. Alternatively, it can be recorded at either of the two wavelengths and read at the other wavelength. In one preferred embodiment, the inventive medium is suitable for use in the recording and reading mode of CD-RII involving recording at the conventional wavelength of about 780 nm and reading at two wavelengths, a short wavelength of about 680 to 635 nm and the conventional wavelength of about 780 nm. For such application, the recording layer should preferably contain, in combination, an azo metal complex dye according to the invention and a dye having different optical characteristics, typically different absorption characteristics. Such combinations include a combination of an azo metal complex dye according to the invention for short wavelength and another light absorbing dye for long wavelength and an inverse combination of an azo metal complex dye according to the invention for long wavelength and another light absorbing dye for short wavelength, with the former combination being usually preferred. In such a case, a dye having an absorption maximum (λmax) at 680 to 750 nm is preferably contained in addition to the azo metal complex dye according to the invention. A dye having such an absorption maximum (λmax) may be selected from the above-mentioned dyes. Among others, a choice is generally made of phthalocyanine dyes and pentamethinecyanine dyes.

Especially for use in a recording layer of the CD-RII mode involving recording and reading at two wavelengths as mentioned above, the azo metal complex dye should preferably have a complex index of refraction at 650 nm whose real part n is 1.8 to 2.6 and imaginary part k is 0.02 to 0.20. The other dye to be combined therewith should preferably have a complex index of refraction at 780 nm whose real part n is 1.8 to 2.6 and imaginary part k is 0.02 to 0.30, especially 0.02 to 0.15 for use in a recording layer of the laminate layer type. For the other dye, the half-value width of the absorption spectrum of a thin film thereof, that is, the half-value width of a spectral line near λmax is preferably up to 170 nm, more preferably up to 150 nm. The lower limit of the half-value width is generally 50 nm though not critical. The use of a dye having such a half-value width eliminates any influence on the absorption characteristics of the azo metal complex dye so that a satisfactory reflectance and modulation in a short wavelength region are available. In contrast, if the half-value width exceeds 170 nm, the absorption edge overlaps the wavelength region of a short wavelength laser, causing a loss of reflectance in the short wavelength region. It is noted that the half-value width is determined by preparing a sample in which a dye film is formed on a transparent substrate such that the transmittance T at absorption maximum λmax is up to 25%, and measuring an absorption spectrum of the sample. Referring to the absorption spectrum of FIG. 1, for example, a transmittance T1 at λmax and a transmittance T2 which is substantially constant when the wavelength is shifted toward a longer wavelength side, that is, does not depend on a shift of wavelength are determined. The width Δλ at one-half of the bottom depth measured from T2 as a base to T1 is the half-value width. The dye film as the sample is generally about 500 to 1,500 Å (50 to 150 nm) thick.

It is noted that the above-mentioned values of n and k are determined in this way while setting the measurement wavelength at 650 nm and 780 nm.

Among the dyes satisfying requirements as mentioned above, phthalocyanine dyes of the following formula (III) are especially preferred.

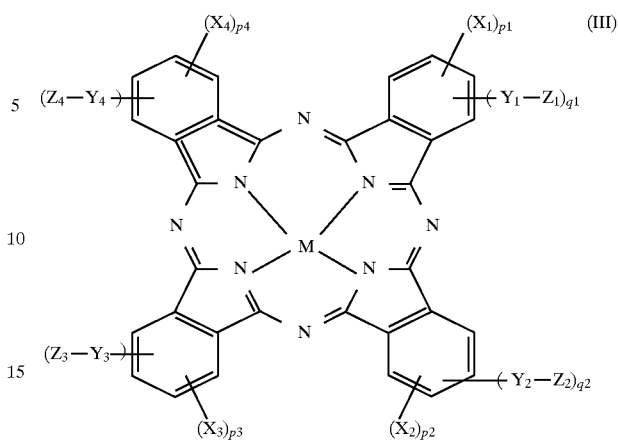

In formula (III), M is a center atom, each of $X_1$, $X_2$, $X_3$, and $X_4$ which may be the same or different is a halogen atom, p1, p2, p3, and p4 each are 0 or an integer of 1 to 4, the sum of p1+p2+p3+p4 is 0 to 15, each of $Y_1$, $Y_2$, $Y_3$, and $Y_4$ which may be the same or different is an oxygen or sulfur atom, each of $Z_1$, $Z_2$, $Z_3$, and $Z_4$ which may be the same or different is an alkyl radical, alicyclic hydrocarbon radical, aromatic hydrocarbon radical or heterocyclic radical each having at least 4 carbon atoms, and q1, q2, q3, and q4 each are 0 or an integer of 1 to 4 and are not equal to 0 at the same time, the sum of q1+q2+q3+q4 is 1 to 8.

Formula (III) is described. In formula (III), M is a center atom. Included in the center atom represented by M are a hydrogen atom (2H) or a metal atom. Examples of the metal atom used herein are those in Groups 1 to 14 of the Periodic Table (Groups 1A to 7A, 8, and 1B to 4B). For example, mention is made of Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Zn, Cd, Hg, Al, In, Tl, Si, Ge, Sn and Pb, more specifically, Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Cd, Hg, Al, In, Tl, Si, Ge, Sn, and Pb. Preferred among these are Al, Si, Ge, Zn, Cu, Pd, Ni, Fe, and Co, especially Cu, Pd, Ni, Fe, Co, and VO for aging stability.

It is understood that these metal atoms, for instance, V may take the form of VO. Alternatively, the metal atom may have a ligand or ligands such as ether groups, ester groups, pyridine and derivatives thereof coordinated to the upper and/or lower sides or one lateral side, as in the case of Si, Al, Ge, Co, and Fe. Preferred examples having Si will be described later.

Each of $X_1$ to $X_4$ is a halogen atom, for example, F, Cl, Br, and I. Br and F are especially preferred.

Each of p1, p2, p3, and p4 is 0 or an integer of 1 to 4, and the sum of p1+p2+p3+p4 is 0 to 15, preferably 0 to 10.

$X_1$ to $X_4$ may be the same or different. Where each of p1, p2, p3, and p4 is an integer of 2 or more, $X_1$ radicals, $X_2$ radicals, $X_3$ radicals or $X_4$ radicals may be the same or different, respectively.

Each of $Y_1$ to $Y_4$ is an oxygen or sulfur atom, with the oxygen atom being especially preferred. $Y_1$ to $Y_4$ are generally the same though they may be different. Each of $Z_1$ to $Z_4$ is an alkyl radical, alicyclic hydrocarbon radical, aromatic hydrocarbon radical or heterocyclic radical each having at least 4 carbon atoms, and they may be the same or different.

Each of q1, q2, q3, and q4 is 0 or an integer of 1 to 4, they are not equal to 0 at the same time, and the sum of q1+q2+q3+q4 is 1 to 8, preferably 2 to 6.

The position at which $Y_1$ to $Y_4$ are attached to the phthalocyanine ring is preferably the 3- and/or 6-position of the phthalocyanine ring (as seen from the structural formula shown below), and the inclusion of at least one such bond is preferred.

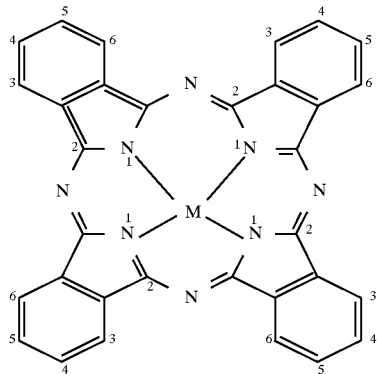

The alkyl radicals represented by $Z_1$ to $Z_4$ are preferably those having 4 to 16 carbon atoms. These alkyl radicals may be either normal or branched although the branched ones are preferred. The alkyl radicals may have a substituent which is a halogen atom (such as F, Cl, Br, and I, especially F and Br), etc. Examples of the alkyl radical include n-$C_4H_9$—, i-$C_4H_9$—, s-$C_4H_9$—, t-$C_4H_9$—, n-$C_5H_{11}$—, $(CH_3)_2CHCH_2CH_2$—, $(CH_3)_3CCH_2$—, $(C_2H_5)_2CH$—, $C_2H_5C(CH_3)_2$—, n-$C_3H_7CH(CH_3)$—, n-$C_6H_{13}$—, $(CH_3)_2CHCH_2CH_2CH_2$—, $(CH_3)_3C$—$CH_2$—$CH_2$—, n-$C_3H_7CH(CH_3)CH_2$—, n-$C_4H_9CH(CH_3)$—, n-$C_7H_{15}$—, $[(CH_3)_2CH]_2$—CH—, n-$C_4H_9CH(CH_3)CH_2$—, $(CH_3)_2CHCH_2CH_2$—, $(CH_3)_3CCH_2CH(CH_3)CH_2$—, n-$C_8H_{17}$—, $(CH_3)_2CHCH(i-C_4H_9)$—, n-$C_4H_9CH(C_2H_5)CH_2$—, n-$C_9H_{19}$—, $CH_3CH_2CH(CH_3)CH_2CH(CH_3)CH_2CH_2$—, $(CH_3)_2CHCH_2CH_2CH_2CH(CH_3)CH_2$—, n-$C_3H_7CH(CH_3)CH_2CH(CH_3)CH_2$—, n-$C_{10}H_{21}$—, $(CH_3)_3CCH_2CH_2C(CH_3)_2CH_2$—, n-$C_{11}H_{23}$—, n-$C_{12}H_{25}$—, n-$C_{13}H_{27}$—, n-$C_{14}H_{29}$—, n-$C_{15}H_{31}$—, n-$C_{16}H_{33}$—, $CHF_2CF_2CH_2$—, $CF_3CH_2$—, $CF_3CF_2CH_2CH_2$—, $(CF_3)_2(CH_3)C$—$CH_2$—, n-$C_4F_9$—, i-$C_4F_9$—, s-$C_4F_9$—, and t-$C_4F_9$—.

The alicyclic hydrocarbon radicals represented by $Z_1$ to $Z_4$ include cyclohexyl, cyclopentyl and other radicals, with the cyclohexyl radical being preferred. These radicals may have a substituent which includes an alkyl radical, aryl radical, alkoxy radical, aryloxy radical, aralkyl radical, halogen atom, nitro radical, carboxyl radical, ester radical, acyl radical, amino radical, amide radical, carbamoyl radical, sulfonyl radical, sulfamoyl radical, sulfo radical, sulfino radical, arylazo radical, alkylthio radical, and arylthio radical. Preferred substituents are alkyl radicals having 1 to 5 carbon atoms (e.g., methyl, ethyl, n-propyl, iso-propyl, n-butyl, iso-butyl, sec-butyl, tert-butyl, n-pentyl, iso-pentyl, neo-pentyl, tert-pentyl, and 1-methylbutyl radicals), alkoxy radicals (e.g., methoxy, ethoxy, propoxy, isopropoxy., butoxy, isobutoxy, sec-butoxy, and tert-butoxy radicals), aryl radicals (e.g., phenyl, tolyl, biphenyl and naphthyl radicals), and halogen atoms (e.g., F, Cl, Br, and I, with F and Br being preferred). The replacement position of these substituents is preferably either one or both of the positions adjacent to the position of attachment to each of $Y_1$ to $Y_4$. The inclusion of at least one such substitution is preferred.

The aromatic hydrocarbon radicals represented by $Z_1$ to $Z_4$ may be a single ring or have a fused ring and may have a substituent. The total number of carbon atoms is preferably 6 to 20. Examples are phenyl and naphthyl radicals, with the phenyl radical being preferred. They may have a substituent while examples and preferred examples of the substituent are the same as exemplified for the alicyclic hydrocarbon radicals. The replacement position is also the same as previous, preferably ortho-position to the position of attachment to each of $Y_1$ to $Y_4$. The inclusion of at least one ortho-substitution is preferred.

The heterocyclic radicals represented by $Z_1$ to $Z_4$ may be a single ring or have a fused ring while the preferred hetero-atom is oxygen, nitrogen, sulfur, etc., with oxygen and nitrogen being especially preferred. Exemplary radicals include pyridyl, furanonyl, pyrazyl, pyrazolidyl, piperidinonyl, quinoxalyl, pyranonyl and thiophenetrionyl radicals, with the pyridyl and 2-furanonyl radicals being preferred. These heterocyclic radicals may further have a substituent while examples and preferred examples of the substituent are the same as exemplified for the alicyclic hydrocarbon and aromatic hydrocarbon radicals. Where there is a carbon atom adjacent to the position of attachment to each of $Y_1$ to $Y_4$, it is preferred to have a substituent at such an adjacent position.

Preferred for $Z_1$ to $Z_4$ are alicyclic hydrocarbon and aromatic hydrocarbon radicals, with cyclohexyl and phenyl radicals being especially preferred, while it is preferred to have a substituent (especially the preferred substituents mentioned above) at one or both of the positions adjacent to the position of attachment to each of $Y_1$ to $Y_4$.

Illustrative examples of the phthalocyanine dye are shown below although the invention is not limited thereto. These illustrative examples are shown in terms of $X_{11}$ to $X_{14}$, $X_{15}$ to $X_{18}$, $X_{19}$ to $X_{22}$, $X_{23}$ to $X_{26}$ and M in the following formula (IIIa). Where all of $X_{11}$ to $X_{14}$ etc. are hydrogen, it is shown by "H." Where any of $X_{11}$ to $X_{14}$ has a substituent, only the substituted one is shown, with the expression "H" being omitted. It is understood that the 3 and 6-positions and the 4 and 5-positions of the phthalocyanine ring are equivalent to each other and where a substituent is present at either one of these positions, only one is shown as a representative example.

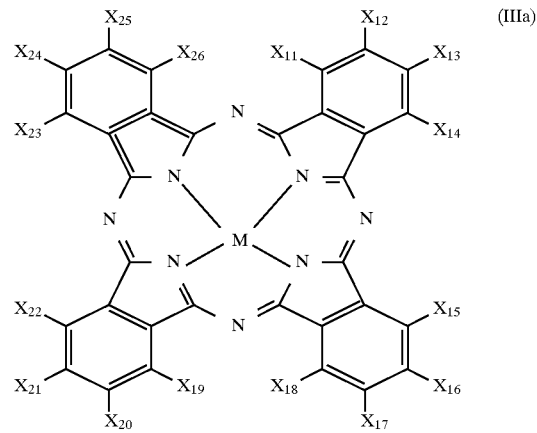

(IIIa)

| Dye No. | $X_{11} \sim X_{14}$ | $X_{15} \sim X_{18}$ | $X_{19} \sim X_{22}$ | $X_{23} \sim X_{26}$ | M |
|---|---|---|---|---|---|
| A-1 | $X_{11}=$ —O—(2,4-di-tert-butylphenyl) | $X_{15}=$ —O—(2,4-di-tert-butylphenyl) | $X_{19}=$ —O—(2,4-di-tert-butylphenyl) | $X_{23}=$ —O—(2,4-di-tert-butylphenyl) | Cu |
| A-2 | $X_{11}=$ —O—CH(CH(CH$_3$)$_2$)$_2$ | $X_{15}=$ —O—CH(CH(CH$_3$)$_2$)$_2$ | $X_{19}=$ —O—CH(CH(CH$_3$)$_2$)$_2$ | $X_{23}=$ —O—CH(CH(CH$_3$)$_2$)$_2$ | Pd |
| A-3 | $X_{11}=$ —O—(2-tert-butylcyclohexyl) | $X_{15}=$ —O—(2-tert-butylcyclohexyl) | $X_{19}=$ —O—(2-tert-butylcyclohexyl) | $X_{23}=$ —O—(2-tert-butylcyclohexyl) | Cu |
| A-4 | $X_{11}=$ —O—(2-tert-butylphenyl) | $X_{15}=$ —O—(2-tert-butylphenyl) | $X_{19}=$ —O—(2-tert-butylphenyl) | $X_{23}=$ —O—(2-tert-butylphenyl) | Cu |
| A-5 | $X_{11}=$ —O—(2-(1-methylpropyl)phenyl) | $X_{15}=$ —O—(2-(1-methylpropyl)phenyl) | $X_{19}=$ —O—(2-(1-methylpropyl)phenyl) | $X_{23}=$ —O—(2-(1-methylpropyl)phenyl) | Cu |
| A-6 | $X_{11}=$ —O—(2-methylphenyl) | $X_{15}=$ —O—(2-methylphenyl) | $X_{19}=$ —O—(2-methylphenyl) | $X_{23}=$ —O—(2-methylphenyl) | Cu |
| A-7 | $X_{11}=$ —O—(2,6-dimethylphenyl) | $X_{15}=$ —O—(2,6-dimethylphenyl) | $X_{19}=$ —O—(2,6-dimethylphenyl) | $X_{23}=$ —O—(2,6-dimethylphenyl) | Cu |

-continued

| Dye No. | $X_{11} \sim X_{14}$ | $X_{15} \sim X_{18}$ | $X_{19} \sim X_{22}$ | $X_{23} \sim X_{26}$ | M |
|---|---|---|---|---|---|
| A-8 | $X_{11}=$ —O— (2-CH(CH$_3$)$_2$, 6-CH$_3$ phenoxy) | $X_{15}=$ —O— (2-CH(CH$_3$)$_2$, 6-CH$_3$ phenoxy) | $X_{19}=$ —O— (2-CH(CH$_3$)$_2$, 6-CH$_3$ phenoxy) | $X_{23}=$ —O— (2-CH(CH$_3$)$_2$, 6-CH$_3$ phenoxy) | Cu |
| A-9 | $X_{11}=$ —O— (2-Ph phenoxy) | $X_{15}=$ —O— (2-Ph phenoxy) | $X_{19}=$ —O— (2-Ph phenoxy) | $X_{23}=$ —O— (2-Ph phenoxy) | Cu |
| A-10 | $X_{11}=$ —O— (2-CF$_3$ phenoxy) | $X_{15}=$ —O— (2-CF$_3$ phenoxy) | $X_{19}=$ —O— (2-CF$_3$ phenoxy) | $X_{23}=$ —O— (2-CF$_3$ phenoxy) | Cu |
| A-11 | $X_{11}=$ —O— (2-Br phenoxy); $X_{12}=X_{13}=X_{14}=$ Br | $X_{15}=$ —O— (2-Br phenoxy); $X_{16}=X_{17}=X_{18}=$ Br | $X_{19}=$ —O— (2-Br phenoxy); $X_{20}=X_{21}=X_{22}=$ Br | $X_{23}=$ —O— (2-Br phenoxy); $X_{24}=X_{25}=X_{26}=$ Br | Cu |
| A-12 | $X_{11}=$ —O— (2,3-F$_2$, 6-C(CH$_3$)$_3$ phenoxy) | $X_{15}=$ —O— (2,3-F$_2$, 6-C(CH$_3$)$_3$ phenoxy) | $X_{19}=$ —O— (2,3-F$_2$, 6-C(CH$_3$)$_3$ phenoxy) | $X_{23}=$ —O— (2,3-F$_2$, 6-C(CH$_3$)$_3$ phenoxy) | Cu |
| A-13 | $X_{11}=$ —O— (2-C(CH$_3$)$_3$ phenoxy) | $X_{15}=$ —O— (2-C(CH$_3$)$_3$ phenoxy) | $X_{19}=$ —O— (2-C(CH$_3$)$_3$ phenoxy) | $X_{23}=$ —O— (2-C(CH$_3$)$_3$ phenoxy) | Cu |

-continued

| Dye No. | $X_{11} \sim X_{14}$ | $X_{15} \sim X_{18}$ | $X_{19} \sim X_{22}$ | $X_{23} \sim X_{26}$ | M |
|---|---|---|---|---|---|
| A-14 | $X_{11}=X_{14}=$ —O—(o-Ph-phenyl); $X_{12}=X_{13}=$ F | $X_{15}=X_{18}=$ —O—(o-Ph-phenyl); $X_{16}=X_{17}=$ F | $X_{19}=X_{22}=$ —O—(o-Ph-phenyl); $X_{20}=X_{21}=$ F | $X_{23}=X_{26}=$ —O—(o-Ph-phenyl); $X_{24}=X_{25}=$ F | Cu |
| A-15 | $X_{11}=$ —O—(o-C(CH$_3$)$_3$-phenyl) | H | H | H | Cu |
| A-16 | $X_{11}=X_{14}=$ —O—(o-C(CH$_3$)$_3$-phenyl) | H | $X_{19}=X_{22}=$ —O—(o-C(CH$_3$)$_3$-phenyl) | $X_{23}=X_{26}=$ —O—(o-C(CH$_3$)$_3$-phenyl) | Cu |
| A-17 | $X_{11}=X_{14}=$ —O—(o-C(CH$_3$)$_3$-phenyl) | H | $X_{19}=X_{22}=$ —O—(o-C(CH$_3$)$_3$-phenyl) | H | Cu |
| A-18 | $X_{11}=$ —S—(o-C(CH$_3$)$_3$-phenyl) | $X_{15}=$ —S—(o-C(CH$_3$)$_3$-phenyl) | $X_{19}=$ —S—(o-C(CH$_3$)$_3$-phenyl) | $X_{23}=$ —S—(o-C(CH$_3$)$_3$-phenyl) | Cu |
| A-19 | $X_{11}=$ —O—(2,6-di-C(CH$_3$)$_3$-phenyl, CH$_3$) | $X_{15}=$ —O—(2,6-di-C(CH$_3$)$_3$-phenyl, CH$_3$) | $X_{19}=$ —O—(2,6-di-C(CH$_3$)$_3$-phenyl, CH$_3$) | $X_{23}=$ —O—(2,6-di-C(CH$_3$)$_3$-phenyl, CH$_3$) | Pd |

-continued
| Dye No. | $X_{11}\sim X_{14}$ | $X_{15}\sim X_{18}$ | $X_{19}\sim X_{22}$ | $X_{23}\sim X_{26}$ | M |
|---|---|---|---|---|---|
| A-20 |  |  |  | 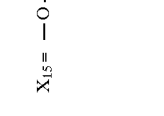 | Ni |
| A-21 |  |  |  | 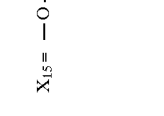 | Fe |
| A-22 |  |  |  | 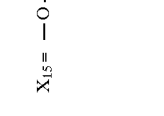 | Co |
| A-23 |  |  |  | 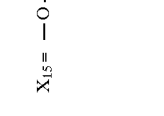 | VO |
| A-24 | 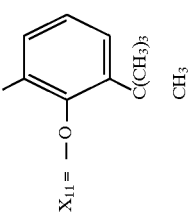 | 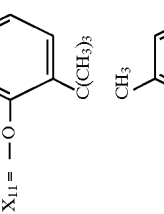 | 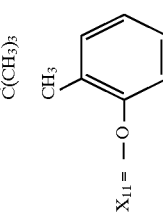 | 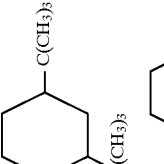 | Cu |
| A-25 | 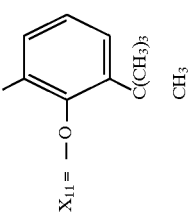 | 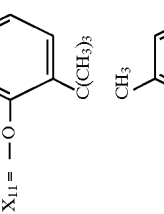 | 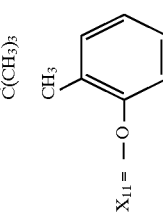 | 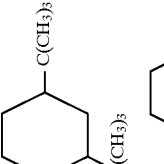 | Cu |

-continued

| Dye No. | $X_{11}$~$X_{14}$ | $X_{15}$~$X_{18}$ | $X_{19}$~$X_{22}$ | $X_{23}$~$X_{26}$ | M |
|---|---|---|---|---|---|
| A-26 | $X_{11}=$ —O— cyclohexyl-CH$_3$ | $X_{15}=$ —O— cyclohexyl-CH$_3$ | $X_{19}=$ —O— cyclohexyl-CH$_3$ | $X_{23}=$ —O— cyclohexyl-CH$_3$ | Cu |
| A-27 | $X_{11}=$ —O— cyclohexyl-(CH$_3$)$_2$ | $X_{15}=$ —O— cyclohexyl-(CH$_3$)$_2$ | $X_{19}=$ —O— cyclohexyl-(CH$_3$)$_2$ | $X_{23}=$ —O— cyclohexyl-(CH$_3$)$_2$ | Cu |
| A-28 | $X_{11}=$ —O— cyclohexyl-CH$_3$,CH(CH$_3$)$_2$ | $X_{15}=$ —O— cyclohexyl-CH$_3$,CH(CH$_3$)$_2$ | $X_{19}=$ —O— cyclohexyl-CH$_3$,CH(CH$_3$)$_2$ | $X_{23}=$ —O— cyclohexyl-CH$_3$,CH(CH$_3$)$_2$ | Cu |
| A-29 | $X_{11}=$ —O— cyclohexyl-Ph | $X_{15}=$ —O— cyclohexyl-Ph | $X_{19}=$ —O— cyclohexyl-Ph | $X_{23}=$ —O— cyclohexyl-Ph | Cu |
| A-30 | $X_{11}=$ —O— cyclohexyl-CF$_3$ | $X_{15}=$ —O— cyclohexyl-CF$_3$ | $X_{19}=$ —O— cyclohexyl-CF$_3$ | $X_{23}=$ —O— cyclohexyl-CF$_3$ | Cu |
| A-31 | $X_{11}=$ —O— cyclohexyl-Br | $X_{15}=$ —O— cyclohexyl-Br | $X_{19}=$ —O— cyclohexyl-Br | $X_{23}=$ —O— cyclohexyl-Br | Cu |

| Dye No. | $X_{11}$~$X_{14}$ | $X_{15}$~$X_{18}$ | $X_{19}$~$X_{22}$ | $X_{23}$~$X_{26}$ | M |
|---|---|---|---|---|---|
| A-32 | $X_{11}$=—O—, cyclohexyl with F, F, C(CH$_3$)$_3$ | $X_{15}$=—O—, cyclohexyl with F, F, C(CH$_3$)$_3$ | $X_{19}$=—O—, cyclohexyl with F, F, C(CH$_3$)$_3$ | $X_{23}$=—O—, cyclohexyl with F, F, C(CH$_3$)$_3$ | Cu |
| A-33 | $X_{11}$=—O—, cyclohexyl with C(CH$_3$)$_3$ | $X_{15}$=—O—, cyclohexyl with C(CH$_3$)$_3$ | $X_{19}$=—O—, cyclohexyl with C(CH$_3$)$_3$ | $X_{23}$=—O—, cyclohexyl with C(CH$_3$)$_3$ | Cu |
| A-34 | $X_{12}$=$X_{13}$=$X_{14}$=Br | $X_{16}$=$X_{17}$=$X_{18}$=Br | $X_{20}$=$X_{21}$=$X_{22}$=Br | $X_{24}$=$X_{25}$=$X_{26}$=Br | Cu |
| A-35 | $X_{11}$=—O—, cyclohexyl with Ph; $X_{12}$=$X_{13}$=F | $X_{15}$=$X_{18}$=—O—, cyclohexyl with Ph; $X_{16}$=$X_{17}$=F | $X_{19}$=—O—, cyclohexyl with Ph; $X_{20}$=$X_{21}$=F | $X_{23}$=$X_{26}$=—O—, cyclohexyl with Ph; $X_{24}$=$X_{25}$=F | Cu |
| A-36 | $X_{11}$=$X_{14}$=—O—, cyclohexyl with C(CH$_3$)$_3$ | H | $X_{19}$=$X_{22}$=—O—, cyclohexyl with C(CH$_3$)$_3$ | H | Cu |
| A-37 | $X_{11}$=$X_{13}$=—O—, cyclohexyl with C(CH$_3$)$_3$ | H | $X_{19}$=$X_{21}$=—O—, cyclohexyl with C(CH$_3$)$_3$ | H | Cu |

-continued

| Dye No. | $X_{11} \sim X_{14}$ | $X_{15} \sim X_{18}$ | $X_{19} \sim X_{22}$ | $X_{23} \sim X_{26}$ | M |
|---|---|---|---|---|---|
| A-38 | $X_{11}=-S$, cyclohexyl-$C(CH_3)_3$ | $X_{15}=-S$, cyclohexyl-$C(CH_3)_3$ | $X_{19}=-S$, cyclohexyl-$C(CH_3)_3$ | $X_{23}=-S$, cyclohexyl-$C(CH_3)_3$ | Cu |
| A-39 | $X_{11}=-O$, $CH_3$-cyclohexyl-$C(CH_3)_3$ | $X_{15}=-O$, $CH_3$-cyclohexyl-$C(CH_3)_3$ | $X_{19}=-O$, $CH_3$-cyclohexyl-$C(CH_3)_3$ | $X_{23}=-O$, $CH_3$-cyclohexyl-$C(CH_3)_3$ | Pd |
| A-40 | $X_{11}=-O$, $CH_3$-cyclohexyl-$C(CH_3)_3$ | $X_{15}=-O$, $CH_3$-cyclohexyl-$C(CH_3)_3$ | $X_{19}=-O$, $CH_3$-cyclohexyl-$C(CH_3)_3$ | $X_{23}=-O$, $CH_3$-cyclohexyl-$C(CH_3)_3$ | Ni |
| A-41 | $X_{11}=-O$, $CH_3$-cyclohexyl-$C(CH_3)_3$ | $X_{15}=-O$, $CH_3$-cyclohexyl-$C(CH_3)_3$ | $X_{19}=-O$, $CH_3$-cyclohexyl-$C(CH_3)_3$ | $X_{23}=-O$, $CH_3$-cyclohexyl-$C(CH_3)_3$ | Fe |
| A-42 | $X_{11}=-O$, $CH_3$-cyclohexyl-$C(CH_3)_3$ | $X_{15}=-O$, $CH_3$-cyclohexyl-$C(CH_3)_3$ | $X_{19}=-O$, $CH_3$-cyclohexyl-$C(CH_3)_3$ | $X_{23}=-O$, $CH_3$-cyclohexyl-$C(CH_3)_3$ | Co |
| A-43 | $X_{11}=-O$, $CH_3$-cyclohexyl-$C(CH_3)_3$ | $X_{15}=-O$, $CH_3$-cyclohexyl-$C(CH_3)_3$ | $X_{19}=-O$, $CH_3$-cyclohexyl-$C(CH_3)_3$ | $X_{23}=-O$, $CH_3$-cyclohexyl-$C(CH_3)_3$ | VO |

-continued

| Dye No. | $X_{11} \sim X_{14}$ | $X_{15} \sim X_{18}$ | $X_{19} \sim X_{22}$ | $X_{23} \sim X_{26}$ | M |
|---|---|---|---|---|---|
| A-44 | $X_{11}=$ —O—(2-tBu-cyclohexyl) | $X_{15}=$ —O—(2-CH$_3$-6-tBu-cyclohexyl) | $X_{19}=$ —O—(2-tBu-cyclohexyl) | $X_{23}=$ —O—(2-CH$_3$-6-tBu-cyclohexyl) | Cu |
| A-45 | $X_{11}=$ —O—(2-CH$_3$-pyridyl) | $X_{15}=$ —O—(2-CH$_3$-pyridyl) | $X_{19}=$ —O—(2-CH$_3$-pyridyl) | $X_{23}=$ —O—(2-CH$_3$-pyridyl) | Cu |
| A-46 | $X_{11}=$ —O—(3-Ph-butenolide) | $X_{15}=$ —O—(3-Ph-butenolide) | $X_{19}=$ —O—(3-Ph-butenolide) | $X_{23}=$ —O—(3-Ph-butenolide) | Cu |
| A-47 | $X_{11}=$ —OCHCH(CH$_3$)$_2$<br>       CH$_2$CH(CH$_3$)$_2$ | $X_{15}=$ —OCHCH(CH$_3$)$_2$<br>       CH$_2$CH(CH$_3$)$_2$ | $X_{19}=$ —OCHCH(CH$_3$)$_2$<br>       CH$_2$CH(CH$_3$)$_2$ | $X_{23}=$ —OCHCH(CH$_3$)$_2$<br>       CH$_2$CH(CH$_3$)$_2$ | Cu |
| A-48 | $X_{11}=$ —OCH$_2$CHC$_4$H$_9$<br>       C$_2$H$_6$ | $X_{15}=$ —OCH$_2$CHC$_4$H$_9$<br>       C$_2$H$_6$ | $X_{19}=$ —OCH$_2$CHC$_4$H$_9$<br>       C$_2$H$_6$ | $X_{23}=$ —OCH$_2$CHC$_4$H$_9$<br>       C$_2$H$_6$ | Cu |
| A-49 | $X_{11}=$ —OCHCH(CH$_3$)$_2$<br>       CH$_3$ | $X_{15}=$ —OCHCH(CH$_3$)$_2$<br>       CH$_3$ | $X_{19}=$ —OCHCH(CH$_3$)$_2$<br>       CH$_3$ | $X_{23}=$ —OCHCH(CH$_3$)$_2$<br>       CH$_3$ | Ni |
| A-50 | $X_{11}=$ —OCHCH(CH$_3$)$_2$<br>       CH$_2$CH(CH$_3$)$_2$ | $X_{15}=$ —OCHCH(CH$_3$)$_2$<br>       CH$_2$CH(CH$_3$)$_2$ | $X_{19}=$ —OCH$_2$CHC$_4$H$_9$<br>       C$_2$H$_6$ | $X_{23}=$ —OCH$_2$CHC$_4$H$_9$<br>       C$_2$H$_6$ | Cu |
| A-51 | $X_{11}=$ —O—(2-tBu-phenyl) | $X_{15}=$ —O—(2-tBu-phenyl) | $X_{19}=$ —O—(2-tBu-phenyl) | $X_{23}=$ —O—(2-tBu-phenyl) | Co |

Also preferred are phthalocyanine dyes of the following formula (IV) wherein the center atom is silicon.

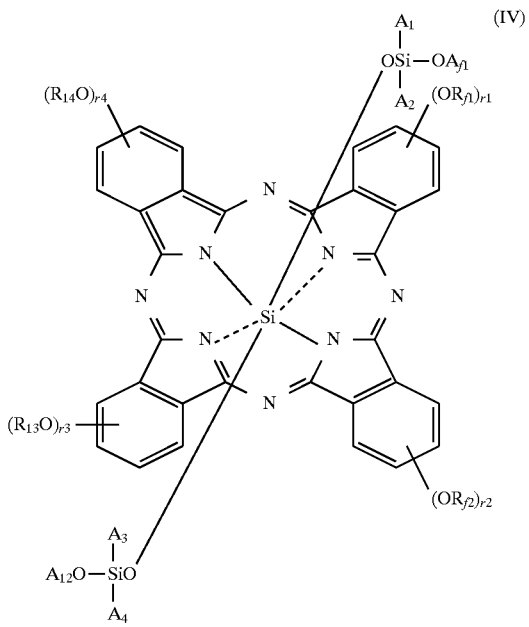

In formula (IV), each of $A_1$, $A_2$, $A_3$, and $A_4$ which may be the same or different is a halogen atom or alkyl radical, each of $A_{f1}$, and $A_{f2}$ which may be the same or different is a fluorinated alkyl radical, each of $R_{f1}$, $R_{f2}$, $R_{f3}$, and $R_{f4}$ which may be the same or different is a fluorinated alkyl radical, and r1, r2, r3, and r4 each are 0 or an integer of 1 to 4, they are not equal to 0 at the same time, and the sum of r1+r2+r3+r4 is 1 to 16.

The alkyl radical represented by $A_1$ to $A_4$ are preferably those having 1 to 3 carbon atoms, for example, methyl, ethyl, n-propyl and isopropyl radicals. It is usually preferred that $A_1$ to $A_4$ be the same.

The fluorinated alkyl radicals represented by $A_{f1}$ and $A_{f2}$ are preferably those having 1 to 6 carbon atoms, which may be normal or branched. Preferably, perfluoro radicals are excluded. Examples of the fluorinated alkyl radical include $CHF_2CF_2CH_2$—, $(CF_3)_2(CH_3)C$—$CH_2$—, $CF_3$—$CH_2$—, and $CF_3$—$CF_2$—$CH_2$—$CH_2$—. It is usually preferred that $A_{f1}$ and $Af_2$ be the same.

The fluorinated alkyl radicals represented by $R_{f1}$ to $R_{f4}$ are preferably those having 1 to 6 carbon atoms, which may be normal or branched. Preferably, perfluoro radicals are excluded. Examples of the fluorinated alkyl radical include $CHF_2CF_2CH_2$—, $(CF_3)_2(CH_3)C$—$CH_2$—, $CF_3CH_2$—, and $CF_3CF_2CH_2CH_2$—. It is usually preferred that $R_{f1}$ to $R_{f4}$ be the same. r1 to r4 each are 0 or an integer of 1 to 4, they are not equal to 0 at the same time, and the sum of them is 1 to 16. Preferably each of r1 to r4 is 1 or 2, especially r1=r2=r3=r4=1. It is noted that when r1 to r4 are 2 or more, $R_{f1}$ radicals, $R_{f2}$ radicals, $R_{f3}$ radicals, and $R_{f4}$ radicals may be the same or different, respectively.

The position at which oxygen atoms are attached to the phthalocyanine ring is preferably the 3- and/or 6-position of the phthalocyanine ring as above, and the inclusion of at least one such bond is preferred.

Illustrative examples of the phthalocyanine dye mentioned above are shown below although the invention is not limited thereto. These illustrative examples are shown in terms of $A_1$ to $A_4$, $A_{f1}$, $A_{f2}$, $X_{31}$ to $X_{34}$, $X_{35}$ to $X_{38}$, $X_{39}$ to $X_{42}$, and $X_{43}$ to $X_{46}$ in the following formula (IVa). Where all of $X_{31}$ to $X_{34}$ etc. are hydrogen, it is shown by "H." Where any of $X_{31}$ to $X_{34}$ has a substituent, only the substituted one is shown, with the expression "H" being omitted. It is understood that the 3 and 6-positions and the 4 and 5-positions of the phthalocyanine ring are equivalent to each other and where a substituent is present at either one of these positions, only one is shown as a representative example.

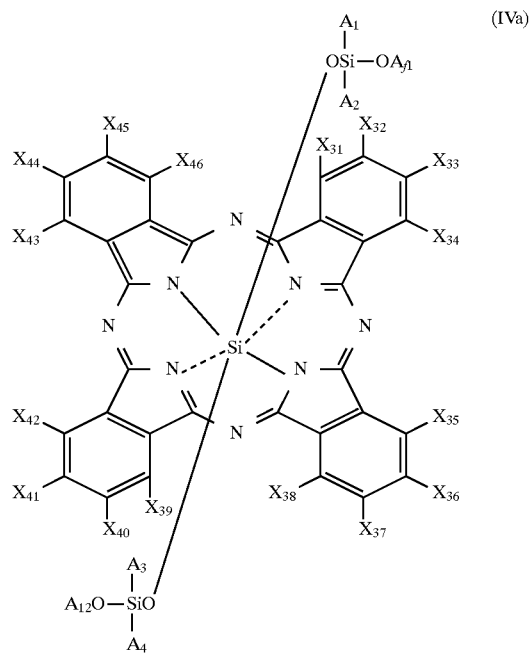

| Dye No. | $A_1$ | $A_2$ | $A_3$ | $A_4$ | $A_{f1}$ | $A_{f2}$ | $X_{31}$~$X_{34}$ | $X_{35}$~$X_{38}$ |
|---|---|---|---|---|---|---|---|---|
| A-52 | $CH_3$ | $CH_3$ | $CH_3$ | $CH_3$ | —$CH_2CF_2CF_2H$ | —$CH_2CF_2CF_2H$ | $X_{34}$ = —$OCH_2CF_2CHF_2$ | $X_{38}$ = —$OCH_2CF_2CHF_2$ |
| A-53 | $CH_3$ | $CH_3$ | $CH_3$ | $CH_3$ | —$CH_2CF_3$ | —$CH_2CF_3$ | $X_{34}$ = —$OCH_2CF_3$ | $X_{38}$ = —$OCH_2CF_3$ |
| A-54 | $CH_3$ | $CH_3$ | $CH_3$ | $CH_3$ | —$CH_2CH_2CF_2CF_3$ | —$CH_2CH_2CF_2CF_3$ | $X_{34}$ = —$OCH_2CH_2CF_2CF_3$ | $X_{38}$ = —$OCH_2CH_2CF_2CF_3$ |
| A-55 | $CH_3$ | $CH_3$ | $CH_3$ | $CH_3$ | —$CH_2$—$C(CF_3)_2$—$CH_3$ | —$CH_2$—$C(CF_3)_2$—$CH_3$ | $X_{34}$= —$OCH_2$—$C(CF_3)_2$—$CH_3$ | $X_{34}$= —$OCH_2$—$C(CF_3)_2$—$CH_3$ |

| Dye No. | $X_{39}$~$X_{42}$ | $X_{43}$~$X_{46}$ |
|---|---|---|
| A-52 | $X_{42}$ = —$OCH_2CF_2CHF_2$ | $X_{46}$ = —$OCH_2CF_2CHF_2$ |

-continued

| | | |
|---|---|---|
| A-53 | $X_{42}$ = —OCH$_2$CF$_3$ | $X_{46}$ = —OCH$_2$CF$_3$ |
| A-54 | $X_{42}$ = —OCH$_2$CH$_2$CF$_2$CF$_3$ | $X_{46}$ = —OCH$_2$CH$_2$CF$_2$CF$_3$ |

A-55

$$X_{42}= -OCH_2-\underset{\underset{CF_3}{|}}{\overset{\overset{CF_3}{|}}{C}}-CH_3 \quad X_{46}= -OCH_2-\underset{\underset{CF_3}{|}}{\overset{\overset{CF_3}{|}}{C}}-CH_3$$

The aforementioned phthalocyanine dyes may be synthesized in the light of methods as disclosed in JP-A 313760/1988, JP-A 301261/1988, EP 675489, etc.

These dyes have a melting point (mp) of 60° to 400° C.

These phthalocyanine dyes have n and k at 780 nm as reported in Tables 1 and 2. These values of n and k were determined from a dye film of 80 nm thick. The half-value width of an absorption spectrum of a dye thin film was also determined as mentioned above, with the results being reported together with λmax (thin film).

TABLE 1

| Dye No. | (absorption spectrum) | | | |
|---|---|---|---|---|
| | (780 nm) | | | Half-value |
| | n | k | λmax, nm | width, nm |
| A-1 | 2.2 | 0.08 | 724 | 130 |
| A-2 | 2.3 | 0.05 | 715 | 140 |
| A-3 | 2.4 | 0.10 | 725 | 125 |
| A-4 | 2.3 | 0.10 | 724 | 130 |
| A-5 | 2.3 | 0.11 | 724 | 125 |
| A-6 | 2.4 | 0.10 | 725 | 130 |
| A-7 | 2.3 | 0.09 | 723 | 120 |
| A-8 | 2.2 | 0.10 | 725 | 140 |
| A-9 | 2.2 | 0.10 | 723 | 120 |
| A-10 | 2.3 | 0.11 | 723 | 130 |
| A-11 | 2.2 | 0.11 | 723 | 125 |
| A-12 | 2.1 | 0.10 | 726 | 125 |
| A-13 | 2.2 | 0.10 | 727 | 125 |
| A-14 | 2.2 | 0.10 | 725 | 125 |
| A-15 | 2.2 | 0.11 | 723 | 130 |
| A-16 | 2.3 | 0.12 | 725 | 130 |
| A-17 | 2.3 | 0.10 | 723 | 125 |
| A-18 | 2.3 | 0.09 | 725 | 125 |
| A-19 | 2.2 | 0.05 | 715 | 130 |
| A-20 | 2.2 | 0.08 | 720 | 130 |
| A-21 | 2.2 | 0.07 | 718 | 135 |
| A-22 | 2.2 | 0.08 | 720 | 140 |
| A-23 | 2.2 | 0.13 | 730 | 120 |
| A-24 | 2.2 | 0.11 | 725 | 125 |
| A-25 | 2.2 | 0.10 | 726 | 125 |

TABLE 2

| Dye No. | (absorption spectrum) | | | |
|---|---|---|---|---|
| | (780 nm) | | | Half-value |
| | n | k | λmax, nm | width, nm |
| A-26 | 2.3 | 0.09 | 725 | 130 |
| A-27 | 2.3 | 0.09 | 720 | 135 |
| A-28 | 2.4 | 0.09 | 725 | 130 |
| A-29 | 2.3 | 0.10 | 720 | 125 |
| A-30 | 2.4 | 0.11 | 723 | 125 |
| A-31 | 2.3 | 0.10 | 721 | 125 |
| A-32 | 2.2 | 0.11 | 722 | 130 |
| A-33 | 2.3 | 0.10 | 724 | 125 |
| A-34 | 2.4 | 0.10 | 725 | 130 |
| A-35 | 2.4 | 0.10 | 721 | 125 |

TABLE 2-continued

| Dye No. | (absorption spectrum) | | | |
|---|---|---|---|---|
| | (780 nm) | | | Half-value |
| | n | k | λmax, nm | width, nm |
| A-36 | 2.4 | 0.10 | 722 | 135 |
| A-37 | 2.3 | 0.09 | 725 | 140 |
| A-38 | 2.3 | 0.09 | 725 | 135 |
| A-39 | 2.3 | 0.07 | 715 | 135 |
| A-40 | 2.3 | 0.08 | 720 | 135 |
| A-41 | 2.3 | 0.08 | 720 | 125 |
| A-42 | 2.3 | 0.08 | 720 | 135 |
| A-43 | 2.2 | 0.09 | 728 | 140 |
| A-44 | 2.2 | 0.09 | 728 | 140 |
| A-45 | 2.2 | 0.09 | 726 | 135 |
| A-46 | 2.2 | 0.10 | 727 | 140 |
| A-47 | 2.2 | 0.09 | 723 | 130 |
| A-48 | 2.2 | 0.10 | 725 | 135 |
| A-49 | 2.3 | 0.08 | 718 | 140 |
| A-50 | 2.2 | 0.10 | 726 | 125 |
| A-51 | 2.2 | 0.07 | 718 | 130 |
| A-52 | 2.3 | 0.08 | 710 | 145 |
| A-53 | 2.2 | 0.07 | 712 | 140 |
| A-54 | 2.1 | 0.07 | 718 | 125 |
| A-55 | 2.2 | 0.09 | 716 | 120 |

It is noted that the phthalocyanine dyes may be used alone or in admixture of two or more.

The coating solvent used in the practice of the invention may be selected from alcohol solvents (including keto-alcohols and alkoxyalcohols such as ethylene glycol monoalkyl ethers), aliphatic hydrocarbon solvents, ketone solvents, ester solvents, ether solvents, aromatic solvents, halogenated alkyl solvents, etc.

Preferred among these are alcohol and aliphatic hydrocarbon solvents. Preferable alcohol solvents are alkoxy-alcohols and keto-alcohols. In the preferred alkoxy-alcohols, the alkoxy moiety has 1 to 4 carbon atoms, the alcohol moiety has 1 to 5 carbon atoms, especially 2 to 5, and the total number of carbon atoms is 3 to 7. Examples include ethylene glycol monomethyl ether (methyl cellosolve), ethylene glycol monoethyl ether (ethyl cellosolve also known as ethoxyethanol), butyl cellosolve, ethylene glycol monoalkyl ethers (cellosolves) such as 2-isopropoxy-1-ethanol, 1-methoxy-2-propanol, 1-methoxy-2-butanol, 3-methoxy-1-butanol, 4-methoxy-1-butanol, and 1-ethoxy-2-propanol. An exemplary keto-alcohol is diacetone alcohol. Fluorinated alcohols such as 2,2,3,3-tetrafluoropropanol are also useful.

Preferred for the aliphatic hydrocarbon solvents are n-hexane, cyclohexane, methylcyclohexane, ethylcyclohexane, cyclooctane, dimethylcyclohexane, n-octane, iso-propylcyclohexane and t-butylcyclohexane, among which ethylcyclohexane and dimethylcyclohexane are most preferable.

Cyclohexanone is typical of the ketone solvent.

In the practice of the invention, alkoxyalcohols such as ethylene glycol monoalkyl ethers are preferred. Preferred among these are ethylene glycol monoethyl ether, 1-methoxy-2-propanol, 1-methoxy-2-butanol, etc. Also preferred is a mixture of these solvents, for example, a combination of ethylene glycol monoethyl ether and 1-methoxy-2-butanol.

It is understood that the azo metal complex dye according to the invention and the phthalocyanine dye are respectively used as a mixture of two or more so as to meet the above-mentioned values of n and k.

In a recording layer of an optical recording medium intended for recording and reading at two wavelengths, the azo metal complex dye according to the invention and the other dye as typified by phthalocyanine dyes are preferably mixed such that the molar ratio of azo metal complex dye/other dye may range from 90/10 to 10/90.

A recording layer of the mix type mentioned just above may be formed using a coating solution containing the two dyes in a predetermined ratio.

Also acceptable for the purpose of recording and reading at two wavelengths is a recording layer in which a layer of the azo metal complex dye according to the invention and a layer of the other dye are disposed one on top of the other. The order of lamination may be suitably chosen while one layer usually has a thickness of about 400 to 2,500 Å (40 to 250 nm). A recording layer of the laminate type may be formed using coating solutions containing the respective dyes.

In the two layer structure using a recording layer of the laminate type, it is preferred that a lower recording layer (or first recording layer) containing an azo metal complex dye accommodating for short wavelength be disposed on a substrate and an upper recording layer (or second recording layer) containing another dye such as phthalocyanine dye accommodating for 780 nm be disposed thereon. It is preferred herein that the lower recording layer is thinner than the upper recording layer and that the lower and upper recording layers are formed such that the thickness ratio of lower layer/upper layer may range from 1/10 to 1/1.

Figure 2:
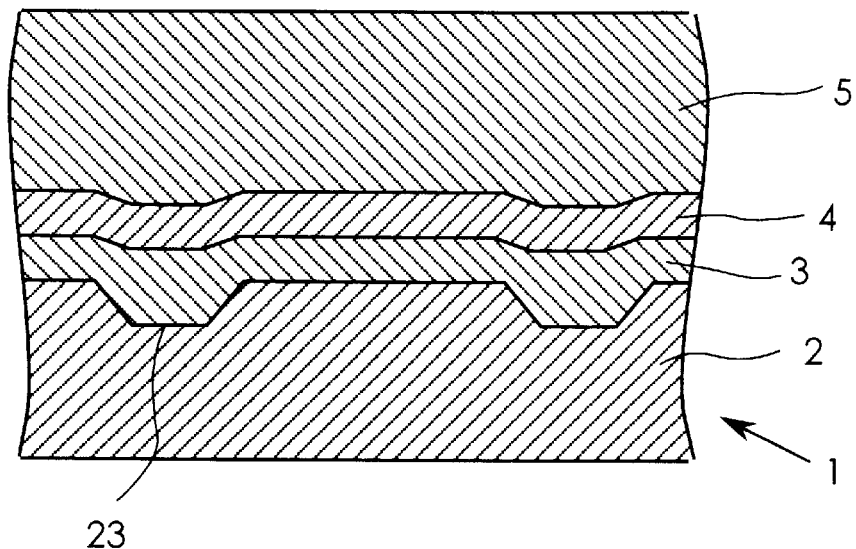
FIG. 2 is a fragmental cross-sectional view of an optical recording disc according to one embodiment of the invention.
Figure 3:
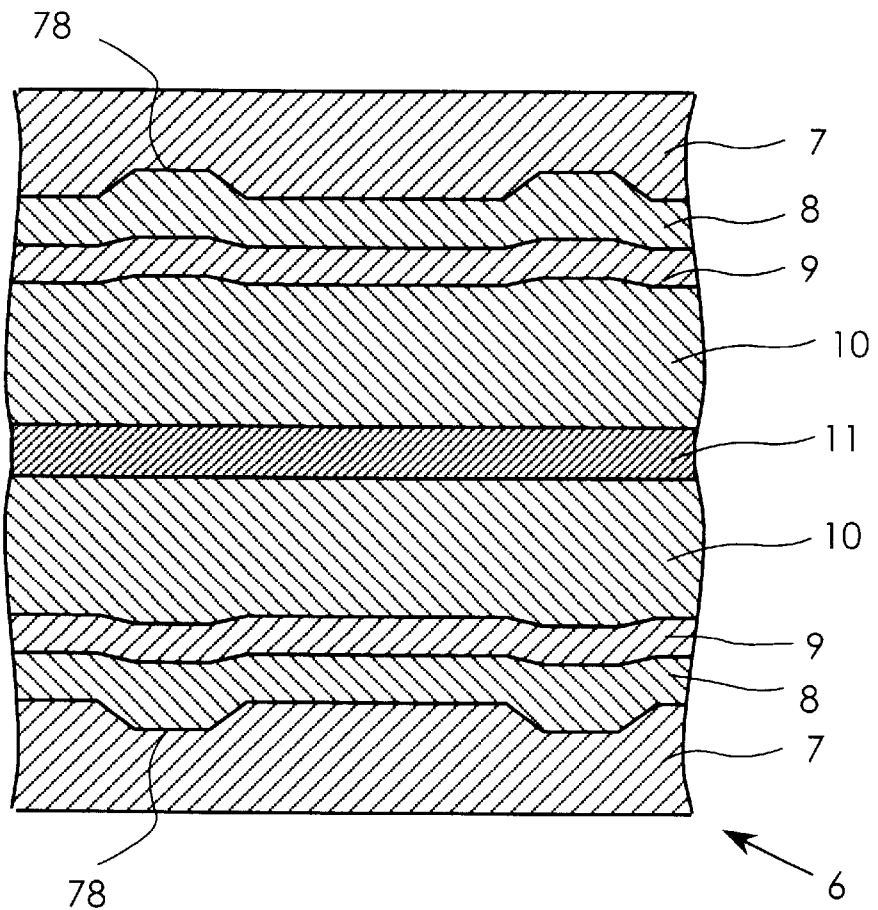
FIG. 3 is a fragmental cross-sectional view of an optical disc according to another embodiment of the invention.

Structural embodiments of the optical recording disc having such a recording layer accommodating for two wavelengths or a short wavelength on a substrate are schematically illustrated in FIGS. 2 and 3. FIGS. 2 and 3 are fragmental sectional views.

Referring to FIG. 2, the optical recording disc 1 shown in FIG. 2 is a close contact type optical recording disc which has a recording layer and a reflective layer disposed in close contact therewith and enables reading according to the CD standard. As illustrated, the optical recording disc 1 includes a recording layer 3 containing an azo metal complex dye according to the invention, which is formed on the surface of a substrate 2, a reflective layer (or film) 4 in close contact with the recording layer 3, and a protective layer (or film) 5.

The recording layer 3 may be either of the two wavelength accommodating mode including the mix type and the laminate type using an azo metal complex dye and another dye or of the short wavelength accommodating mode using an azo metal complex dye as a major component.

The substrate 2 is in a disc form and, to enable write and read from the back surface of the substrate 2, is preferably formed of a resin or glass material which is substantially transparent to writing and reading light (typically laser light having a wavelength of about 500 nm to about 900 nm, further typically about 500 to 700 nm, still further typically about 630 to 690 nm, most typically about 635 nm to about 680 nm, laser light having a wavelength of about 680 to 900 nm, further typically about 680 to 780 nm, and semiconductor laser light having a wavelength of about 770 nm to about 900 nm, further typically about 770 to 830 nm; especially 635 nm to 650 nm and 780 nm) or in another parlance, has a transmittance of at least 88%. With respect to dimensions, the disc has a diameter of about 64 mm to about 200 mm and a thickness of about 1.2 mm.

On the surface of the substrate 2 where the recording layer 3 is formed, a groove 23 is formed for tracking purposes, as shown in FIG. 2. The groove 23 is preferably a continuous spiral groove having a depth of 0.1 to 0.25 μm, a width of 0.35 to 0.60 μm for the mix type and the short wavelength accommodating mode and 0.35 to 0.80 μm for the laminate type and a groove pitch of 1.5 to 1.7 μm. Such groove configuration enables good-enough tracking signals to be obtained without a lowering of the reflection level of the groove area. It is particularly important to limit the groove width to 0.35 to 0.80 μm or 0.35 to 0.60 μm. A groove width of less than 0.35 μm makes it difficult to obtain tracking signals of sufficient magnitude, resulting in an increased jitter even when tracking is slightly offset during recording. A too greater groove width has a likelihood that read signals are subject to waveform distortion.

The substrate 2 is preferably formed of resins, typically thermoplastic resins such as polycarbonate resins, acrylic resins, amorphous polyolefins, TPX and polystyrene resins. Using these resins, the substrate can be prepared by well-known techniques such as injection molding. Preferably, the groove 23 should be formed simultaneously with the molding of the substrate 2. Alternatively, a resin layer having the groove 23 may be formed by 2P or other methods after the fabrication of the substrate 2. Also, a glass substrate is useful as the case may be.

As shown in FIG. 2, the recording layer 3 deposited on the substrate 2 is formed using the above-mentioned dye-containing coating solution, preferably by spin coating as mentioned previously. Spin coating may be carried out from the inner to the outer periphery under conventional conditions while the number of revolutions is adjusted between 500 rpm and 5,000 rpm.

Preferably, the thus formed recording layer 3 has an as-dried thickness of 500 to 3,000 Å (50 to 300 nm) for the mix type and the short wavelength accommodating mode. A departure from this range gives rise to a reflectance drop, rendering it difficult to read according to the CD standard. A very high degree of modulation is obtained when the thickness of the tracking area of the recording layer 3 within the groove 23 is kept at 1,000 Å (100 nm) or more, especially, at 1,300 to 3,000 Å (130 to 300 nm).

For the laminate type, each recording layer preferably has an as-dried thickness of 400 to 2,500 Å (40 to 250 nm) as previously mentioned because better reading is expectable. Also preferably the thickness of the tracking area of the recording layer 3 within the groove 23 is kept at 500 Å (50 nm) or more, especially, at 500 to 800 Å (50 to 80 nm). Further, in the embodiment of the two layer structure having the azo metal complex dye according to the invention contained in the lower layer as previously mentioned, better recording and reading at 780 nm is expectable in the CD-RII mode by controlling the thickness of the upper and lower layers as mentioned above.

The thus formed recording layer 3 should preferably have n=1.8 to 2.3 and k=0.02 to 0.20 at 635 to 650 nm and n=1.8 to 2.5 and k=0.03 to 0.15 at 780 nm when it is a recording layer of the dye mix type accommodating for two wavelengths. The recording layer 3 should preferably have n=1.8 to 2.3 and k=0.02 to 0.20 at 635 to 650 nm and n=1.8 to 2.6 and k=0.02 to 0.15 at 780 nm when it is a recording layer of the laminate type accommodating for two wavelengths. By controlling n and k within these ranges, better recording and reading at two wavelengths is possible. Especially at the conventional wavelength of about 780 nm, recording and reading complying with the Orange Book standard is possible.

In the mode accommodating for a short wavelength of about 635 to 650 nm, the recording layer should preferably have a coefficient of extinction k (imaginary part of a complex index of refraction) of 0 to 0.20 at the wavelength of recording light and reading light. With k greater than 0.20, no satisfactory reflectance is obtained. Further, the recording layer should preferably have an index of refraction n (real part of a complex index of refraction) of at least 1.8. With n less than 1.8, signal modulation would be too small. No upper limit is imposed on n although it is usually about 2.6 for convenience of synthesis of dye compounds and other reasons.

It is noted that n and k of a recording layer are determined by preparing a test sample in which a recording layer is formed on a given transparent substrate to a thickness of about 40 to 100 nm, for example, under practical conditions, and measuring the test sample for reflectance through the substrate or on the recording layer side. The reflectance is measured in a specular reflection mode (of the order of 5°) using the wavelength of recording light and reading light. The sample is also measured for transmittance. From these measurements, n and k are calculated according to Ishiguro Kozo, "Optics," Kyoritsu Publishing K.K., pages 168–178, for example.

It is understood that a recording layer has n and k which correspond to n and k of a particular dye used therein.

As shown in FIG. 2, the reflective layer 4 is formed on the recording layer 3 in direct contact relation thereto. Preferably, the reflective layer 4 is formed of a high-reflectance metal or alloy such as Au, Cu, Al, Ag and CuAg. The reflective layer 4 preferably has a thickness of at least 500 Å, and may be formed as by evaporation and sputtering. The upper limit of thickness is not critical, although it is preferably about 1,200 Å or less when cost, production time and other factors are taken into account. Then the reflective layer itself has a reflectance of at least 90%, and the reflectance of an unrecorded area of the medium through the substrate is satisfactory and can be at least 60%, especially at least 70% at the conventional wavelength of about 780 nm in the case of the two wavelength accommodating mode.

As shown in FIG. 2, the protective layer 5 is formed on the reflective layer 4. The protective layer 5 is formed of various resin materials such as UV curable resins, for instance, and usually has a thickness of about 0.5 $\mu$m to about 100 $\mu$m. The protective layer 5 may be in a layer or sheet form. The protective layer 5 may be formed by conventional processes such as spin coating, gravure coating, spray coating and dipping.

Recording or additional writing may be carried out on the optical recording disc 1 of such construction by directing recording light having a wavelength of 650 nm or 780 nm, for example, in pulse form to the recording layer 3 through the substrate 2 to form an irradiated spot where optical reflectance is changed. Upon irradiation of recording light, the recording layer 3 absorbs light so that it is heated while the substrate 2 is heated at the same time. As a result, the materials of the recording layer such as the dyes melt or decompose irn the vicinity of the interface between the substrate 2 and the recording layer 3, probably applying pressure to that interface to deform the bottom and side walls of the groove.

Next the embodiment shown in FIG. 3 is described. The optical recording disc 6 shown in FIG. 3 is a close contact type optical recording disc, which disc can be read by means of a commercially available DVD player, of the structure obtained by forming a reflective layer in close contact with a recording layer, forming a protective film thereon to form a disc, and adhesively joining two such discs such that the protective layers are inside. As shown in the figure, the optical recording disc 6 has a recording layer 8 containing an azo metal complex dye according to the invention on a surface of a substrate 7, and a reflective layer (or film) 9 in close contact with the recording layer 8 and a protective layer (or film) 10, and an adhesive layer 11 inside the protective films 10 of two discs.

The substrate 7 is in a disc form and, to enable write and read from the back surface of the substrate 7, is preferably formed of a resin or glass material which is substantially transparent to writing and reading light (typically laser light having a wavelength of about 500 nm to about 900 nm, further typically about 500 to 680 nm, still further typically about 635 nm to about 680 nm; especially 635 nm to 650 nm) or in another parlance, has a transmittance of at least 88%. With respect to dimensions, the disc has a diameter of about 64 mm to about 200 mm and a thickness of about 0.6 mm.

On the surface of the substrate 7 where the recording layer 8 is formed, a groove 78 is formed for tracking purposes, as shown in FIG. 3. The groove 78 is preferably a continuous spiral groove having a depth of 0.04 to 0.15 $\mu$m, a width of 0.20 to 0.45 $\mu$m, and a groove pitch of 0.74 to 0.80 $\mu$m. Such groove configuration enables good-enough tracking signals to be obtained without a lowering of the reflection level of the groove area. It is particularly important to limit the groove width to 0.20 to 0.45 $\mu$m. A groove width of less than 0.20 $\mu$m makes it difficult to obtain tracking signals of sufficient magnitude, resulting in an increased jitter even when tracking is slightly offset during recording. A groove width greater than 0.45 $\mu$m has a likelihood that read signals are subject to waveform distortion, causing an increased crosstalk.

The substrate 7 is preferably formed of resins, typically thermoplastic resins such as polycarbonate resins, acrylic resins, amorphous polyolefins, TPX and polystyrene resins. Using these resins, the substrate can be prepared by well-known techniques such as injection molding. Preferably, the groove 78 should be formed simultaneously with the molding of the substrate 7. Alternatively, a resin layer having the groove 78 may be formed by 2P or other methods after the fabrication of the substrate 7. Also, a glass substrate is useful as the case may be.

As shown in FIG. 3, the recording layer 8 deposited on the substrate 7 is formed using the above-mentioned dye-containing coating solution, preferably by spin coating as mentioned previously. Spin coating may be carried out from the inner to the outer periphery under conventional conditions while the number of revolutions is adjusted between 500 rpm and 5,000 rpm.

Preferably, the thus formed recording layer 3 has an as-dried thickness of 400 to 2,000 Å (40 to 200 nm). A departure from this range gives rise to a reflectance drop, rendering it difficult to read by means of a commercially available DVD player. A very high degree of modulation is obtained when the thickness of the tracking area of the recording layer 8 within the groove 78 is kept at 400 Å (40 nm) or more, especially, at 600 to 2,000 Å (60 to 200 nm).

In the mode accommodating for a short wavelength of about 635 to 650 nm, the recording layer 8 should preferably have a coefficient of extinction k (imaginary part of a complex index of refraction) of 0.02 to 0.20 at the wavelength of recording light and reading light when signals are to be recorded. With k less than 0.02, the recording layer has a low absorbance so that recording with an ordinary recording power might be difficult. With k greater than 0.20, reflectance becomes low so that reading by means of a commercially available DVD player might be difficult. Further, the recording layer should preferably have an index of refraction n (real part of a complex index of refraction) of 2.0 to 2.6. With n<2.0, reflectance becomes low and read signals become of low magnitude so that reading by means of a commercially available DVD player might be difficult. With n>2.6, synthesis of such a dye is difficult.

As shown in FIG. 3, the reflective layer 9 is formed on the recording layer 8 in direct contact relation thereto. Preferably, the reflective layer 9 is formed of a high-reflectance metal or alloy such as Au, Cu, Al, Ag and CuAg. The reflective layer 9 preferably has a thickness of at least 400 Å, and may be formed as by evaporation and sputtering. The upper limit of thickness is not critical, although it is preferably about 1,200 Å or less when cost, production time and other factors are taken into account. Then the reflective layer itself has a reflectance of at least 90%, and the reflectance of an unrecorded area of the medium through the substrate is satisfactory.

As shown in FIG. 3, the protective layer 10 is formed on the reflective layer 9. The protective layer 10 is formed of various resin materials such as UV curable resins, for instance, and usually has a thickness of about 0.5 μm to about 100 μm. The protective layer 10 may be in a layer or sheet form. The protective layer 10 may be formed by conventional processes such as spin coating, gravure coating, spray coating and dipping.

As shown in FIG. 3, two discs are joined such that the adhesive layer 11 intervenes between the protective layers 10. The adhesive layer 11 may be formed from various adhesive resins such as thermoplastic resins, UV curable resins, thermosetting resins, and anaerobic curing resins to a thickness of about 0.5 to 100 μm. The adhesive 11 may be in a layer of sheet form. The adhesive layer 11 may be formed by conventional processes such as spin coating, gravure coating, and spray coating. After the adhesive layers 11 are formed, two discs are joined at their adhesive layers.

Recording or additional writing may be carried out on the optical recording disc 6 of such construction by directing recording light having a wavelength of 635 nm, for example, in pulse form to the recording layer 8 through the substrate 7 to form an irradiated spot where optical reflectance is changed. Upon irradiation of recording light, the recording layer 8 absorbs light so that it is heated while the substrate 7 is heated at the same time. As a result, the materials of the recording layer such as the dyes melt or decompose in the vicinity of the interface between the substrate 7 and the recording layer 8, probably applying pressure to that interface to deform the bottom and side walls of the groove.

EXAMPLE

Examples of the invention are given below by way of illustration.

Example 1

By spin coating a 2 wt % 2-ethoxyethanol solution of dye No. I-1 among the azo metal complex dyes listed above, a dye film was formed on a polycarbonate substrate having a diameter of 120 mm and a thickness of 1.2 mm. This thin film sample was measured to transmission and reflection spectra. The dye film had a thickness (dry film thickness) of 500 Å (50 nm). The results are shown in FIG. 4.

Figure 4:
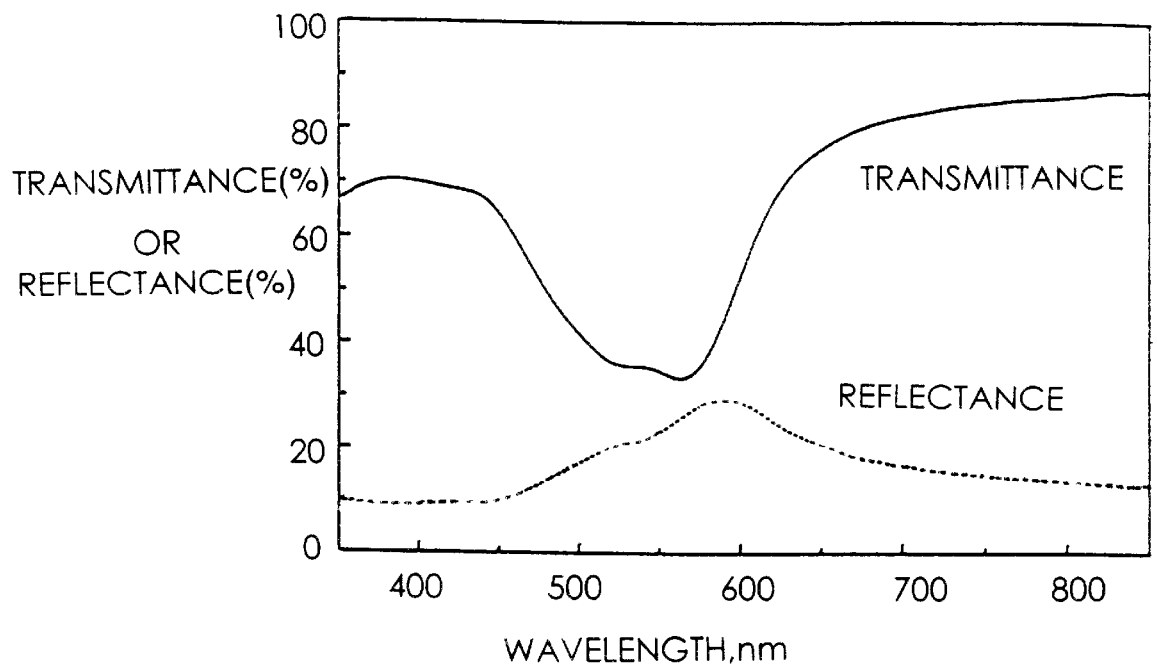
FIG. 4 is a graph showing transmission and reflection spectra of an azo metal complex dye used in the invention.

It is seen from FIG. 4 that this compound exhibits high reflectance in a wide wavelength region of 700 to 500 nm. This shows that it is a dye capable of accommodating for commercially available CD or DVD players in this wavelength region.

Example 2

The thin film sample of Example 1 was examined for light resistance. Light resistance was examined by measuring an initial transmittance $T_0$, exposing the sample to a xenon lamp (Xenon Fadeometer manufactured by Shimazu Mfg. K.K.) at 80,000 lux, and measuring a transmittance T after irradiation, and calculating a percent dye retention according to $(100-T)/(100-T_0) \times 100\%$. The percent dye retention after 100 hours of irradiation was found to be about 95%.

It was proven that dye No. I-1 was fully resistant to light.

Example 3

An optical recording disc was fabricated using the same dye No. I-1 as in Example 1 as a dye to form a recording layer. On a polycarbonate resin substrate of 120 mm in diameter and 0.6 mm in thickness which was previously provided with a groove (having a depth of 0.10 μm, a width of 0.42 μm, and a groove pitch of 0.80 μm), a recording layer containing the dye was formed to a thickness of 900 Å (90 nm) by spin coating. The coating solution used herein was a 2 wt % 2-ethoxyethanol solution. Next, an Au reflective layer of 850 Å thick was formed on the recording layer by sputtering, and a protective layer (5 μm thick) of a UV-curing type acrylic resin was formed thereon. Two disc samples formed in this way were mated such that the protective layers were joined with adhesive, obtaining a disc. This is designated disc sample No. 1.

Disc sample No. 2 was fabricated in the same manner as disc sample No. 1 except that the recording layer was formed by using the azo cobalt complex dye of the structure (shown below) disclosed in JP-B 51682/1995 and preparing a 2.0 wt % 2-ethoxyethanol solution thereof.

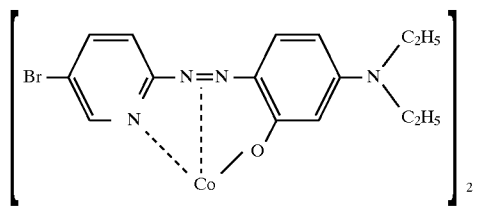

The thus fabricated optical recording discs, sample Nos. 1 and 2, were measured for optimum recording power (Po) and jitter by using a laser (oscillation wavelength 635 nm) and recording 8/16 modulated signals at a linear velocity of 1.2 m/sec. The optimum recording power means the range where asymmetry is 0% as measured by a tester (Pulstech Co.) used for record examination. The results are shown in Table 3. with respect to jitter, a loss of jitter after light exposure under the same conditions as in Example 2 was also evaluated.

TABLE 3

| Disc Sample No. | Recording layer-forming dye | Po (mW) | Jitter (%, σ/Tw) Initial | After exposure |
|---|---|---|---|---|
| 1 (invention) | dye No. I-1 | 9.0 | 7.8 | 8.0 |
| 2 (compar.) | comparative dye | 9.8 | 16.0 | 21.5 |

It is evident from Table 3 that as compared with the azo cobalt complex dye disclosed in JP-B 51682/1995, the azo cobalt complex dye within the scope of the invention has a low optimum recording power, that is, high recording sensitivity. Also read signals are improved in jitter.

Example 4

An optical recording disc was fabricated using the same dye No. I-1 as in Example 1 as a dye to form a recording layer. On a polycarbonate resin substrate of 120 mm in diameter and 1.2 mm in thickness which was previously provided with a groove (having a depth of 0.16 μm, a width of 0.48 μm, and a groove pitch of 1.6 μm), a recording layer containing the dye was formed to a thickness of 2,000 Å (200 nm) by spin coating. The coating solution used herein was a 2 wt % 2-ethoxyethanol solution. Next, an Au reflective layer of 850 Å thick was formed on the recording layer by sputtering, and a transparent protective layer (5 μm thick) of a UV-curing type acrylic resin was formed thereon. This is designated disc sample No. 3.

Disc sample No. 4 was fabricated in the same manner as disc sample No. 3 except that the recording layer was formed by using the azo cobalt complex dye of the structure disclosed in JP-B 51682/1995 (comparative dye used in disc sample No. 2 in Example 3) and preparing a 2.0 wt % 2-ethoxyethanol solution thereof.

The thus fabricated optical recording discs, sample Nos. 3 and 4, were measured for optimum recording power (Po) and jitter by using a laser (oscillation wavelength 650 nm) and recording signals at a linear velocity of 1.2 m/sec. The optimum recording power means the range where asymmetry is −2% as measured by a tester (Pulstech Co.) used for record examination. The results are shown in Table 4. With respect to jitter, a loss of jitter after light exposure under the same conditions as in Example 2 was also evaluated.

TABLE 4

| Disc Sample No. | Recording layer-forming dye | Po (mW) | Jitter (ns) Initial | After exposure |
|---|---|---|---|---|
| 3 (invention) | dye No. I-1 | 5.7 | 21 | 27 |
| 4 (compar.) | comparative dye | 9.2 | 28 | 39 |

It is evident from Table 4 that as compared with the azo cobalt complex dye disclosed in JP-B 51682/1995, the azo cobalt complex dye within the scope of the invention has a low optimum recording power, that is, high recording sensitivity. Also read signals are improved in jitter.

Example 5

An optical recording disc was fabricated in the same manner as disc sample No. 3 in Example 4 except that the recording layer was formed by using dye No. I-1 and phthalocyanine dye A-52 as a dye to form a recording layer and preparing a 2 wt % 2-ethoxyethanol solution of a dye mixture (molar ratio of dye No. I-1/phthalocyanine dye A-52=30/70). This is designated disc sample No. 5.

Disc sample No. 6 was fabricated in the same manner as disc sample No. 5 except that the molar ratio of dye No. I-1/phthalocyanine dye A-52=50/50.

Disc sample No. 7 was fabricated in the same manner as disc sample No. 6 except that the azo cobalt complex dye of the chemical formula [23] disclosed in JP-B 51682/1995 (comparative dye used in disc sample No. 2 in Example 3) was used instead of dye No. I-1.

These disc samples were recorded as in Example 4 in accordance with the Orange Book standard using laser light of 780 nm. The disc samples were measured for modulation ($I_{11}$Mod) and jitter by reading signals with laser light of 650 nm. The results are shown in Table 5.

TABLE 5

| Disc sample No. | Recording layer-forming dyes (molar ratio) | $I_{11}$Mod (%) | Jitter (ns) |
|---|---|---|---|
| 5 (invention) | I-1/A-52 = 30/70 | 62 | 26 |
| 6 (invention) | I-1/A-52 = 50/50 | 67 | 19 |
| 7 (compar.) | comparative dye/A-52 = 50/50 | 58 | >40 |

It is evident from Table 5 that the azo cobalt complex dye within the scope of the invention exerts improved performance not only when used alone in the optical recording layer, but also when used in a mix system with a dye having absorption on a longer wavelength side, for example, a phthalocyanine dye for the purpose of being compatible with 780 nm prescribed by the Orange Book standard and read on a short wavelength side of about 650 nm, because neither modulation nor jitter is exacerbated. In contrast, azo metal complex dyes of the type used as the comparative dye result in read signals with greater jitter and lower modulation than the inventive dyes. It is also seen that the inventive dyes achieve the desired characteristics in a smaller mix amount than azo metal complex dyes of the type used as the comparative dye.

Further, each disc sample which had been recorded at 780 nm as mentioned above was measured for modulation and jitter when read with laser light of 780 nm. Among the disc samples using the dye within the scope of the invention, sample No. 5 had a modulation of 68% and a jitter of 19 ns and sample No. 6 had a modulation of 70% and a jitter of 20 ns. In contrast, sample No. 7 using the comparative dye had a modulation of 62% and a jitter of 42 ns, indicating that the dye within the scope of the invention provides better characteristics.

Further, when each disc sample which had been recorded with laser light of 650 nm at a linear velocity of 1.2 m/sec. was read with laser light of 650 nm, disc sample Nos. 5 and 6 within the scope of the invention were read in an advantageous manner, with better results of modulation and jitter. In contrast, comparative disc sample No. 7 showed inferior characteristics to the inventive samples.

Further, when each disc sample which had been recorded with laser light of 650 nm was read with laser light of 780 nm, disc sample Nos. 5 and 6 within the scope of the invention were read in an advantageous manner, with better results of modulation and jitter. In contrast, comparative disc sample No. 7 showed inferior characteristics to the inventive samples.

It is thus proven that disc sample Nos. 5 and 6 within the scope of the invention can be advantageously used as an optical recording disc accommodating for two wavelengths.

Example 6

Disc sample Nos. 8, 9, and 10 were prepared in the same manner as disc sample Nos. 5, 6, and 7 of Example 5 except that the recording layer was obtained by substituting phthalocyanine dye A-3 for phthalocyanine dye A-52, using 1-methoxy-2-butanol as a coating solvent, and preparing a 2 wt % solution thereof to form a dye film.

Disc sample Nos. 8 to 10 were examined for various characteristics as in Example 5 to find that disc sample Nos. 8 and 9 had characteristics at least equivalent to disc sample Nos. 5 and 6. In contrast, disc sample No. 10 showed characteristics merely comparable to disc sample No. 7.

Among various measurements, the results of measurement of modulation ($I_{11}$Mod) and jitter associated with recording at 780 nm and reading at 650 nm are shown in Table 6.

TABLE 6

| Disc sample No. | Recording layer-forming dyes (molar ratio) | $I_{11}$Mod (%) | Jitter (ns) |
| --- | --- | --- | --- |
| 8 (invention) | I-1/A-3 = 30/70 | 65 | 24 |
| 9 (invention) | I-1/A-3 = 50/50 | 72 | 20 |
| 10 (compar.) | cornparative dye/A-3 = 50/50 | 60 | >40 |

Example 7

Disc sample Nos. 11, 12, and 13 were prepared in the same manner as disc sample Nos. 5, 6, and 7 of Example 5 except that the recording layer was obtained by substituting phthalocyanine dye A-1 for phthalocyanine dye A-52, using 1-methoxy-2-butanol as a coating solvent, and preparing a 2 wt % solution thereof to form a dye film.

Disc sample Nos. 11 to 13 were examined for various characteristics as in Example 5 to find that disc sample Nos. 11 and 12 had characteristics at least equivalent to disc sample Nos. 5 and 6. In contrast, disc sample No. 13 showed characteristics merely comparable to disc sample No. 7.

Among various measurements, the results of measurement of modulation ($I_{11}$Mod) and jitter associated with recording at 780 nm and reading at 650 nm are shown in Table 7.

TABLE 7

| Disc sample No. | Recording layer-forming dyes (molar ratio) | $I_{11}$Mod (%) | Jitter (ns) |
| --- | --- | --- | --- |
| 11 (invention) | I-1/A-1 = 30/70 | 63 | 23 |
| 12 (invention) | I-1/A-1 = 50/50 | 69 | 20 |
| 13 (compar.) | comparative dye/A-1 = 50/50 | 59 | >40 |

It is evident that as compared with well-known azo metal complex dyes for optical recording layers as typified by the comparative dye, azo metal complex dyes within the scope of the invention as typified by dye No. I-1 are improved in recording sensitivity and jitter characteristic. It is also seen that when used in admixture with another light absorbing dye, the inventive dyes show unexpected results as demonstrated by read signals free from jitter deterioration.

Example 8

Disc samples were prepared in the same manner as disc sample No. 1 of Example 3, disc sample No. 3 of Example 4, disc sample Nos. 5 and 6 of Example 5, disc sample Nos. 8 and 9 of Example 6, and disc sample Nos. 11 and 12 of Example 7 except that dye Nos. I-2, I-3, I-7, I-8, I-9, I-28, I-32, I-53, I-65, I-79, I-107, I-143, and I-193, all listed previously, were used instead of dye No. I-1 or two or more of these dyes inclusive of dye No. I-1 were used in admixture. The disc samples were examined for characteristics as in Examples 3 to 7 to find that they showed equivalent characteristics to disc sample Nos. 1, 3, 5, 6, 8, 9, 11, and 12 in accordance with their construction. Also the above-mentioned dyes within the scope of the invention other than dye No. I-1 were examined for light resistance as in Example 2, finding that their light resistance was as good as dye No. I-1.

Example 9

On a polycarbonate resin substrate as used in Example 4, a lower recording layer of 50 nm thick was formed using a 2 wt % 2,2,3,3-tetrafluoropropanol solution of dye No. I-1, and an upper recording layer of 100 nm thick was formed using a 1.5 wt % ethylcyclohexane solution of dye A-3. By subsequently following the procedure of Example 4, a disc sample was prepared.

The thus prepared disc sample No. 14 was examined for characteristics as in Example 5 to find satisfactory results as found for the inventive samples of Examples 5 to 7. Among various measurements, the results of measurement of modulation ($I_{11}$Mod) and jitter associated with recording at 780 nm and reading at 650 nm are shown below.

$I_{11}$Mod=66%

Jitter=20 ns

Example 10

By spin coating a 2 wt % 2-ethoxyethanol solution of dye No. II-2 among the azo metal complex dyes listed above, a dye film was formed on polycarbonate substrate having a diameter of 120 mm and a thickness of 1.2 mm. This thin film sample was measured for transmission and reflection spectra. The dye film had a thickness (dry film thickness) of 500 Å (50 nm). The results are shown in FIG. 5.

Figure 5:
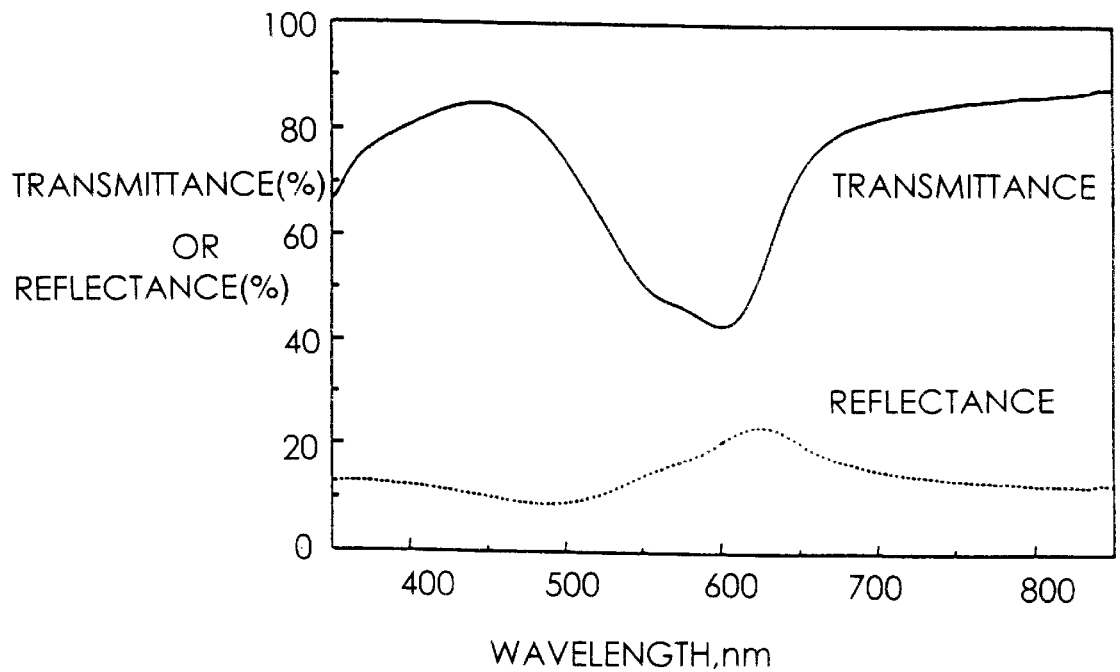
FIG. 5 is a graph showing transmission and reflection spectra of an azo metal complex dye used in the invention.

It is seen from FIG. 5 that this compound exhibits high reflectance in a wide wavelength region of 700 to 500 nm. This shows that it is a dye capable of accommodating for commercially available CD or DVD players in this wavelength region.

It is noted that the dye had n=2.25 and k=0.10 at 650 nm when measured as previously defined.

Example 11

The thin film sample of Example 10 was examined for light resistance. Light resistance was examined by measuring an initial transmittance $T_0$, exposing the sample to a xenon lamp (Xenon Fadeometer manufactured by Shimazu Mfg. K.K.) at 80,000 lux, and measuring a transmittance T after irradiation, and calculating a percent dye retention according to $(100-T)/(100-T_0) \times 100\%$. The percent dye retention after 100 hours of irradiation was found to be about 95%.

It was proven that dye No. II-2 was fully resistant to light.

Example 12

An optical recording disc was fabricated using the same dye No. II-2 as in Example 10 as a dye to form a recording layer. On a polycarbonate resin substrate of 120 mm in diameter and 0.6 mm in thickness which was previously provided with a groove (having a depth of 0.10 μm, a width of 0.42 μm, and a groove pitch of 0.80 μm), a recording layer containing the dye was formed to a thickness of 900 Å (90 nm) by spin coating. The coating solution used herein was a 2 wt % 2-ethoxyethanol solution. Next, an Au reflective layer of 850 Å thick was formed on the recording layer by sputtering, and a protective layer (5 μm thick) of a UV-curing type acrylic resin was formed thereon. Two disc samples formed in this way were mated such that the protective layers were joined with adhesive, obtaining a disc. This is designated disc sample No. 21.

Disc sample No. 22 was fabricated in the same manner as disc sample No. 21 except that the recording layer was formed by using the azo cobalt complex dye of the structure disclosed in JP-B 51682/1995 (comparative dye used in disc sample No. 2 in Example 3) and preparing a 2.0 wt % 2-ethoxyethanol solution thereof.

The thus fabricated optical recording discs, sample Nos. 21 and 22, were measured for optimum recording power (Po) and jitter by using a laser (oscillation wavelength 635 nm) and recording 8/16 modulated signals at a linear velocity of 3.9 m/sec. The optimum recording power means the range where asymmetry is 0% as measured by a tester (Pulstech Co.) used for record examination. The results are shown in Table 8. With respect to jitter, a loss of jitter after light exposure under the same conditions as in Example 11 was also evaluated.

TABLE 8

| Disc Sample No. | Recording layer-forming dye | Po (mW) | Jitter (%, σ/Tw) Initial | After exposure |
|---|---|---|---|---|
| 21 (invention) | dye No. II-2 | 9.1 | 7.7 | 8.0 |
| 22 (compar.) | comparative dye | 9.8 | 16.0 | 21.5 |

It is evident from Table 8 that as compared with the azo cobalt complex dye disclosed in JP-B 51682/1995, the azo cobalt complex dye within the scope of the invention has a low optimum recording power, that is, high recording sensitivity. Also read signals are improved in jitter.

Example 13

An optical recording disc was fabricated using the same dye No. II-2 as in Example 10 as a dye to form a recording layer. On a polycarbonate resin substrate of 120 mm in diameter and 1.2 mm in thickness which was previously provided with a groove (having a depth of 0.16 μm, a width of 0.48 μm, and a groove pitch of 1.6 μm), a recording layer containing the dye was formed to a thickness of 2,000 Å (200 nm) by spin coating. The coating solution used herein was a 2 wt % 2-ethoxyethanol solution. Next, an Au reflective layer of 850 Å thick was formed on the recording layer by sputtering, and a transparent protective layer (5 μm thick) of a UV-curing type acrylic resin was formed thereon. This is designated disc sample No. 23.

Disc sample No. 24 was fabricated in the same manner as disc sample No. 23 except that the recording layer was formed by using the azo cobalt complex dye of the structure disclosed in JP-B 51682/1995 (comparative dye used in disc sample No. 2 in Example 3) and preparing a 2.0 wt % 2-ethoxyethanol solution thereof.

The thus fabricated optical recording discs, sample Nos. 23 and 24, were measured for optimum recording power (Po) and jitter by using a laser (oscillation wavelength 650 nm) and recording signals at a linear velocity of 1.2 m/sec. The optimum recording power means the range where asymmetry is −2% as measured by a tester (Pulstech Co.) used for record examination. The results are shown in Table 9. With respect to jitter, a loss of jitter after light exposure under the same conditions as in Example 2 was also evaluated.

TABLE 9

| Disc Sample No. | Recording layer-forming dye | Po (mW) | Jitter (ns) Initial | After exposure |
|---|---|---|---|---|
| 23 (invention) | dye No. II-2 | 7.6 | 20 | 23 |
| 24 (compar.) | comparative dye | 9.2 | 28 | 39 |

It is evident from Table 9 that as compared with the azo cobalt complex dye disclosed in JP-B 51682/1995, the azo cobalt complex dye within the scope of the invention has a low optimum recording power, that is, high recording sensitivity. Also read signals are improved in jitter.

Example 14

An optical recording disc was fabricated in the same manner as disc sample No. 23 in Example 13 except that the recording layer was formed by using dye No. II-2 and phthalocyanine dye A-52 as a dye to form a recording layer and preparing a 2 wt % 2-ethoxyethanol solution of a dye mixture (molar ratio of dye No. II-2/phthalocyanine dye A-52=30/70). This is designated disc sample No. 25.

Disc sample No. 26 was fabricated in the same manner as disc sample No. 25 except that the molar ratio of dye No. II-2/phthalocyanine dye A-52=50/50.

Disc sample No. 27 was fabricated in the same manner as disc sample No. 26 except that the azo cobalt complex dye disclosed in JP-B 51682/1995 (comparative dye used in disc sample No. 2 in Example 3) was used instead of dye No. II-2.

These disc samples were recorded as in Example 13 in accordance with the Orange Book standard using laser light of 780 nm. The disc samples were measured for modulation ($I_{11}$Mod) and jitter by reading signals with laser light of 650 nm. The results are shown in Table 10.

TABLE 10

| Disc sample No. | Recording layer-forming dyes (molar ratio) | $I_{11}$Mod (%) | Jitter (ns) |
|---|---|---|---|
| 25 (invention) | II-2/A-52 = 30/70 | 59 | 22 |
| 26 (invention) | II-2/A-52 = 50/50 | 68 | 20 |
| 27 (compar.) | comparative dye/A-52 = 50/50 | 58 | >40 |

It is evident from Table 10 that the azo cobalt complex dye within the scope of the invention exerts improved performance not only when used alone in the optical recording layer, but also when used in a mix system with a dye having absorption on a longer wavelength side, for example, a phthalocyanine dye for the purpose of being compatible with 780 nm prescribed by the Orange Book standard and read on a short wavelength side of about 650 nm, because neither modulation nor jitter is exacerbated. In contrast, azo metal complex dyes of the type used as the comparative dye result in read signals with greater jitter and lower modulation than the inventive dyes. It is also seen that the inventive dyes achieve the desired characteristics in a smaller mix amount than azo metal complex dyes of the type used as the comparative dye.

Further, each disc sample which had been recorded at 780 nm as mentioned above was measured for modulation and jitter when read with laser light of 780 nm. Among the disc samples using the dye within the scope of the invention, sample No. 25 had a modulation of 67% and a jitter of 20 ns and sample No. 26 had a modulation of 71% and a jitter of 19 ns. In contrast, sample No. 27 using the comparative dye had a modulation of 62% and a jitter of 42 ns, indicating that the dye within the scope of the invention provides better characteristics.

Further, when each disc sample which had been recorded with laser light of 650 nm at a linear velocity of 1.2 m/sec. was read with laser light of 650 nm, disc sample Nos. 25 and 26 within the scope of the invention were read in an advantageous manner, with better results of modulation and jitter. In contrast, comparative disc sample No. 27 showed inferior characteristics to the inventive samples.

Further, when each disc sample which had been recorded with laser light of 650 nm was read with laser light of 780 nm, disc sample Nos. 25 and 26 within the scope of the invention were read in an advantageous manner, with better results of modulation and jitter. In contrast, comparative disc sample No. 27 showed inferior characteristics to the inventive samples.

It is thus proven that disc sample Nos. 25 and 26 within the scope of the invention can be advantageously used as an optical recording disc accommodating for two wavelengths.

Example 15

Disc sample Nos. 28, 29, and 30 were prepared in the same manner as disc sample Nos. 25, 26, and 27 of Example 14 except that the recording layer was obtained by substituting phthalocyanine dye A-3 for phthalocyanine dye A-52, using 1-methoxy-2-butanol as a coating solvent, and preparing a 2 wt % solution thereof to form a dye film.

Disc sample Nos. 28 to 30 were examined for various characteristics as in Example 14 to find that disc sample Nos. 28 and 29 had characteristics at least equivalent to disc sample Nos. 25 and 26. In contrast, disc sample No. 30 showed characteristics merely comparable to disc sample No. 27.

Among various measurements, the results of measurement of modulation ($I_{11}$Mod) and jitter associated with recording at 780 nm and reading at 650 nm are shown in Table 11.

TABLE 11

| Disc sample No. | Recording layer-forming dyes (molar ratio) | $I_{11}$Mod (%) | Jitter (ns) |
| --- | --- | --- | --- |
| 28 (invention) | II-2/A-3 = 30/70 | 62 | 22 |
| 29 (invention) | II-2/A-3 = 50/50 | 73 | 19 |
| 30 (compar.) | comparative dye/A-3 = 50/50 | 60 | >40 |

Example 16

Disc sample Nos. 31, 32, and 33 were prepared in the same manner as disc sample Nos. 25, 26, and 27 of Example 14 except that the recording layer was obtained by substituting phthalocyanine dye A-1 for phthalocyanine dye A-52, using 1-methoxy-2-butanol as a coating solvent, and preparing a 2 wt % solution thereof to form a dye film.

Disc sample Nos. 31 to 33 were examined for various characteristics as in Example 14 to find that disc sample Nos. 31 and 32 had characteristics at least equivalent to disc sample Nos. 25 and 26. In contrast, disc sample No. 33 showed characteristics merely comparable to disc sample No. 27.

Among various measurements, the results of measurement of modulation ($I_{11}$Mod) and jitter associated with recording at 780 nm and reading at 650 nm are shown in Table 12.

TABLE 12

| Disc sample No. | Recording layer-forming dyes (molar ratio) | $I_{11}$Mod (%) | Jitter (ns) |
| --- | --- | --- | --- |
| 31 (invention) | II-2/A-1 = 30/70 | 61 | 21 |
| 32 (invention) | II-2/A-1 = 50/50 | 71 | 20 |
| 33 (compar.) | comparative dye/A-1 = 50/50 | 59 | >40 |

It is evident that as compared with well-known azo metal complex dyes for optical recording layers as typified by the comparative dye, azo metal complex dyes within the scope of the invention as typified by dye No. II-2 are improved in recording sensitivity and jitter characteristic. It is also seen that when used in admixture with another light absorbing dye, the inventive dyes show unexpected results as demonstrated by read signals free from jitter deterioration.

Example 17

Disc samples were prepared in the same manner as disc sample No. 21 of Example 12, disc sample No. 23 of Example 13, disc sample Nos. 25 and 26 of Example 14, disc sample Nos. 28 and 29 of Example 15, and disc sample Nos. 31 and 32 of Example 16 except that dye Nos. II-3, II-4, II-6, II-13, II-44, II-63, and II-71, all listed previously, were used instead of dye No. II-2 or two or more of these dyes inclusive of dye No. II-2 were used in admixture. The disc samples were examined for characteristics as in Examples 12 to 16 to find that they showed equivalent characteristics to disc sample Nos. 21, 23, 25, 26, 28, 29, 31, and 32 in accordance with their construction. Also the above-mentioned dyes within the scope of the invention other than dye No. II-2 were examined for light resistance as in Example 11, finding that their light resistance was as good as dye No. II-2.

Example 18

On a polycarbonate resin substrate as used in Example 13, a lower recording layer of 50 nm thick was formed using a 2 wt % 2,2,3,3-tetrafluoropropanol solution of dye No. II-2, and an upper recording layer of 100 nm thick was formed using a 1.5 wt % ethylcyclohexane solution of dye A-3. By subsequently following the procedure of Example 13, a disc sample was prepared.

The thus prepared disc sample No. 34 was examined for characteristics as in Example 14 to find satisfactory results as found for the inventive samples of Examples 14 to 16. Among various measurements, the results of measurement of modulation ($I_{11}$Mod) and jitter associated with recording at 780 nm and reading at 650 nm are shown below.

$I_{11}$Mod=68%

Jitter=22 ns

Comparative Example

Three disc samples were prepared in the same manner as disc sample No. 23 of Example 13 except that compounds a, b, c, and d of the following structure were used instead of dye No. II-2. The unrecorded discs were examined for reflectance at 650 nm, finding that they all had a low reflectance.

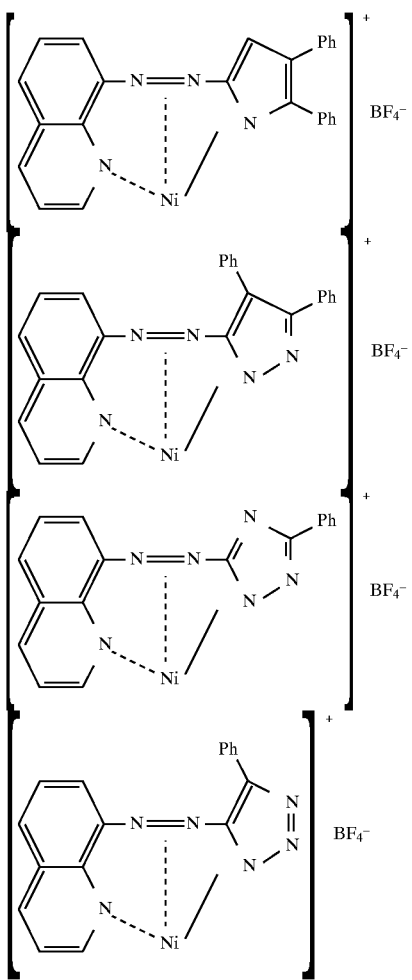

It is evident from the results that compounds a, b, c, and d having a pyrrole ring, pyrazole ring, 1,2,4-triazole ring and 1,2,3-triazole ring, respectively, and analogous to the dyes of the present invention are unsuitable as a dye for optical recording layers.

Example 19

The azo metal complex dyes within the scope of the invention as used in Examples 5 to 9 and 14 to 18 were measured for λmax as in Examples 1 and 10. They were also measured for n and k at 650 nm as described above. The results are shown in Table 13.

TABLE 13

| Dye No. | λmax, nm | (650 nm) n | k |
|---|---|---|---|
| I-1 | 580 | 2.15 | 0.04 |
| I-2 | 580 | 2.10 | 0.04 |
| I-3 | 577 | 2.15 | 0.03 |

TABLE 13-continued

| Dye No. | λmax, nm | (650 nm) n | k |
|---|---|---|---|
| I-7 | 570 | 2.10 | 0.03 |
| I-8 | 582 | 2.20 | 0.05 |
| I-9 | 585 | 2.20 | 0.05 |
| I-28 | 575 | 2.25 | 0.04 |
| I-32 | 570 | 2.05 | 0.03 |
| I-53 | 583 | 2.10 | 0.04 |
| I-65 | 585 | 2.20 | 0.05 |
| I-91 | 590 | 2.20 | 0.06 |
| I-107 | 592 | 2.20 | 0.07 |
| I-143 | 600 | 2.25 | 0.08 |
| I-193 | 575 | 2.15 | 0.04 |
| II-2 | 600 | 2.25 | 0.10 |
| II-3 | 602 | 2.25 | 0.10 |
| II-4 | 600 | 2.24 | 0.09 |
| II-6 | 610 | 2.25 | 0.12 |
| II-13 | 595 | 2.20 | 0.09 |
| II-44 | 605 | 2.25 | 0.11 |
| II-63 | 608 | 2.30 | 0.12 |
| II-71 | 590 | 2.15 | 0.08 |

BENEFITS

According to the invention, an optical recording medium having improved characteristics including high recording sensitivity and reduced jitter is provided using an azo metal complex dye having improved solubility and light resistance as a light absorbing dye. When the inventive dye is used in admixture with another dye having absorption on a longer wavelength side for an optical recording layer accommodating for two wavelengths, the inventive dye exhibits unexpected results including elimination of the drawback of dye mixing resulting in substantially deteriorated jitter, as opposed to well-known azo metal complex dyes. An optical recording medium having the feature of accommodating for two wavelengths and exhibiting excellent characteristics is established.

We claim:

1. An optical recording medium comprising a recording layer containing an azo metal complex dye obtained by reacting a metal compound with an azo compound of the following general formula (I):

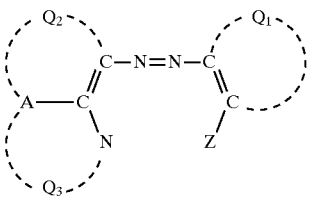

wherein $Q_1$ is a group of atoms necessary to form an aromatic ring with the two carbon atoms, Z is a radical having active hydrogen, A is a carbon atom or hetero-atom, $Q_2$ is a group of atoms necessary to form an aromatic ring with the two carbon atoms and A, and $Q_3$ is a group of atoms necessary to form an aromatic ring with the carbon atom, nitrogen atom and A, the aromatic ring completed by $Q_2$ being fused to the aromatic ring completed by $Q_3$.

2. The optical recording medium of claim 1 wherein said azo metal complex dye has a center metal selected from the group consisting of Co, Mn, Ti, V, Ni, Cu, Zn, Mo, W, Ru, Fe, Pd, Pt, and Al, and said azo compound is of the following formula (Ia):

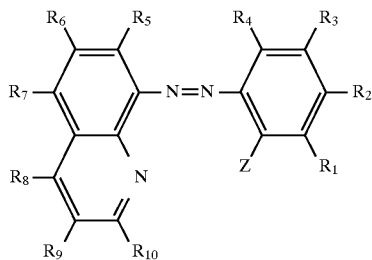

wherein $R_1$, $R_2$, $R_3$, and $R_4$ are independently selected from the group consisting of a hydrogen atom, halogen atom, amino radical, alkyl radical, alkoxy radical, aryloxy radical, acyl radical, aryl radical, carbamoyl radical, and alkoxycarbonyl radical, or $R_1$ and $R_2$, $R_2$ and $R_3$, and $R_3$ and $R_4$, taken together, may form a fused ring, Z is selected from the group consisting of —OH, —SH, —NH$_2$, —COOH, —CONH$_2$, —SO$_2$NH$_2$, and —SO$_3$H, and $R_5$, $R_6$, $R_7$, $R_8$, $R_9$, and $R_{10}$ are independently selected from the group consisting of a hydrogen atom, halogen atom, nitro radical, cyano radical, and alkyl radical.

3. The optical recording medium of claim 1 wherein said recording layer further contains a light absorbing dye having different optical characteristics from said azo metal complex dye.

4. The optical recording medium of claim 2 wherein said light absorbing dye having different optical characteristics is a phthalocyanine dye.

5. An optical recording medium comprising a recording layer containing an azo metal complex dye obtained by reacting a metal compound with an azo compound of the following general formula (II):

wherein $Q^1$ is a 8-quinolyl radical and $Q^2$ is a 2-imidazolyl radical whose nitrogen at the 1-position has active hydrogen.

6. The optical recording medium of claim 5 wherein said azo metal complex dye has a center metal selected from the group consisting of Co, Mn, Ni, Cu, Zn, Mo, Fe, and Pd.

7. The optical recording medium of claim 5 wherein said recording layer further contains a light absorbing dye having different optical characteristics from said azo metal complex dye.

8. The optical recording medium of claim 7 wherein said light absorbing dye having different optical characteristics is a phthalocyanine dye.

* * * * *